United States Patent
Moondhra et al.

(10) Patent No.: US 10,782,962 B2
(45) Date of Patent: Sep. 22, 2020

(54) COMPONENT DESIGN SECURITY THROUGH RESTRICTION OF A DESIGN COMPONENT DEPENDENCY TREE

(71) Applicant: Methodics, Inc., San Francisco, CA (US)

(72) Inventors: Vishal Moondhra, San Jose, CA (US); Fergus Slorach, Auckland (NZ)

(73) Assignee: Methodics, Inc.

( * ) Notice: Subject to any disclaimer, the term of this patent is extended or adjusted under 35 U.S.C. 154(b) by 0 days.

(21) Appl. No.: 16/403,571

(22) Filed: May 5, 2019

(65) Prior Publication Data

US 2019/0339966 A1    Nov. 7, 2019

Related U.S. Application Data

(60) Provisional application No. 62/667,546, filed on May 6, 2018.

(51) Int. Cl.
| | |
|---|---|
| G06F 16/903 | (2019.01) |
| G06F 8/71 | (2018.01) |
| G06F 8/41 | (2018.01) |
| G06F 16/901 | (2019.01) |

(52) U.S. Cl.
CPC .............. *G06F 8/71* (2013.01); *G06F 8/433* (2013.01); *G06F 16/903* (2019.01); *G06F 16/9027* (2019.01)

(58) Field of Classification Search
CPC ........................................................ G06F 8/71
USPC ........................................................ 717/121
See application file for complete search history.

(56) References Cited

U.S. PATENT DOCUMENTS

| | | | | |
|---|---|---|---|---|
| 7,305,392 | B1* | 12/2007 | Abrams | G06Q 10/06 707/770 |
| 7,330,822 | B1* | 2/2008 | Robson | G06Q 10/06 705/7.15 |
| 9,110,577 | B1* | 8/2015 | Alur | G06F 3/0485 |
| 2009/0113088 | A1* | 4/2009 | Illowsky | G06F 9/54 710/62 |
| 2011/0289476 | A1* | 11/2011 | Pletter | G06F 8/38 717/107 |
| 2015/0052596 | A1* | 2/2015 | Ayanam | H04W 4/38 726/8 |
| 2016/0137281 | A1* | 5/2016 | Egan | B64B 1/22 244/25 |

(Continued)

*Primary Examiner* — John Q Chavis
(74) *Attorney, Agent, or Firm* — Jensen-Haxel Law

(57) ABSTRACT

Disclosed is a method, a device, a system and/or a manufacture of component design security through restriction of a design component dependency tree. In one embodiment, a request for retrieval of a dependency tree of a root version of a component is processed. A client device is authenticated, and a permission profile is extracted. Unique identifier of the root version and each version of the dependency tree is compared to the permission profile of the user and/or a security profile to determine an authorization status for each. Dependency reference following is terminated at unauthorized versions to result in a terminated branch of the dependency tree. Unique identifier of the authorized version are stored in a restricted tree data to result in a continuing branch of the dependency tree. The restricted tree data of the root version is returned to the client device for retrieving workfiles to generate a design workspace.

20 Claims, 33 Drawing Sheets

(56) References Cited

U.S. PATENT DOCUMENTS

| | | | |
|---|---|---|---|
| 2016/0148159 A1* | 5/2016 | Coffing | G06Q 10/10 |
| | | | 705/301 |
| 2017/0351511 A1* | 12/2017 | Bar-Or | G06F 8/34 |
| 2017/0357496 A1* | 12/2017 | Smith | H04L 9/3228 |
| 2019/0080320 A1* | 3/2019 | Hammad | G06Q 10/087 |

* cited by examiner

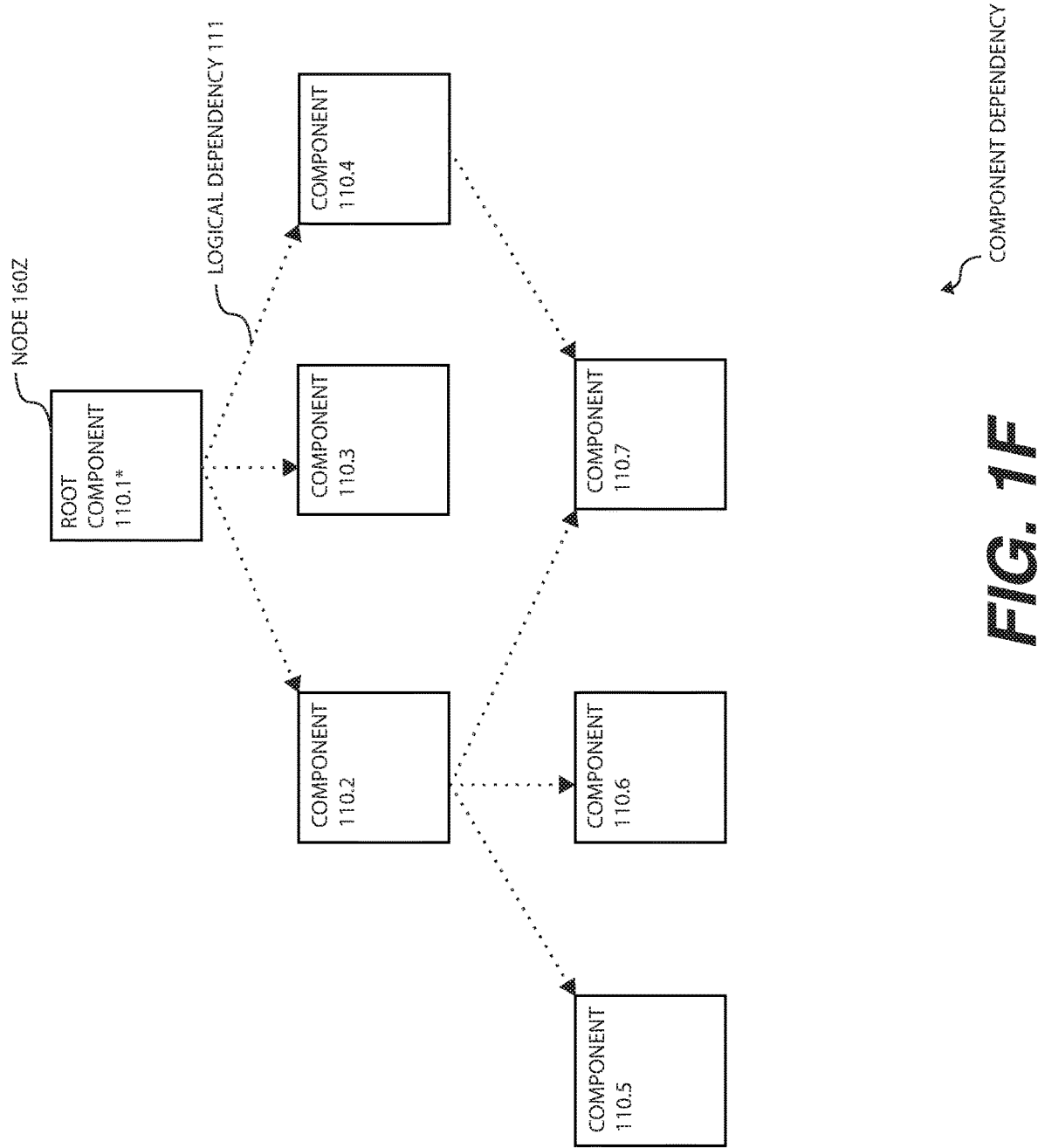

US 10,782,962 B2

COMPONENT DESIGN SECURITY THROUGH RESTRICTION OF A DESIGN COMPONENT DEPENDENCY TREE

CLAIM FOR PRIORITY

This patent application claims priority from, and hereby incorporates by reference: U.S. provisional patent application No. 62/667,546, titled 'COMPONENT DESIGN SECURITY THROUGH RESTRICTION OF A DESIGN COMPONENT DEPENDENCY TREE', filed May 6, 2018.

FIELD OF TECHNOLOGY

This disclosure relates generally to data processing devices and, more particularly, to a method, a device, a system and a manufacture of component design security through restriction of a design component dependency tree.

BACKGROUND

A product lifecycle management (PLM) system may be a software program that helps to manage the lifecycle of a product or technology. For example, a PLM system may help to manage product conception, design, engineering, manufacture, and may even extend into sale, distribution, service and support. A product managed by the PLM system may be a physical product (e.g., a consumer good, such as an automobile or smartphone) or an intangible product (e.g., an integrated circuit design, a software application, a layered graphic design file). The PLM may increase the ability of a small business, large enterprise, or government to lower design and manufacturing cost, increase efficiency, detect and track defects and bugs, manage service and support, coordinate recalls, develop new features, and may include many other potential advantages.

The product may have one or more components. For example, an automobile is comprised of an engine, chassis, seats, steering wheel, etc. Similar, each component may have sub-components. For example, the engine may be comprised of pistons, spark plugs, fuel lines, etc. A large number of sub-components may be needed for a component. Each component may depend on another component for operation or assembly. For example, the engine component may depend on a piston sub-component. Each component and each sub-component may have one or more versions. For example, for an engine component of an automobile that is a first design iteration may include a first version having a first piston arrangement. A second version of the engine may have a different piston arrangement. A dependency tree may include the sub-components on which a component depends.

Within software and integrated circuit design, each component may depend on numerous other circuit designs and/or computer code files as sub-components. For example, a computer processor may depend on a memory registers and an algorithmic logic unit (ALU). Other dependencies may include software applications that help design and/or help test the component or sub-component, for example a "test-bench" and/or a "test kit."

Design complexity may be one challenge that PLM systems manage. For example, the dependency tree of a component may be quite large, including hundreds or thousands of sub-components with one or more versions of each. Each component may be developed or maintained by one or more persons or teams of people who may be responsible for working on the product and its various components of the dependency tree. They may work on the same component simultaneously, or new versions of sub-components may become available which provide new options for the dependency tree.

One challenge in working with complex designs may be component relevancy. For example, the dependency tree of a component may include many versions of the component and each sub-component. Only some of the components and versions may be relevant to a given product or project. This complexity if not effectively managed may make working on a project slow, confusing and/or prone to error. When such inefficiencies scale to a large number of components and/or persons working on a project, the effects may be delayed project development goals, difficulty finding design flaws, costly mistakes, and/or ultimately dissatisfied customers and lost revenue.

A similar challenge that may arise in a complex design environment is design security and secrecy. The secrecy of the design may be an important aspect of a component development project as the component and/or its sub-components may be valuable intellectual property (e.g., a trade secret) that may provide substantial economic value and competitive advantage. For example, such intellectual property may be important in the integrated circuit and software design disciplines where computer code and chip designs, and/or the associated knowledge of their architecture, may be easily copied and could be secretly used in a competitor's product. For example, an enterprise developing a smartphone may need to hire a contractor who may be an expert in building a certain kind of software application that is a critical sub-component of the smartphone. However, because the sub-contractor often works with competitors, the enterprise may worry about exposing other information about the project.

Both the challenge of relevancy and security also may overlap. In the last example, the contractor may be working on a component that depends on a sub-component. The sub-component may have several versions, some of which may be commonly available (e.g., an open source software) and others which may be important trade secrets (e.g., a proprietary software). Therefore, the enterprise may have difficulty both helping the contractor manage the complexity of the project while also protecting the enterprise's trade secrets.

Without an effective way to manage project complexity, users may become confused, inefficient, and/or prone to error. Products, components, and projects may turn out inferior, for example, receiving poor consumer reviews, lost credibility and lost revenue. Organizations may have to make tradeoffs between complexity management and trade secret protection. Trade secrets, that may give a project or organization a significant competitive advantage or an economic value, may be lost.

SUMMARY

Disclosed are a method, a device, a system, and/or a manufacture of component design security through restriction of a design component dependency tree.

In one embodiment, a computer-implemented method for selectively securing design data includes receiving a first request for retrieval of a dependency tree of a version of a component. The first request is generated by a client device of a user and includes a unique identifier of the user and a unique identifier of the version of the component. The version of the component acts as a root version of the dependency tree. The method authenticates the user and/or the client device of the user and extracts a permission profile associated with the unique identifier of the user.

A second request for retrieval of the dependency tree of the root version of the component is generated, the second request including the permission profile and the unique identifier of the root version of the component. The root version of the component is queried with the unique identifier of the root version. A first dependency reference is followed to a version of a first sub-component of the component and a second dependency reference to a version of a second sub-component of the component. A security profile associated with the first sub-component is extracted.

The permission profile of the user is compared to the security profile associated with the first sub-component to determine exclusion of the version of the first sub-component from the dependency tree of the root version. Dependency reference following is terminated at the version of the first sub-component to result in a terminated branch of the dependency tree of the root version. The unique identifier of the version of the second sub-component in a restricted tree data to result in a continuing branch of the dependency tree of the root version. The restricted tree data of the root version is returned to the client device of the user.

The dependency references of the versions within the design database may define a directed acyclic graph where each version of each component is a node of the directed acyclic graph and each dependency reference is an edge of the directed acyclic graph.

It may be determined that a version of a third sub-component and a version of a fourth sub-component each comprise an instance of the dependency reference each pointing to a different version of a fifth sub-component. The version of the third sub-component and the version of the fourth sub-component may be within the continuing branch of the dependency tree. A conflict resolution rule may be applied to return a selected version of the fifth sub-component.

The method may exclude from the restricted tree data the unique identifier of one or more versions of the fifth sub-component except the unique identifier of the selected version of the fifth sub-component. An override reference drawn to a version of a sixth sub-component of the component defines an override version may be determined. A conflict implicating the version of the sixth sub-component may be resolved to select the override version.

A third request for retrieval of one or more workfiles associated with the restricted tree data to assemble a design workspace may be received. The third request may include the unique identifier of the root version of the component and the unique identifier of a version of each sub-component within the restricted tree data. The one or more workfiles associated with the restricted tree data from a file repository may be received and the one or more workfiles may be encrypted. Unencrypted and/or encrypted instances of the one or more workfiles may then be returned to the client device of the user for assembly of a restricted instance of the design workspace.

The method may associate within a subscription database the unique identifier of the user with a unique identifier of a seventh sub-component of the component and/or a variant of the seventh sub-component to subscribe the user to an event associated with the seventh sub-component and/or the variant. It may be determined that new version associated with the seventh sub-component has been defined, and a versioning message may be generated for transmission to the client device of the user.

The unique identifier of the seventh sub-component and/or the variant may be determined to have been removed from the permission profile of the user, and an un-subscribe request may be generated. The unique identifier within the subscription database of the user associated with the unique identifier of the seventh sub-component and/or the variant may be deleted. Alternatively, or in addition, upon determining the new version of the seventh sub-component, the security profile associated with the seventh sub-component, the variant, and/or the new version may be extracted, and/or the permission profile of the user may be compared to the security profile to determine continued inclusion of the new version of the seventh sub-component within the restricted tree data.

A version of the seventh sub-component and the new version of the seventh sub-component may be determined to each draw dependency references to different versions of an eighth sub-component. A conflict resolution rule may be applied to return a new selected version of the eighth sub-component. A workfile of an original selected version of the eighth sub-component may be stored within a file repository to a workfile of an original selected version of the eighth sub-component stored within the design workspace of the user. It may be determined that the workfile of the original selected version within the design workspace of the user is unmodified by the user. A unique identifier of the new selected version of the eighth sub-component and/or a workfile of the new selected version of the eighth sub-component may be pushed to the client device.

In another embodiment, a computer-implemented method for selectively securing design data includes receiving a first request for retrieval of a dependency tree of a version of a component, the first request including a unique identifier of a user generating the request and a unique identifier of the version of the component as a root version of the dependency tree. A permission profile associated with the user generating the first request is extracted.

The unique identifier of the version of the component is submitted as a query to a design database including a set of dependency references defining a directed acyclic graph stored in a computer memory. The directed acyclic graph including a set of components as nodes of the directed acyclic graph and a set of dependency references of at least one of the set of components and a set of the versions of the set of components drawn between the nodes as directed edges of the directed acyclic graph.

Starting at the root node, the set of dependency references of the version of the component and the set of dependency references of a version of each of a set of sub-components of the component is followed. The unique identifier of the version of the component and the unique identifier of the version of each of the set of sub-components is compared to the permission profile of the user to determine an authorization status for the root version and each of the versions of the set of sub-components. A restricted tree data is stored that includes a unique identifier of the root version and the unique identifier of each version of the set of sub-components having two qualities. First, each version has a positive authorization status. Second, each version has a connection to the root version of the component through a dependency chain of versions, each version in the dependency chain having the positive authorization status.

In yet another embodiment, a system includes a coordination server and a network. The coordination server includes a processor of the coordination server and a memory of the coordination server. A request agent includes computer executable instructions that when executed on the processor of the coordination server receives a first request for retrieval of a dependency tree of a version of a component that includes a unique identifier of the user and a unique identifier of the version of the component as a root version of the dependency tree. The coordination server includes authentication module including computer executable instructions that when executed on the processor of the coordination server authenticates a user and/or a client device of the user generating the request.

The coordination server of the system further includes a tree query engine and a tree restriction engine. The tree query engine includes computer executable instructions that when executed on the processor of the coordination server, starting at the root node, follows a set of dependency references of the version of the component and a set of dependency references of a version of each of a set of sub-components of the component to assemble a tree data.

The tree restriction engine includes a profile comparison module, a node authorization module, and a node selection module. The profile comparison module includes computer executable instructions that when executed on the processor of the coordination server extracts a permission profile associated with the unique identifier of the user and compares the unique identifier of the version of the component and the unique identifier of the version of each of the set of sub-components of the tree data to the permission profile of the user. The node authorization module determines an authorization status for the root version and each of the versions of the set of sub-components. The node selection module of the coordination server comprises computer executable instructions that when executed on the processor of the coordination server stores a restricted tree data including a unique identifier of the root version and the unique identifier of each version of the set of sub-components having both: (a) a positive authorization status and (b) a connection to the root version of the component through a dependency chain of versions, each version in the dependency chain having the positive authorization status.

The system may include a security server that may include a permission database storing a unique identifier of the user associated with the permission profile, the permission profile including at least one of a permission list, a permission type, and a permission level. The system may include a design server including a dependency database stored in a computer memory that includes dependency references defining a directed acyclic graph, the directed acyclic graph including a set of versions as nodes of the directed acyclic graph and a set of dependency references of at least one of the set of versions acyclically drawn between the nodes as directed edges of the directed acyclic graph. The system may further include a file server, a client device, and/or a subscription server, as shown and described.

BRIEF DESCRIPTION OF THE DRAWINGS

The embodiments of this disclosure are illustrated by way of example and not limitation in the figures of the accompanying drawings, in which like references indicate similar elements and in which:

FIG. 1F is yet another data structure illustrating the components associated with the dependency tree of FIG. 1E, each component having a logical dependency to form a component dependency tree, according to one or more embodiments.

Other features of the present embodiments will be apparent from the accompanying drawings and from the detailed description that follows.

DETAILED DESCRIPTION

Disclosed are a method, a device, a system and/or a manufacture of component design security through restriction of a design component dependency tree. Although the present embodiments have been described with reference to specific example embodiments, it will be evident that various modifications and changes may be made to these embodiments without departing from the broader spirit and scope of the various embodiments.

Figure 1A:
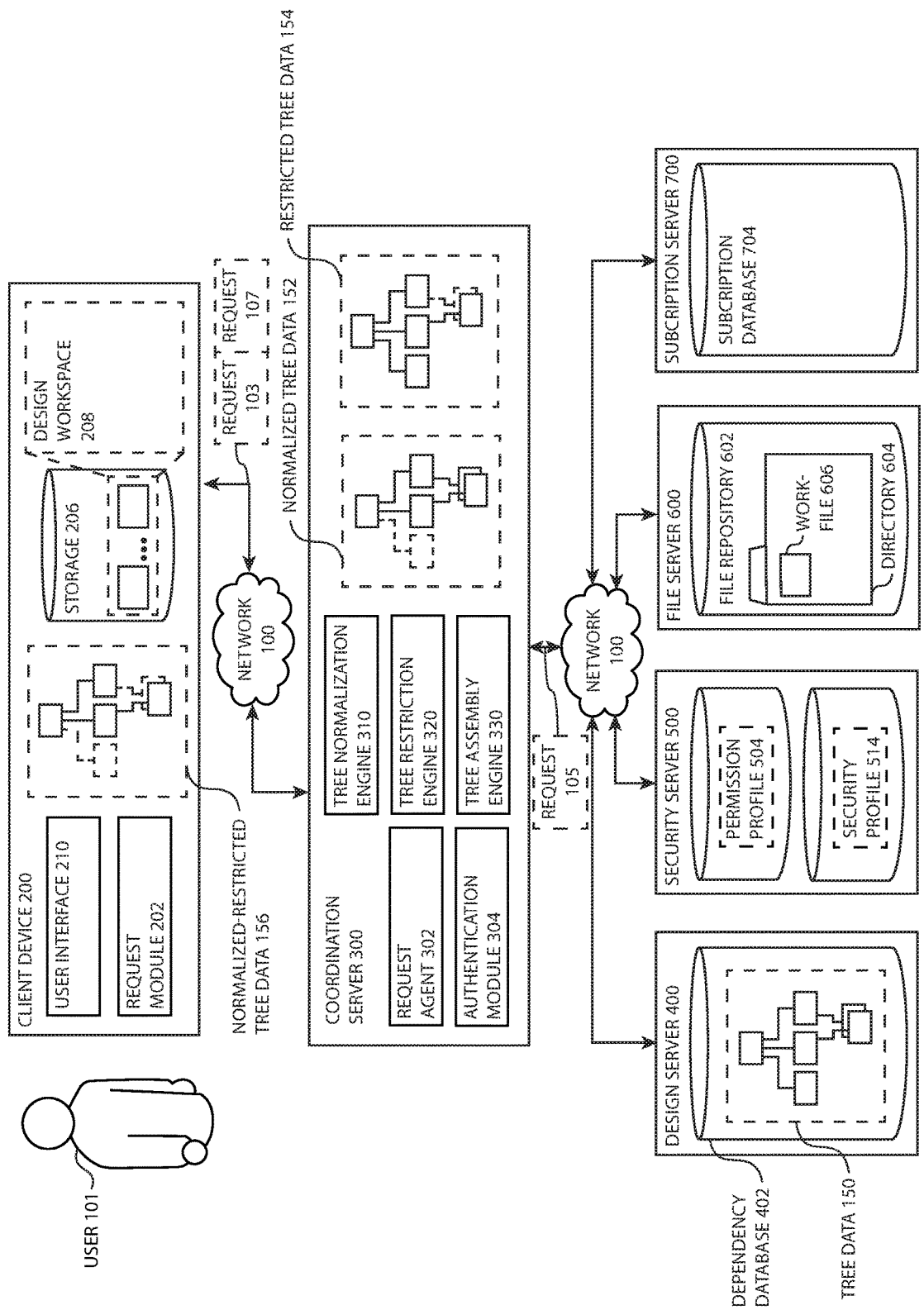
FIG. 1A is a product management network for managing complexity and/or security of a component design database, including a client device, a coordination server, a design server, a security server, a file server, and a subscription server, according to one or more embodiments.

FIG. 1A is a product management network for managing complexity and/or security of a component design database, according to one or more embodiments. The network of FIG. 1A comprises a network 100, a user 101, a client device 200, a coordination server 300, a design server 400, a security server 500, and/or a file server 600. The user 101 may be a person designing or otherwise working with a product, the components of the product, and/or the versions of the components for an organization such as an enterprise. For example, the product may be a consumer product an industrial product, a software application, and/or an integrated circuit design.

A basic description of a process by which the user 101 may work with, contribute to, test, and/or design the product is first provided. The user 101 may utilize the client device 200 to work on the product. The product may be stored as one or more workfiles 606 that are electronic data stored within a storage 206. The relationship of the workfiles 606 to aspects of the product may be maintained in a dependency database 402. The product may be treated as a root component that depends on a set of one or more sub-components. Similarly, a version of the root component of the product may be a root version 130* that depends on a set of one or more versions 130 of sub-components 110. A tree data 150 may be a set of data specifying each component 110 on which the root component 110* depends. Specifically, the product that is the root component 110* may be a version 130 of the product (e.g., an automobile model for the year 2019), and that root version 130* may depend on specific versions 130 of sub-components 110 (e.g., a specific model and type of disk brake). In another example, the root component 110* may be a smartphone operating system (Beta version 0.4431) that depends on a specific USB controller (e.g. USB 3 version 4.36512). The dependency database 402 may be stored as data structures shown and described in conjunction with FIG. 1B, FIG. 1C, FIG. D, FIG. 1E, FIG. 1F, FIG. G and/or FIG. 4, and throughout the present embodiments.

The user 101 may request the tree data 150 associated with the product (e.g., the root component 110* and/or the root version 130*) by generating the request 103. The coordination server 300 receives the request over the network 100, authenticates the user 101 and/or the client device 200, and/or may add additional data to and/or modify the request 103 to result in the result 105. The network 100 may be a local area network, a wide area network, a virtual private network, and/or the internet. The request 105 may be generated and communicated through the network 100 to the design server 400 to retrieve the tree data 150 associated with the root component 100* and/or the root version 130*. The tree data 150 may be communicated back to the client device 200. The tree data 150 may specify a version 130 of each component 110 and/or may specify a directory 604 or another location in which the workfiles 606 associated with the version 130 may be retrieved through the network 100. The user 101 may then generate the request 107 to retrieve a set of one or more workfiles 606 associated with version 130 specified by the tree data 150. The coordination server 300 and/or the file server 600 receives the request and extracts workfiles 606 from each directory 604 referenced in the request 107.

The workfiles 606 may be transmitted through the network 100 to the client device 200 and stored as a design workspace 208 of the product and/or a version 130 of the product. The user 101 may then modify, improve, and/or test the workfiles 606. For instance, the user 101 may define new versions 130 of the components 110 of the tree data 150, update the dependency database 402, and/or upload new workfiles 606 associated with modifications of the user 101 to the file repository 602.

The dependency tree of the product may be complex and/or large, resulting in a complex and/or large tree data 150 retrieved from the dependency database 402. Illustrative examples of the dependency tree of the product and/or the dependency tree data 150 are shown and described in conjunction with FIG. 1B, FIG. 1C, FIG. 1E, FIG. 4, FIG. 15 and FIG. 22, and throughout the present embodiments. In some instances, conflicts may arise within the dependency tree. For example, different versions 130 of the same component 110 may be referenced (e.g., a version 130A, a version 130B), a component 110 may only be relevant in certain contexts (e.g., it is a test kit of the component 110 that depends on it), and/or two components 110 may be mutually exclusive (e.g., two alternative components, for example a robotic arm that can have a first gripping mechanism or a second gripping mechanism).

In one or more embodiments, the network of FIG. 1A may remove conflicts by normalizing the tree data 150 to form the normalized tree data 152. The client device 200 generates the request 103 utilizing the request module 202. For example, the user 101 may utilize the user interface 210 of the user client device 200 to select a component and/or a version of the component for which to retrieve the dependency tree. A tree data 150 is the data of a specific dependency tree of a node 160 stored in the dependency database 402. For example, the tree data 150 may be independently transmitted, stored, and evaluated from the dependency database 402.

The coordination server 300 receives the request 103 with a request agent 302, and may authenticate the user 101 and/or the client device 200 with the authentication module 304. The coordination server 300 generates the request 105 specifying the root component 110* and/or the root version 130* for which to retrieve the tree data 150. The design server 400 may receive the request 105, query the dependency database 402, and may extract the tree data 150. The tree data 150 may be communicated over the network 100 to the coordination server 300.

The coordination server 300 receives the tree data 150 and may submit the tree data 150 to the tree normalization engine 310. The tree normalization engine 310 evaluates the tree data 150 to (i) remove contextual dependencies, (ii) remove conflicted components 110, variants 120 of components 110, and/or versions 130 of components 110, (iii) remove mutually exclusive components 110, variants 120 of components 110, and/or versions 130 of components 110, and/or (iv) to perform additional functions, as shown and described in conjunction with FIG. 3, FIG. 9, FIG. 10, FIG. 12, FIG. 13, FIG. 15, FIG. 16, and throughout the present embodiments. A tree assembly engine 330 rebuilds a normalized tree data 152. The normalized tree data 152 may be returned to the client device 200 through the network 100. The user 101 may review the normalized tree data 152, and may then generate the request 107 for retrieval of the workfiles 606 associated with the normalized tree data 152. As a result, the user 101 generates a normalized instance of the workspace 208 that may aid in streamlined and efficient product development and design.

The organization owning and/or developing the product may desire data security related to the dependency database 402, its component 110 and/or the file repository 602, and its workfiles 606. For example, the user 101 may be a contractor that only needs to work on a specific sub-component 110 of the product, and the dependencies of the sub-component 110. Even in such a case, the organization may not with the contractor to see all dependencies, or latest versions of dependencies of the sub-component, especially if unneeded for the contractor's work.

A security server 500 may include a permission profile 504 specifying permissions of the user 101 (and/or a group to which the user 101 belongs, e.g., the group profile 525). The security server 500 may also include a security profile 514 that may be associated with one or more of the components 110, variants 120 of components 110, or versions 130 of components 110 stored within the dependency database 402.

When the user 101 generates the request 103, the coordination server 300 may authenticate the user 101 and/or client device 200 with the authentication module 304. The coordination server 300 may request the permission profile 504 associated with the user 101. For example, the permission profile 504 may include a list (e.g., the permission list 505) of unique identifiers of components 110 (e.g., the component UID 112) stored in the dependency database 402 for which the user 101 may have an authorized access right. Similarly, the permission profile 504 may include a security level (e.g., the security level 518 of FIG. 5). The coordination server 300 extracts the permission profile 504 associated with the user 101 and appends the permission profile 504 to the request 105.

The tree data 150 associated with the dependency tree of the root component 110* and/or the root version 130* is extracted from the dependency database 402 of the design server 400. The tree data 150 may be returned to the coordination server 300. The tree data 150 may then be submitted to the tree restriction engine 320. The tree restriction engine 320 parses the tree data 150 to evaluate any instance of the security profiles 514 associated with components 110, variants 120 of components 110, and/or versions 130 of components 110 (and/or their dependencies) unauthorized by the permission profile 504, and/or to perform additional functions, as shown and described in conjunction with FIG. 3, FIG. 5, FIG. 17, FIG. 18, FIG. 19, FIG. 20, FIG. 21, FIG. 22, FIG. 23, and throughout the present embodiments. The tree assembly engine 330 rebuilds a restricted tree data 154. The restricted tree data 154 may be returned to the client device 200 through the network 100. The user 101 may review the restricted tree data 154, and may then generate the request 107 for retrieval of the workfiles 606 associated with the restricted tree data 154. As a result, the user 101 has a restricted instance of the workspace 208 that may protect the secrecy and security of product development of the organization. The tree data 150 may be operated on by both the tree normalization engine 310 and the tree restriction engine 320, sequentially or in coordination, to produce the normalized-restricted tree data 156.

The network of FIG. 1A may additionally manage, including any associated conflict or security challenges, subscriptions of the user 101 to events of the tree data 150 (including instances of the tree data 150 such as the normalized tree data 152, restricted tree data 154, and/or the normalized-restricted tree data 156). The user 101 may submit a request to subscribe to an event associated with one or more components 110, variants 120 of components 110, and/or versions 130 of components 110, including, for example, each version 130 of each component 110 within the normalized tree data 152. The subscription of the user 101 is stored in a subscription database 704 of a subscription server 700. The event, for example, may be a new version 130 that has been defined of a component 110 to which the user 101 subscribes. Another example of the event is an error log or security vulnerability notification.

Updates to the permission profile 504 and/or the security profile 514 may automatically result in un-subscribing the user 101 from the subscription database 704. Similarly, an event may initiate re-evaluation of the dependency tree to which the user 101 subscribed. The user 101 may be alerted of new components 110, variants 120 of components 110, and/or versions 130 of components 110 that have been defined, and/or new associated workfiles 606 may be delivered to the client device 200 (including automatic delivery, including determining if the user has not modified the workfile 606 associated with a new version 130). As a result, several or many users 101 may stay aware of group work and progress, and have the most up-to-date dependency tree and associated workfiles 606 of a component 110 and/or a version 130 of a component 110. At the same time, the organization may retain its ability to protect secrecy and confidentiality of aspects of the design, or easily change the permission profile 504 and/or security profile 514.

Figure 1B:
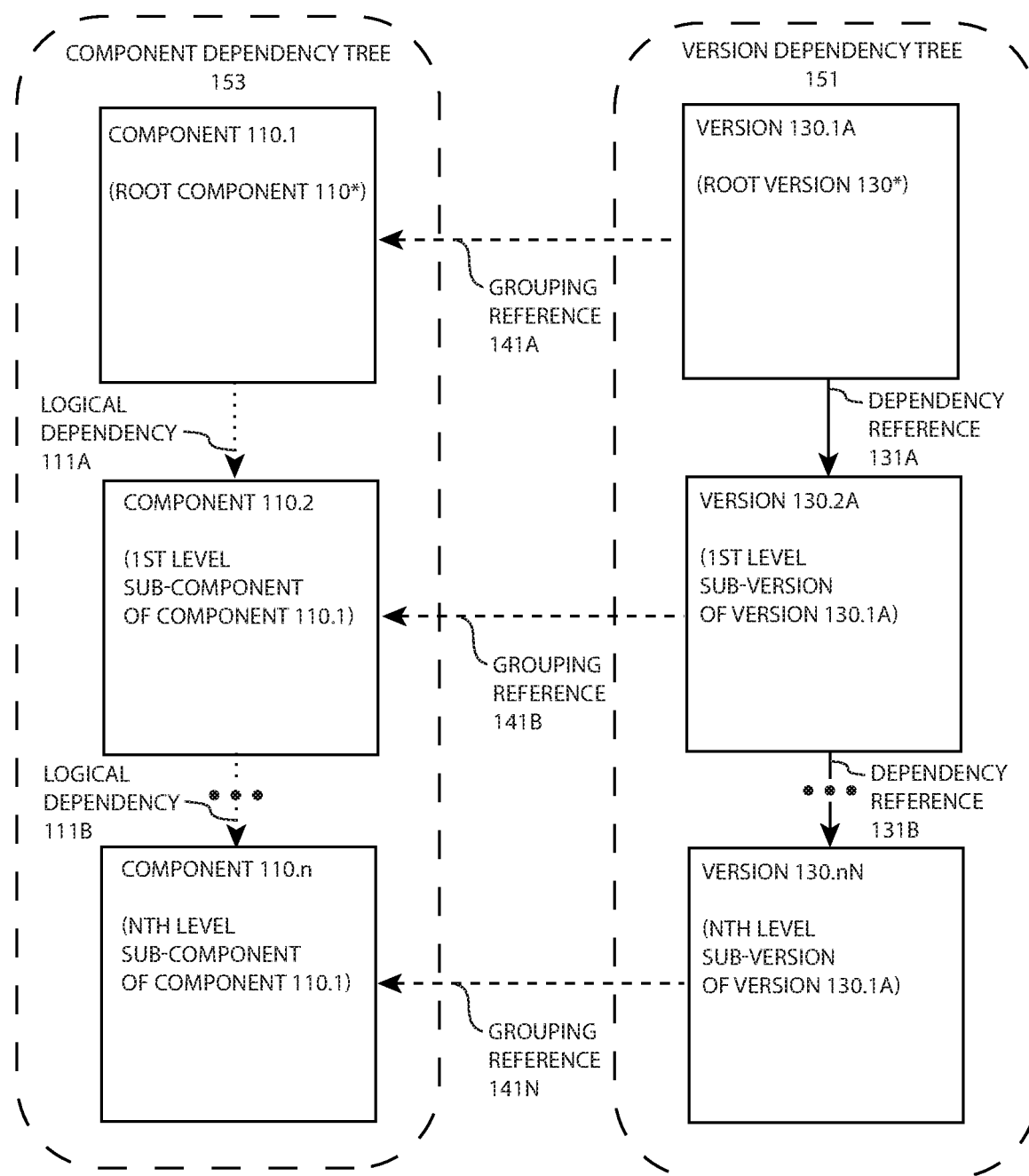
FIG. 1B is a data structure for modeling, representing, and storing within a computer readable memory a component and its dependent sub-components, along with versions of each, according to one or more embodiments.

FIG. 1B is a data structure for modeling, representing, and storing within a computer readable memory a component 110 and its dependent sub-components 110, along with versions 130 of each, according to one or more embodiments. Each component 110 of the data structure may model and/or represent a component, for example a component of a product that may be designed, engineered, and/or fabricated by the organization. Each component 110 may be dependent on other components 110 (in such case, the other components may be referred to as sub-components of the component 110). Specifically, each component 110 may be incorporated into a given component 110 to become a sub-component 110 of the given component 110. For example, the component 110.2 may be an automobile car door design. The component 110.2 may draw a dependency to several sub-components, such as a component 110.3 that is a window glass specification, a component 110.4 that is a hinge (not shown), and a component 110.4 that is a circuit board for operating an automatic door lock (not shown). The component 110.2 may also be a sub-component of a component 110.1 that is an automobile assembly (that is, the component 110.1 draws a dependency to the component 110.2).

Each component 110 may have one or more versions 130. The versions 130, for example, may model and/or represent different prototypes, production versions, development releases, beta versions, and/or models of the component 110. An instance of the version 130 may also draw dependency references 131 to other versions 130, and/or have dependency references 131 drawn to the instance of the version 130. A version 130 may have a sub-version 130 that may be analogous to a component 110 and a sub-component 110, respectively. For example, in the embodiment of FIG. 1B, the version 130.2A is a 1st level sub-version 130 of the version 130.1A. However, throughout the present embodiments the designation may be described other ways, for example referred to as simply a version 130 under a root version 130.

An instance of the component 110 groups one or more versions 130 associated with the instance of the component 110, as shown and described in greater detail in conjunction with the embodiment of FIG. C. As described below, intermediate groupings are also possible, for example, a variant 120.

Each version 130 may comprise references to one or more associated workfiles (e.g., the workfiles 606). The workfiles 606 may be computer files that the user 101 works with, modifies, defines, and/or builds. For example, the workfile 606 may be a block of software code (e.g., a computer program written in Java®), a computer-aided design (CAD) file (e.g., an AutoDesk® component, a SolidWorks assembly file), a graphic design (e.g., in Adobe® Illustrator), etc. A set of workfiles 606 define an instance of the version 130. The version 130 may reference the workfile 606 through a workfile reference 134, as shown and described in conjunction with FIG. 1G.

References are drawn between and among the components 110, the variants 120, and/or the versions 130. The grouping reference 141 is a type of reference between or among members of a component group (e.g., the component group 140). A dependency of one version 130 on another version 130 is stored as a dependency reference 131. A dependency of one component 110 on another component 110 is referred to as a logical dependency 111. The logical dependency 111 may be explicitly defined within the data structure, and/or may be implied or determined from one or more dependency references 131 of a version dependency tree 151 (e.g., by following grouping references 141 from a set of versions 130 connected by dependency references 131, as described below).

As physically stored within the dependency database 142, the component 110, the variant 120, and the version 130 are all instances of a node 160. Arrows between and among the component 110, the variant 120, and the version 130 are all instances of a directed edge 162. The directed edge 162 is also referred to in the present embodiments as simply an edge 162. References are stored in the memory as what may be known in the art as a "property", "attribute", or "field" of each node 160. Each property may have a paired and/or associated value stored in the memory. For example, the value for a property that is a reference may be a unique identifier of a node 160 that is referenced (e.g., the component UID 112). Each edge 162 may have a specific type, for example a dependency reference 131, a grouping reference 141, and/or a logical dependency 111. As shown and described in the present embodiments, one or more of the specific type of references may be defined such there are no cycles in directed edges of the specific type of references (e.g., "acyclic" references), which may form a directed acyclic graph. For example, all dependency references 131 may be defined to be acyclic within the dependency database 402.

Each instance of the version 130 has an associated dependency tree of zero to an arbitrary number (denoted 'n') of dependencies (e.g., the version 130 draws zero to 'n' dependency references 131, the node 160 directs zero to 'n' edges 162). When an instance of the version 130 is selected to be examined for its dependency tree, the instance is referred to as a root version 130*. Within the stored data structure, the root version 130* may also be referred to as a root node 161. The dependency tree of a version 130 is referred to as the version dependency tree 151.

In one or more embodiments, although not required in other embodiments, each version 130 draws a dependency reference to one and only one version 130 of a component group 140 (e.g., one and only one version 130 associated with a component 110, as the version 130 may be connected to the component 110 through one or more grouping references 141). However, two versions 130 within a dependency tree of a root version 130* may draw dependency references 131 to different versions 130 within a component group 140 (which, in one or more embodiments, may create a "version conflict"). In one or more embodiments, although not required in other embodiments, dependency references 131 are acyclic within the dependency database 402.

The component 110 may also have an associated dependency tree of zero to 'n' dependencies (e.g., draws zero to 'n' logical dependencies 111). When an instance of the component 110 is selected to examine its dependency tree, the instance is referred to as a root component 110*. In one or more embodiments, the logical dependencies 111 may be implied by the dependency references 131 of versions 130 associated with the components 110, as shown and described in conjunction with FIG. 1E and FIG. 1F.

A first instance of a node 160 within the dependency database 402 may have a "distance" from another node 160 within the dependency database 402 by determining a number of intervening edges 162 between the nodes 160. For example, where a version 130A draws a dependency reference 131 to a version 130B, and the version 130B draws a dependency reference 131 to a version 130C, the version 130A and the version 130B have an edge distance of one edge 162, and the version 130A and the version 130C have an edge distance of two edges 162.

Distances within the data structure may also be referred to as "levels" when applied to dependency references (e.g., the logical dependency 111, the dependency reference 131). For example, sub-components 110 of a root component 110* may be referred to in levels. As shown in the embodiment of FIG. 1B, the component 110.2 is a first level sub-component 110 of the component 110.1 that is the root component 110.1. An arbitrary number of sub-component levels may be defined underneath or above any given component. For example, a component 110 that may have no references at a first time may represent a stand-alone product, whereas at a second time the stand-alone product may be incorporated into an assembly such that the assembly may be selected as a component 110, with the stand-alone product a sub-component 110.

The version dependency tree 151 and the component dependency tree 153 may play different roles for the user 101. For example, the version dependency tree 151 may be used to track workfiles 606 associated with a particular root version 130*. For example, the version 130 may draw a dependency reference 131 to one and only one version 130 of a component group 140 and ensure dependency references 131 are drawn acyclically so that each version 130 and its dependencies are strictly defined. This may be useful for assembling the design workspace 208 of the user 101. On the other hand, it may be difficult for the user 101 to select the root version 130*, or evaluate the version dependency tree 151, without viewing a component dependency tree 153 that may be in a more human-readable format. Abstraction from a version 130 to a component 110 may be helpful in presenting the information to the user 101. For example, the user 101 may understand the logical dependencies 111 of components 110A (and/or variants 120) more easily than dependency references 131 of versions 130. For instance, the node 160 of each version 130 may be designated with a version number, whereas each component 110 may be designated by a name (e.g., "automobile," "algorithmic logic unit") and/or an image representing the component 110.

However, this may also potentially create alternative components 110 within the component dependency tree 153. For example, a version 130A and a version 130B may be within the component group 140A of a component 110A. The version 130A may draw a dependency reference 131 to a version 130C that is within the component group 140B of a component 110B. The version 130B may draw a dependency reference 131 to a version 130D that is within the component group 140C of a component 110C. The version dependency tree 153 of version 130A* will include the version 130A and the version 130C. The version dependency tree 153 of version 130B* will include the version 130B and the version 130D. However, the component dependency tree 153A* will include two alternative logical dependencies 111, one to the component 110B and one to the component 110C.

In general, in the present embodiments, unless where noted or where to demonstrate network connections or process flows, an arrow with a solid line indicates an instance of the dependency reference 131, an arrow with a dashed line represents a grouping reference 141, such as a variant reference 114 and component reference 111, and an arrow with a dotted line represents a logical dependency 111. A dot-dashed line, depending on labeling and context, may represent (i) a contextual dependency 133, (ii) an override reference 142, or (iii) an exclusion reference 144. Additional arrow types may also be further described in the present embodiments. In addition, for brevity "reference" and "ref" are used interchangeably in the present embodiments, the figures, and the accompanying text. Similarly, "unique identifier" and "UID" are used interchangeably in the present embodiments, the figures, and the accompanying text. The term "sub-component" is used to refer a component 110 that, in the state context, is not the root component 110* but is within the dependency tree of the root component 110*. A component 110 of a dependency tree may refer to any of the components 110, including the root component 110* and each sub-component 110.

Figure 1C:
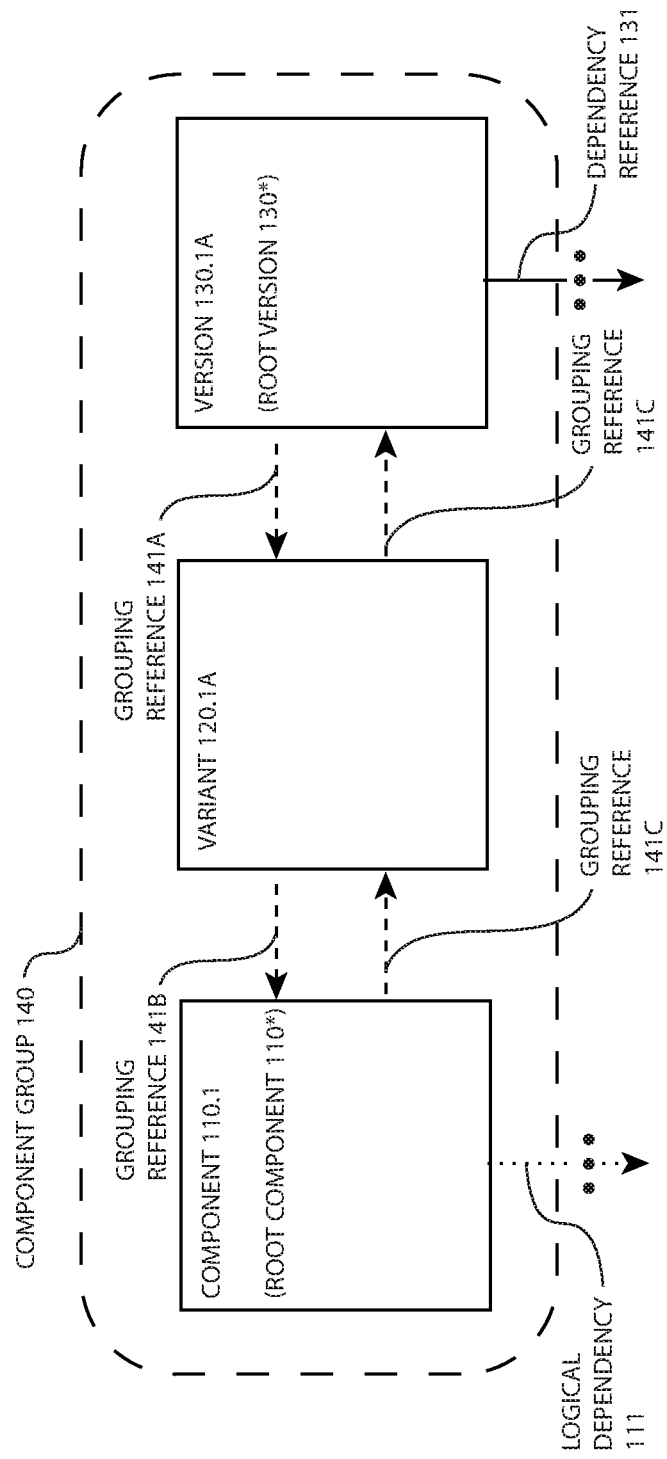
FIG. 1C further illustrates the data structure of FIG. 1B, including a component group comprising a component, a variant of the component, and a version of the variant, with grouping references drawn between each to define the component group, according to one or more embodiments.

FIG. 1C further illustrates the data structure of FIG. 1B, including a component group 140 comprising a component 110.1, a variant 120A of the component 110.1, and a version 130A of the variant 120A (and/or of the component 110.1), with grouping references 141 drawn between each to define the component group 140, according to one or more embodiments. While bi-directional references are shown (e.g., the variant 120A references the component 110.1, and the component 110.1 references the variant 120A), only one grouping reference 141 is needed to define the component group 140 (and/or other means of associating the component 110.1, the variant 120A, and/or the version 130A). In one or more embodiments, grouping references 141 may be defined as a type of acyclic reference within the dependency database 402.

In the embodiment of FIG. 1B and FIG. 1C, the version 130.1A includes a ".1" designation to illustrate its association within the same component group 140 as the component 110.1. However, in one or more other embodiments, the association within the same component group 140 is not designated with a decimal, for example where FIG. 1D where the version 130A and the version 130B are shown within the same component group 140 as the component 110.1 of FIG. 1D.

Figure 1D:
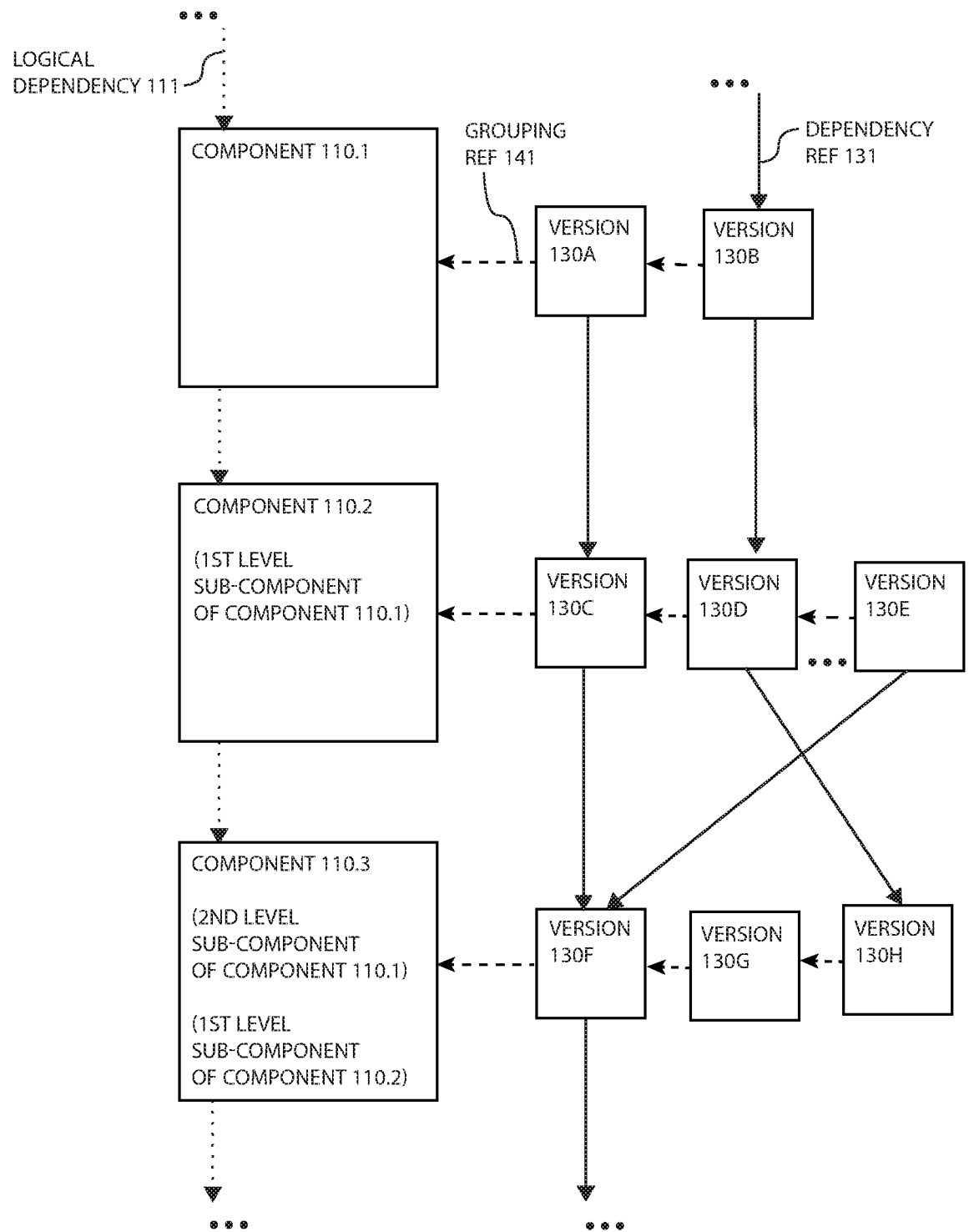
FIG. 1D is another data structure illustrating a first dependency tree of a first version of a component and a second dependency tree of a second version of the component, according to one or more embodiments.

FIG. 1D is another data structure illustrating a first dependency tree of a first version 130A of a component 110.1 and a second dependency tree of a second version 130B of the component 110.1, according to one or more embodiments. Variants 120 are not used within the embodiment of FIG. 1D. Component 110.1 may be a stand-alone instance of a component 110 (e.g., a product) and/or may be a sub-component 110 of another component (e.g., a component 110.0, e.g., a different product). The component 110.1 may be included within a component group 140, along with the version 130A of the component 110.1 and the version 130B of the component 110.1.

The version 130A may be selected as a root version 130A* (e.g., the root node 161) of a first dependency tree. The version 130A of component 110.1 draws a dependency reference 131 to the version 130C of the component 110.2 (and may also draw a dependency reference 131, not shown in the embodiment of FIG. 1D, to additional instances of the version 130 of components other than the component 110.2). The version 130C of the component 110B draws a dependency reference 131 to a version 130F of the component 110.3. The version 110.3 may then draw a dependency reference 131 to additional instances of the version 130, not shown.

The version 130B of the component 110.1 may alternatively be selected as a root version 130* of a second dependency tree. The version 130B of component 110.1 draws a dependency reference 131 to a version 130D of the component 110.2. The version 130B of component 110.2 may then draw a dependency reference 131 to the version 130H of the component 110.3. In the embodiment of FIG. 1D, a versions 130 of a "higher" level (not shown) may additional draw a dependency reference 131 to the version 130B of the component 110.1.

In the embodiment of FIG. 1D, where either the version 130A or the version 130B is selected as a root version 130* of a dependency tree, following all grouping references 141 shown in FIG. 1D will lead to the component 110.1, the component 110.2, and the component 110.3. In one or more embodiments, the component 110.1, the component 110.2, and the component 110.3 may be presented on the user interface 210 of the client device 200, along with information about the version 130A of the component 130A forming the root version 130*, such that the dependency tree of the root version 130* is more easily understandable to the user 101 as the dependency tree of the component 110.1.

Figure 1E:
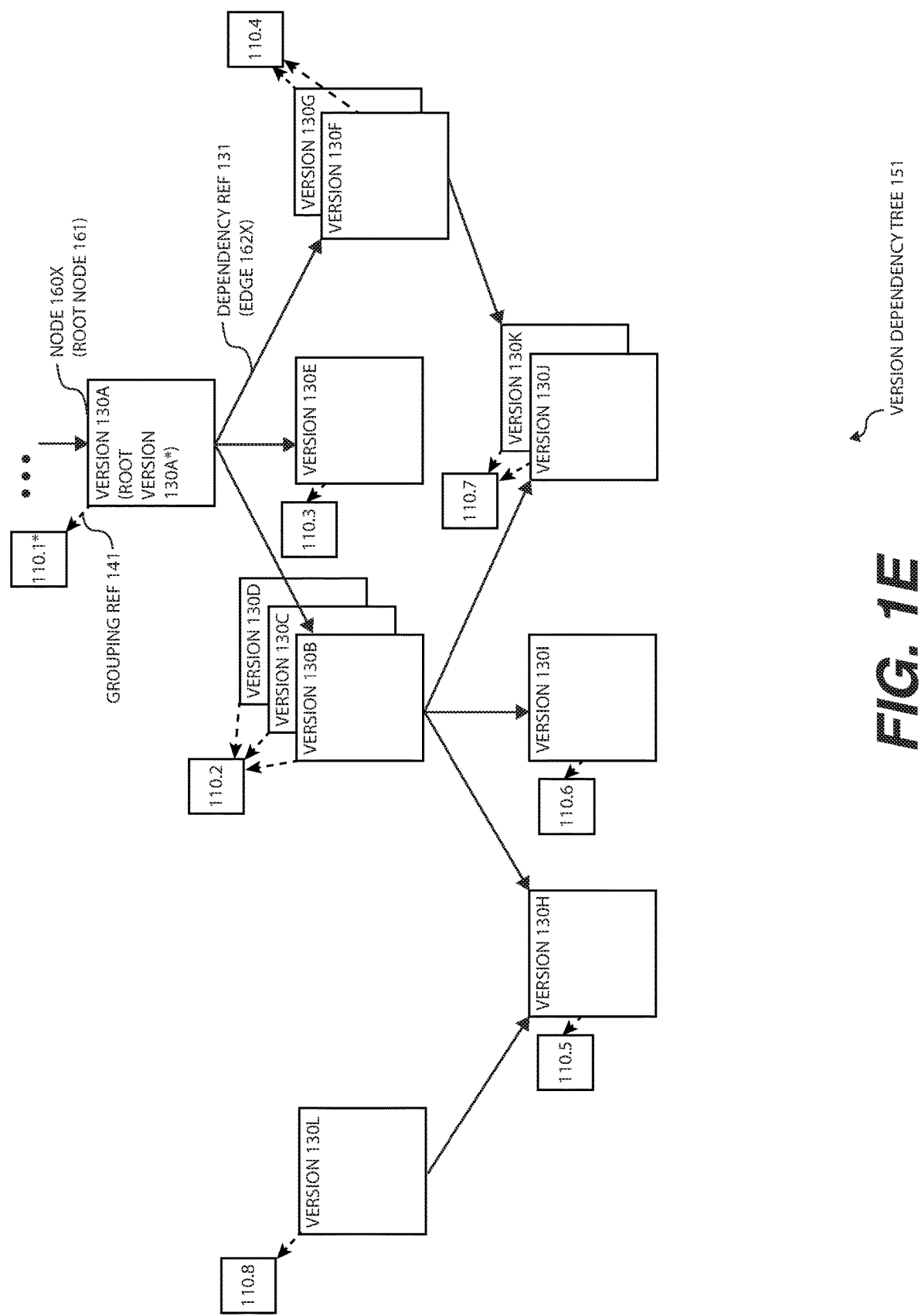
FIG. 1E is another data structure illustrating dependency references of a version of component and versions of sub-components of the component, and specifically a version dependency tree, each version a node of a directed acyclic graph and each dependency reference an edge of the directed acyclic graph, according to one or more embodiments.

FIG. 1E is another data structure illustrating dependency references 131 of a version 130A of component 110.1 and versions 130 of sub-components 110 of the component 110.1, and specifically a version dependency tree 151 that may be an instance of the dependency tree 150, each version 130 a node 160 (e.g., stored within the dependency database 402) of a directed acyclic graph, with the version 130A a root node 161 of the version dependency tree 151, and each dependency reference 131 an edge 162 of the directed acyclic graph, according to one or more embodiments. In the embodiment of FIG. 1E, the version 130A of component 110.1 depends upon and draws dependency references 131 to a version 130B of a component 110.2, a version 130E of a component 110.3, and a version 130F of a component 110.4. The version 130B of the component 110.2 depends upon and draws dependency references 131 to a version 130H of a component 110.5, a version 130I of a component 110.6, and a version 130J of a component 110.7. The version 130G of the component 110.4 draws a dependency reference 131 to the version 130K of the component 110.7, meaning that both the version 130J of the component 110.7 and the version 130K of the component 110.7 are dependencies and within the dependency tree of the version 130A* of the component 130.1* (e.g., both instances of the node 160 are referenced through a continuous chain of edges 162 from the root node 161). Additionally, a version 130L of a component 110.8 may reference the version 130H of the component 110.5, illustrating that, in one or more embodiments, a node 160 that is outside of the dependency tree of the root node 161 may still depend on, reference, and/or draw dependency references 131 to nodes 160 within the dependency tree of the root node 161. For example, the version 130H of the component 110.5 may represent a fastener used in many mechanical devices, or a block of software code or integrated circuit architecture usable in more than one software application or chip design, respectively.

FIG. 1F is yet another data structure illustrating the components 110 associated with the version dependency tree 151 of FIG. 1E, each component 110 having a logical dependency 111 to form a component dependency tree 153, according to one or more embodiments. The grouping references 141 of each version 130 of FIG. 1E may be followed within the dependency database 402 to its associated component 110, each grouping reference 141 an instance of the edge 162 within the directed acyclic graph and each component 110 an instance of the edge 162. FIG. 1F demonstrates a component dependency tree 153 that may be presented to the user 101 on the client device 200, according to one or more embodiments. Each logical dependency 111 may be inferred from dependency references 131 of the version dependency tree 151 and/or data specifying the dependency references 131 may be included within the dependency database 402.

Figure 1G:
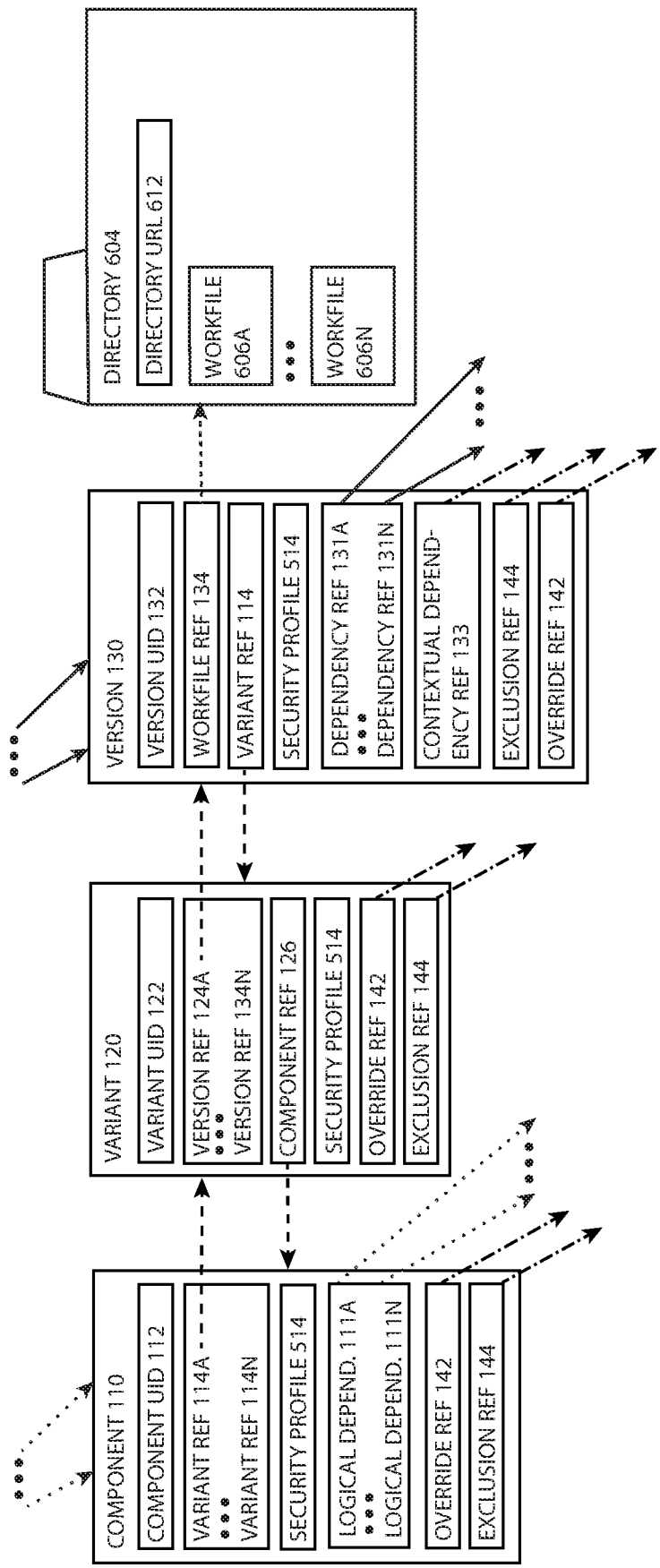
FIG. 1G is an example detail of the data structure of FIG. 1B, FIG. 1C, FIG. 1E, and/or FIG. 1F, and further illustrating the version referencing a directory comprising one or more workfiles, for example design files or software code, according to one or more embodiments.

FIG. 1G is an example detail of the data structure of FIG. 1B, FIG. 1C, Figure D, FIG. 1E, and/or FIG. 1F, and further illustrating the version 130 referencing a directory 604 comprising one or more workfiles 606A through 606N, for example design files or software code, according to one or more embodiments. In the embodiment of FIG. 1G, the component 110 is a data object stored in a computer memory, for example a node 160 of the dependency database 402. The component 110 comprises a component UID 112 by which the component 110 may be referenced (e.g., referenced by other nodes 160 of the dependency database 402 and/or queried). The component 110 may include one or more variant references 114A through 114N. Where the component group 140 associated with the component 110 does not include variants 120, the variant references 114 may be replaced by version references 124 for direct reference to one or more versions 130. The component 110 may include a security profile 514, as described below. The security profile 514 may be utilized as the security profile 514 for the component group 140. For example, where the version 130 of the component group 140 is queried, grouping references 141 may be followed to the component 110 of the component group 140 where the security profile 141 for all variants 120 and/or version 130 is stored for the component group 140.

The component 110 may include one or more logical dependencies 111. The logical dependencies 111 may be stored as references, e.g., as properties of the node 160 storing the component 110. In one or more other embodiments, the logical dependencies 111 may be inferred from the dependency references 131 of the versions 130 of the component 110. The component 110 may also have one or more logical dependencies 111 drawn to the component 110 from other components 110 (and/or have inferred logical dependencies 111 from the other components 110).

The component 110 may include one or more instances of an override reference 142 that may be drawn to a component 110, variant 120, and/or a version 130 to specify the component 110 that will be prioritized in any conflict between components 110, the variant 120 that will be prioritized in any conflict between variants 120, or the version 130 that will be prioritized in any conflict between version 130. The override reference 142 is further shown and described in conjunction with the embodiment of FIG. 9. The component 110 may include one or more instances of an exclusion reference 144. The one or more exclusion references 144 may each be drawn to one or more other components 110 that may be mutually exclusive if both are included in the same instance of the dependency tree (e.g., the version dependency tree 151 and/or the component dependency tree 153). The component 110 may be referenced by one or more exclusion references 144 of other components 110.

The component 110 may include one or more variants 120. The variant 120 comprises a variant UID 122 that by which the variant 120 may be referenced (e.g., referenced by other nodes 160). The variant 120 comprises one or more version references 124A through 124N, and may include a security profile 514, and described below. The variant 120 may also include a component reference 126 drawn to the component 110. The variant 120 may include one or more exclusion references 144 drawn to other variants 120, for example other variants 120 within the component group 140 of the variant 120. The variant 120 may include one or more override references 142 drawn to other components 110, variants 120, and/or version 130. Multiple layers of variant 120 may be defined from the version 130 to the component 110, in which case a variant 120 refers to another variant 120.

In the embodiment of FIG. 1G, the variant 120 may include one or more versions 130. Each version comprises a version UID 132, a workfile reference 134, and one or more dependency references 131A through 131N. The version 130 may also include a variant reference 114 (and/or a component reference 126, for example where no variants 120 are defined) and a security profile 514, as described below. The version 130 may be referenced by one or more dependency references 131, and may reference one or more versions 130. The version 130 may include one or more contextual dependency references 133 that are treated as and/or converted into a dependency reference 131 depending on a distance from the root version 130*. The version 130 may include one or more exclusion references 144 drawn to other version 130. The version 130 may also include one or more override references 135 drawn to other versions 130. The version 130 may be references by the contextual dependency references 133 and/or the override references 142 of other version 130.

The workfile reference 134 specifies a location of and/or points to one or more workfiles 606 associated with the version 130. For example, in one or more embodiments the workfile reference 134 specifies a directory 604 identified by a directory URL 612 (e.g., a file path, or file extension). The directory 604 comprises one or more workfiles 606A through 606N. For example, the workfile 606 may be an executable software code file such as an .exe, a software application written in a programming language (e.g., C++, Java, Golang), a markup language file (e.g., an .html or .css file), a server microservice, a software container (e.g., a Docker® container), or other forms of human and/or computer readable software. The workfile 606 may also be, for example, a circuit design, a circuit architecture, an application specific integrated circuit (ASIC) design, a microservice architecture design, a computer aided design (CAD) file and/or a CAD assembly file. Although not shown, the directory 604 may include one or more references to a version 130, a variant 120, and/or a component 110.

Each of the nodes 160 and/or edges 162 of the data structure is used to build the a set of data that is the dependency tree, referred to as the tree data 150. In one or more embodiments, the tree data 150 comprises data of a root node 161 that is a version 130 (e.g., a root version 130A* of a root component 110A*) and each version 130 on which the root version 130A* depends, that is, each instance of a versions 130 in which an unbroken chain of dependency references 131 can be drawn from the root version 130* to a given instance of the version 130. Each version 130 within the tree data 150 need not contain all data of the version 130 stored in the dependency database 402. Rather, a unique identifier of each version 130 (e.g., the version UID 132) may be included such that the tree data 150 may be transmitted as an array of version UIDs 132. Optionally, the dependency references 131 and/or data specifying relationships between and among the versions 130 may be included in the tree data 150. Optionally, the tree data 150 may include the workfile ref 134 of each version 130. Alternatively, the dependency references 131 and/or the workfiles references 134 may be independently request (e.g., by the clinet device 200) using one or more unique identifiers of the versions 130 within the tree data 150.

Figure 2:
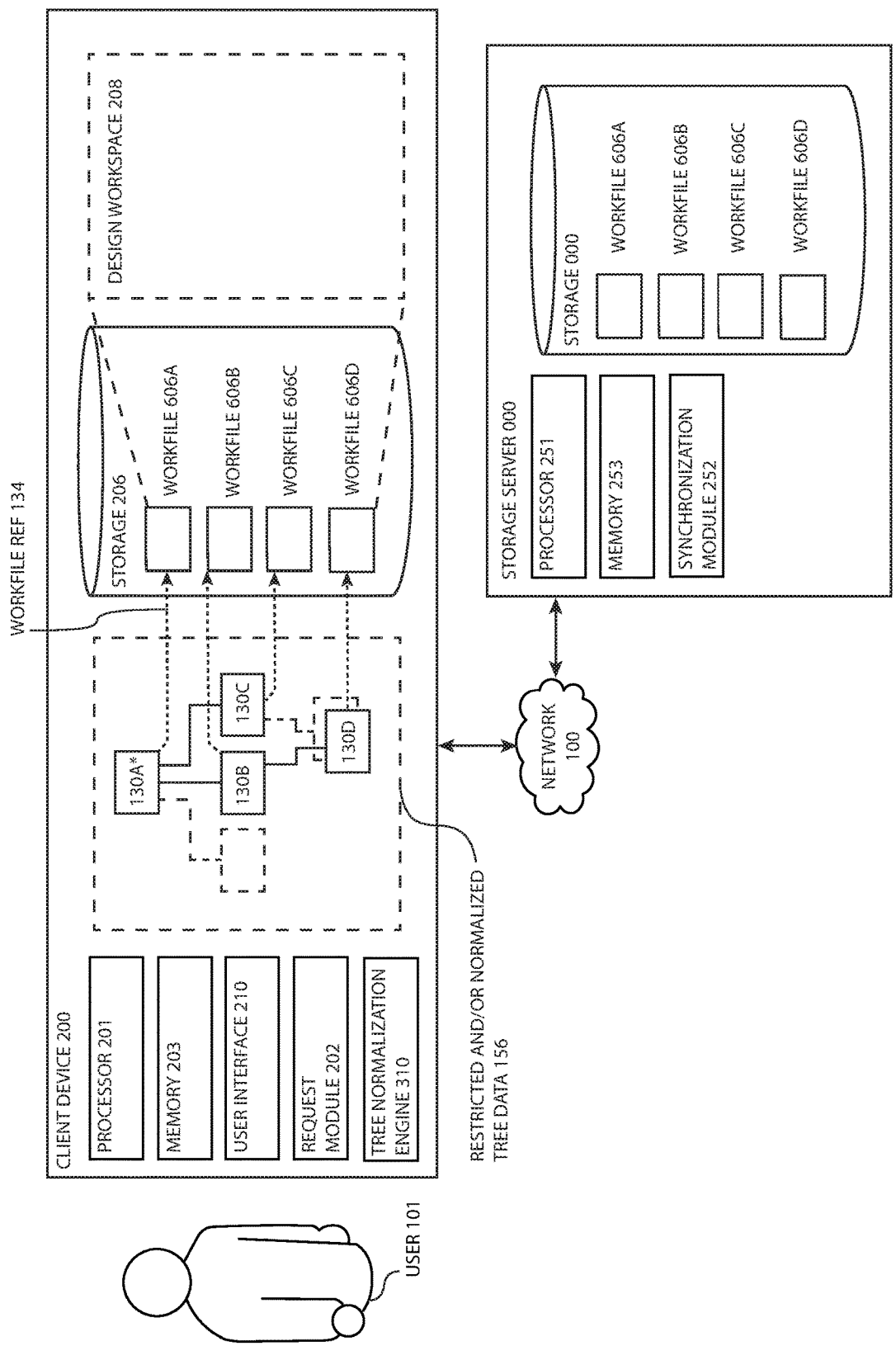
FIG. 2 illustrates the client device of FIG. 1A, comprising a request module, a tree normalization engine, a storage for workfiles associated with a dependency tree, and a design workspace, according to one or more embodiments.

FIG. 2 illustrates the client device 200 of FIG. 1A, comprising a processor 201, a memory 203, a request module 202, a storage 206 that may store in computer readable memory one or more workfiles 606 associated with one or more dependency tree of components 110 and/or versions 130, a design workspace 208 comprising the workfiles 606 associated a tree data 150, and a user interface 210, according to one or more embodiments. The client device 200 may include a unique identifier (not shown), such as a MAC address, an operating system identifier, a static IP address, and/or another way to identify the client device 200. The client device 200 may also include the tree normalization engine 320, in one or more embodiments, as shown and described in conjunction with FIG. 3. Additionally, the client device 200 may store workfiles 606 on a remote storage server 250 associated with the client device 200 (which may be distinct from the file server 600). For example, the client device 200 may act as a cloud storage system accessible through the network 100 for workfiles 606 that the user 101 is currently working with and/or modifying. The storage server 250 may include a synchronization module 252 to backup workfiles 606 and synchronize workfiles 606 of the storage 206 with the workfiles 606 of the storage 256.

The client device 200, for example, may be a desktop computer, a laptop computer, and/or a server computer. The client device 200 may even be a mobile device, tablet computer, and/or a voice controlled computer. The processor 201 is a computer processor that can execute stored instructions sets, and the memory 203 is a computer readable memory for storing instruction sets and associated data (the memory 203 may be, e.g., RAM, a solid-state memory such as a Serial ATA ("SATA") drive). The user interface 210 may include but is not limited to a graphical user interface of a display, a voice interface, a keyboard and/or mouse, a haptic controller, and additional means for working on the product, the component, and/or one or more workfiles 606.

The request module 202 comprises computer readable instructions that when executed on a computer processor generates a request (e.g., the request 103) to retrieve a dependency tree of a component 110 and/or a version 130 of a component 110. For example, a summary of available versions 130 may be presented to the user 101 on the graphical user interface and the user may select a version 130 to act as a root node 161 (e.g., the root version 130*) of a version dependency tree 151. The request module 202 generates a request 103 with a unique identifier of a root node 161, for example the root component 110* and/or the root version 130*. For example, if a dependency tree of a version 130 of a component 110 is to be requested, a unique identifier of the version 130 (e.g., the version UID 132) is included in the request 103. Additionally, the unique identifier of the user 101 and/or the client device 200 may be included in the request 103 for authentication, security, to apply preferences of the user 101 and/or the client device 200, and for additional reasons. The unique identifier of the version 130, the user 101 and/or the client device 200 may be a text string that is a version name, a randomly generated string of numbers and characters (e.g., the output of a SHA-256 algorithm), a globally unique identifier (GUID), and/or other indicia of discrete selection. The request 103 is transmitted to the coordination server 300.

Figure 3:
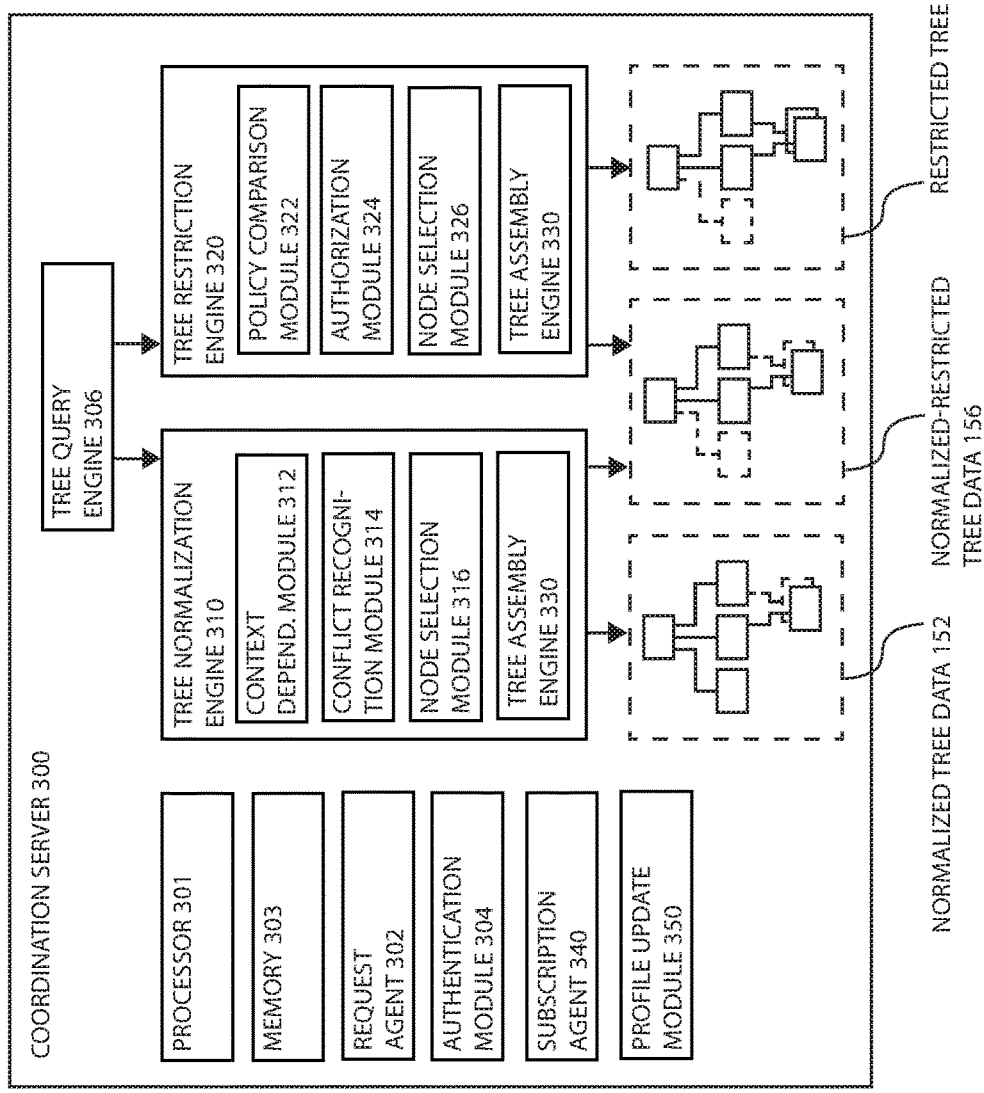
FIG. 3 illustrates the coordination server of FIG. 1A, comprising a request agent, an authentication module, a subscription agent, a tree query engine, a tree restriction engine, a tree normalization engine, and a tree assembly engine, according to one or more embodiments.

The coordination server 300, as shown and described in conjunction with FIG. 3 and throughout the present embodiments, returns the tree data 150 to the client device 200. The tree data 150 may be normalized (e.g., the normalized tree data 152), restricted (e.g., the restricted tree data 154), or, as shown in the embodiment of FIG. 2, both normalized and restricted (e.g., the normalized-restricted tree data 156). In the embodiment of FIG. 2, the normalized-restricted tree data 156 shows four workfile references 134 each drawn to a different instance of the workfile 606. The client device 200 may retrieve the four workfiles 606 by sending a request 107 with a value of the workfile reference 134 for each version 130 to the file server 600 over the network 100. The workfiles 606 are returned over the network 100 and stored in the storage 206 (and/or the storage 256). The storage 206 may be, for example, the memory 203, a magnetic spinning disk, or another data storage device for storing computer readable data. The workfiles 606 of the normalized-restricted tree data 156 form the design workspace 208 of the product that the user 101 may work on, modify, manage, and/or contribute to. Where the design workspace 208 is generated from the normalized tree data 152, the design workspace 208 may be referred to as a normalized design workspace. Where the design workspace 208 is generated from the restricted tree data 151, the design workspace 208 may be referred to as a restricted design workspace.

FIG. 3 illustrates the coordination server 300 of FIG. 1A, comprising a processor 301, a request agent 302, a memory 303, an authentication module 304, a tree query engine 306, a tree normalization engine 310, a tree restriction engine 320, a tree assembly engine 130, a subscription agent 340, and a profile update module 350, according to one or more embodiments. The processor 301 is a computer processor that can execute stored instructions sets, and the memory 303 is a computer readable memory for storing instruction sets and associated data (the memory 303 may be, e.g., RAM, a solid-state memory).

The request agent 302 comprises computer readable instructions that when executed on a computer processor receive and parse a request to: (i) retrieve data of the dependency database 402 that can be returned to the user 101 to enable selection of a root node 161 (e.g., a list of the components 110 and/or versions 130 and/or metadata of either); (ii) retrieve a dependency tree of a component 110 and/or version 130; (iii) retrieve a component group 140; and/or (iv) retrieve one or more workfiles 606 associated with a tree data 150. The request agent 302 may analyze a request type, may check whether data that may be required to complete the request (e.g., the request 103) is included, may extract unique identifiers necessary for retrieving data, and/or forward or call for additional data required by processes of the coordination server 300, for example, to generate the request 105 and/or forward the request 107 of the client device 200.

The authentication module 304 comprises computer readable instructions that when executed on a computer processor causes the processor to receive and parse a unique identifier of a user 101 and/or a client device 200 (e.g., the user UID 526) along with one or more security credentials of the user 101 and/or the client device 200. The authentication module 304 may determine the asserted identity of the user 101 and/or client device 200 exists and whether the asserted identity is active by querying a user profile 524 of the security server 500, for example with the unique identifier of the user 101 and/or the client device 200. The authentication module 304 may verify the one or more credentials to validate the asserted identity of the user 101 and/or the client device 200 generating a request (e.g., the request 103, the request 107) and/or communicating within the network of FIG. 1A. The authentication module 304 may utilize a single factor authentication (e.g., a password), double factor authentication (e.g., a password and a physical device such as a smartphone or fob), or triple factor authentication (e.g., a password, a physical device such as a smartphone, and a biometric such as a fingerprint scan).

The tree query engine 306 comprises computer readable instructions that when executed on a computer processor extracts a unique identifier of a root node 161 (e.g., a root version 130* to act as a root of a dependency tree), may designate a type of requested dependency tree (e.g., a version dependency tree 151, a component dependency tree 153), and transmits the unique identifier of the root node 161 to the design server 400 to be queried against the dependency database 402. The tree query engine 306 may further comprise computer readable instructions that when executed on a computer processor receives the tree data 150 from the query thrown against the dependency database 402 and passes the tree data 150 into the tree restriction engine 320 and/or the tree normalization engine 310.

The organization may configure the network of FIG. 1A and/or each of its servers and components to normalize and/or restrict the tree data 150, and/or specify under what circumstances to do so. For example, the organization may specify in a configuration file stored on the server 300 that may specify normalization for a certain type of conflict between versions 130.

The tree normalization engine 310 comprises computer readable instructions that when executed on a computer processor selects a node 160 where two or more nodes 160 conflict, the selection made according to a conflict resolution rule. The tree normalization engine 310 comprises computer readable instructions that when executed on a computer processor may remove contextually dependent nodes 160, the inclusion of which depend may depend on their distance in edges 162 from the root node 161 (e.g., dependency level under the root node 161) within a dependency tree of the root node 161. The tree normalization engine 310 comprises a context dependency module 312, a conflict recognition module 314, a node selection module 316, and a tree assembly engine 330.

The context dependency module 312 comprises computer readable instructions that when executed on a computer processor detect a contextual dependency (e.g., a contextual dependency reference 133) within the tree data 150. Inclusion of a node 160 referenced by a contextual dependency reference 133 may be determined with a property and/or an attribute value pair of the node 160 that may, for example, specify a threshold distance, measured in edges 162 from the root node 161. For example, a version 130X may include a contextual dependency of "less than or equal to two," meaning that the contextual dependency reference 133 drawn to the version 130X will be included (e.g., as if a dependency reference 131) where the component 110 associated with the version 130X is either a 1st-level sub-component or a 2nd level sub-component of the component 110 associated with the root version 130A* that may be the root node 161 of the dependency tree. Example processes that may be utilized by the context dependency module 312 are shown and described in conjunction with the embodiment of FIG. 10.

The conflict recognition module 314 comprises computer readable instructions that when executed on a computer processor determines a conflict between two or more nodes 160 within the dependency tree. The conflict may be defined by a first dependency reference 131 drawn to a version 130A, and a second dependency reference 131 drawn to a version 130B, where the version 130A and the version 130B are within the same component group 140 (e.g., draw grouping references 141, including via one or more variants 120, to the same instance of a component 110). For example, the conflict recognition module 314 may submit the version UID 132 of each version 130 to the dependency database 402 to receive its associated component UID 112 within the component group 140, then compare each returned component UID 112. Where a match occurs in the component UID 112, and the associated version UIDs 132 are not identical, a conflict may be determined between the versions 130A and the version 130B. The conflict may also be defined by the inclusion of two or more versions 130 associated with mutually exclusive components 110 within the dependency tree. For example, where a component 110A calls for a mechanical fastener in a design but may be either a rivet (e.g., a component 110B) or a bolt (e.g., a component 110C), conflicting components 110 may arise. Example conflicts are shown and described in conjunction with the embodiment of FIG. 15.

The node selection module 316 comprises computer readable instructions that when executed on a computer processor applies a conflict resolution rule to each conflict identified by the conflict recognition module 314. For a contextual dependency, the distance of the node 160 to which the contextual dependency is drawn may be measured from the root node 161 and compared to a value of the contextual dependency to determine if it meets and/or exceeds the value. In one or more embodiments, the conflict resolution rule may automatically select the version 130 and/or the component 110 that is at least one of latest in a timestamp or latest in a version number. For mutually exclusive components 110, a priority may be specified in properties of a node 160, and/or in association with the exclusion reference 144. Alternatively or in addition, the client device 200 may be queried for input on the selection and/or be provided with a conflict report, for example a manual input provided by the user 101 on the user interface 210. The node selection module 316 may then discard any unselected unique identifiers. For example, where a version 130A is selected over version 130B, the version UID 132 of version 130A is retained in the memory 303 and the version UID 132 of version 130B may be discarded from the memory 303, along with, in one or more embodiments, all dependencies not referenced by another version 130. For example, where a version 130Y of a component 110.8 draws a dependency reference 131 to a version 130Z of a component 110.9 and the version 130Y is deleted from the tree data 150, then the version 130Z may also be deleted (along with all dependencies) unless another version 130 validly existing within the tree data 150 draws a dependency reference 131 to the version 130Z.

The tree assembly engine 330 comprises computer readable instructions that when executed on a computer processor rebuilds the tree data 150 as the normalized tree data 152 from remaining unique identifiers (e.g., version UIDs 132, component UIDs 112), and any workfile references 134, dependency references 131, metadata, and/or additional data. The tree assembly engine 330 may prepare or format the normalized tree data 152 to a standard for communication to the client device 200, for example an XML or a JSON format. In one or more embodiments, a copy of the normalized tree data 152 that was returned to the client device 200 may be retained, for example by the coordination server 300. The copy may be used as an audit log, and/or to determine which workfiles 606 are located on the client device 200 without communicating with the client device 200 (e.g., as may be used by the tree re-evaluation module 709 of FIG. 7).

The tree data 150 may also be submitted to the tree restriction engine 320. The tree restriction engine 320 comprises computer readable instructions that when executed on a computer processor restricts the tree data 150 such that one or more nodes 160 and/or dependencies of the one or more nodes 160 are removed from the tree data 150 to form the restricted tree data 154. The tree restriction engine 320 may comprise a profile comparison module 322 that extracts a permission profile 504 associated with the user 101 and/or the client device 200 generating the request 103 and compares the permission profile 504 either to the unique identifier of each node 160 of the tree data 150, and/or compares the permission profile 504 to a security profile 514 associated with one or more nodes 160 of the tree data 150. The permission profile 504 and the security profile 514 are described in greater detail in conjunction with the embodiment of FIG. 5.

The authorization module 324 comprises computer readable instructions that when executed on a computer processor determines an authorization status for each node 160 of the tree data 150. For example, in one or more embodiments, a node 160 (e.g., that may store data of a version 130) will not be authorized if its unique identifier (e.g., the version UID 132) is absent from a list of version UIDs in the permission profile 504 associated with the user 101. In one or more other embodiments, a node 160 is unauthorized if the permission profile of the user 101 has a security level of "2" but the security profile 514 of the node 160 specifies a security level of "3" for inclusion of the node 160 in the restricted tree data 154.

The node restriction module 326 comprises computer readable instructions that when executed on a computer processor removes unauthorized nodes 160 from the tree data 150 held in the memory 303, may terminate dependency reference 131 following at an unauthorized instance of the node 160, and also may delete each dependent node 160 that is not independently referenced through an authorized chain of edges 162 and nodes 160 extending to the root node 161 (e.g., to create a terminating branch 191). An example of a process that may be executed by the node restriction module 326 is shown and described in conjunction with the embodiments of FIG. 26 and FIG. 27. The tree assembly engine 330 function as described in conjunction with the tree normalization engine 310, resulting in the production of the restricted tree data 154.

Where both the tree restriction engine 320 and the tree normalization engine 310 operate on data sequentially, order of operations may define different results and/or contents of the tree data 150. For example, in one or more preferred embodiments the tree restriction engine 320 may operate on the tree data 150 first. Where the tree restriction engine 320 operates first, conflicts that would otherwise be determined within the tree normalization engine 310 may not arise. Similarly, where the tree normalization engine 310 operates first, unauthorized nodes 160 that would otherwise be determined within the tree restriction engine 320 may not arise.

In the embodiment of FIG. 3, the tree data 150 may be generated indiscriminately and/or speculatively without input determining whether a node 160 and/or branch of the dependency tree will be included, then is narrowed by the tree normalization engine 310 and/or the tree restriction engine 320. Alternatively or in addition, the tree query engine 306 may execute concurrently with the tree normalization engine 310 and/or the tree restriction engine 320 (e.g., both finishing a level of dependency before moving onto another level of dependency within the tree data 150). Concurrent operation may also pass the forming tree data 150 at different stages of formation between the tree normalization engine 310 and the tree restriction engine 320.

Figure 4:
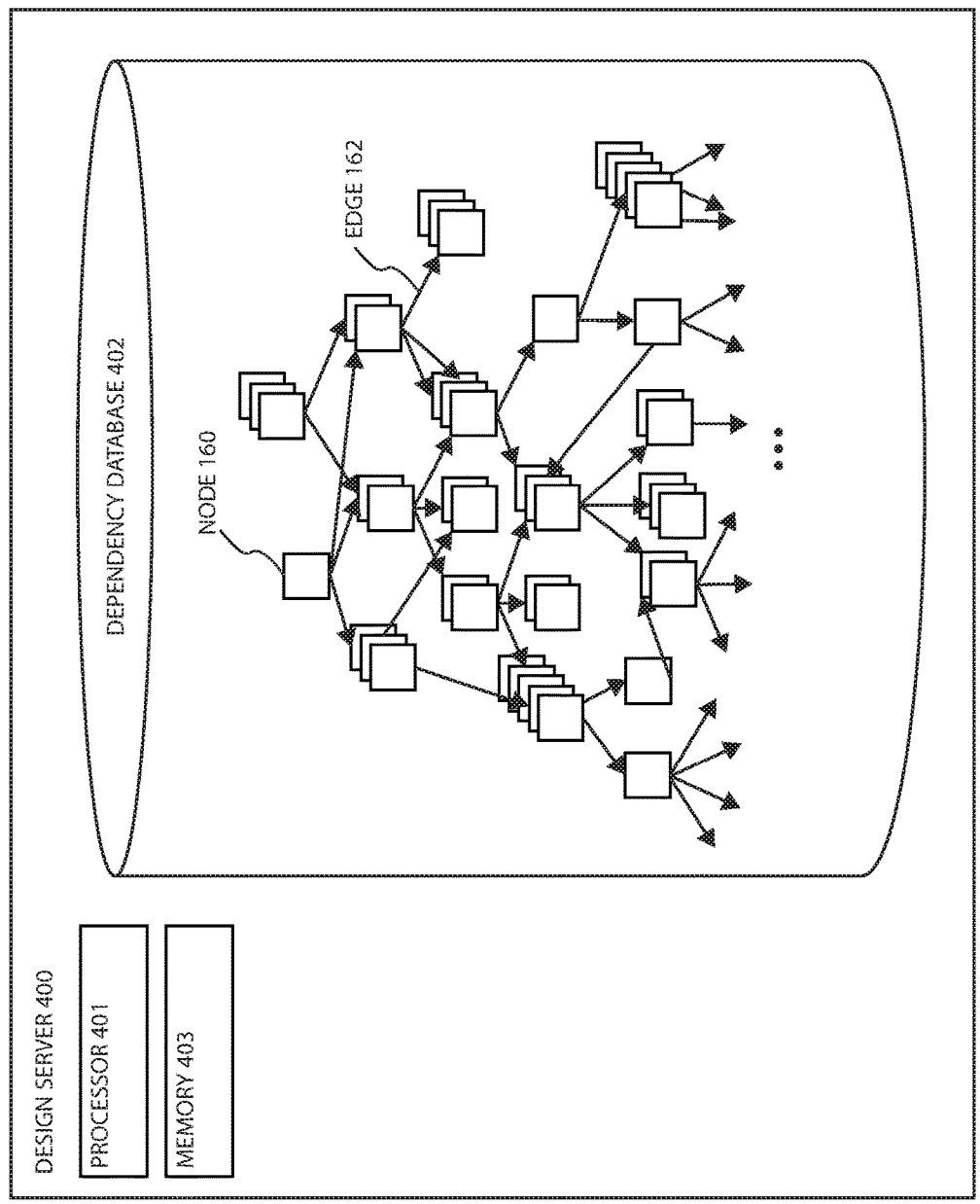
FIG. 4 illustrates a design server of FIG. 1A comprising a dependency database that comprises a plurality of components, variants, and/or versions stored as nodes that may define a graph data structure, according to one or more embodiments.

FIG. 4 illustrates a design server 400 including a processor 401, a memory 403, a tree retrieval routine 404, and a dependency database 402 comprising a plurality of components 110, variants 120, and/or versions 130 stored as nodes 160 and connected through references stored as edges 162, according to one or more embodiments. The processor 401 is a computer processor that can execute stored instructions sets, and the memory 403 is a computer readable memory for storing instruction sets and associated data (the memory 403 may be, e.g., RAM, a solid-state memory).

The dependency database 402 comprises: (i) data representing the components 110, variants 120, and/or versions 130, each as a node 160, and (ii) the relationships between nodes 160 as edges 162 (e.g., the variant ref 114, the version ref 124, the workfile ref 134, the dependency ref 131, the component ref 126, the exclusion reference 144, a contextual dependency 133, and/or other relationships). The dependency database 402 may store the data structures of each of the components 110, variants 120, and/or versions 130, and their associated references, as shown and described in conjunction with FIG. 1B, FIG. 1C, FIG. 1E, FIG. 1F, FIG. 1G. In one or more embodiments, the nodes 160 may have one or more types of references defined to be acyclic, e.g., a directed acyclic graph (e.g., the dependency references 131 of the versions 130). In one or more embodiments, the dependency database 402 and/or the tree retrieval routine 404 may be implemented with a commercial graph database (e.g, Neo4j®, SAP HANA®, Oracle Spatial and Graph®, etc.).

The tree retrieval routine 404 comprises computer readable instructions that when executed on a computer processor queries the dependency database 402 with a unique identifier of a node 160, evaluates available references of the node 160, and may follow one or more of the available edges 162 of the node 160 to a next node 160. For example, the tree retrieval routine 404 may receive a version UID 132, query the dependency database 402 for the version 130 identified by the version UID 132, determine that one or more dependency references 131 are included in the version 130, follow one or multiple of the one or more dependency references 131 by extracting a next set of version UIDs 132 associated with each, and repeat the querying process for each extracted version UID 132 of the next set of version UIDs 132. Each version UID 132 extracted may be stored in the memory 403 as the tree data 150, optionally along with data specifying their relationship and/or other additional data such as metadata. Similarly, where a component dependency tree 153 is to be generated, the tree retrieval routine may, for each version 130 within a version dependency tree 151, follow a variant reference 136 of the version 130 specifying a variant UID 122, store the variant UID 122, and then follow a component ref 126 specifying a component UID 112, and store the component UID 112. The tree retrieval routine 404 may also query a component 110 with the component UID 112 and follow all instances of grouping references 141 to assemble all nodes 160 within a component group 140. The tree retrieval routine 404 may determine the tree data 150 is complete when no further dependency references 131 branching from the root node 161 are available to follow, and may then return the tree data 150 to the coordination server 300.

Figure 5:
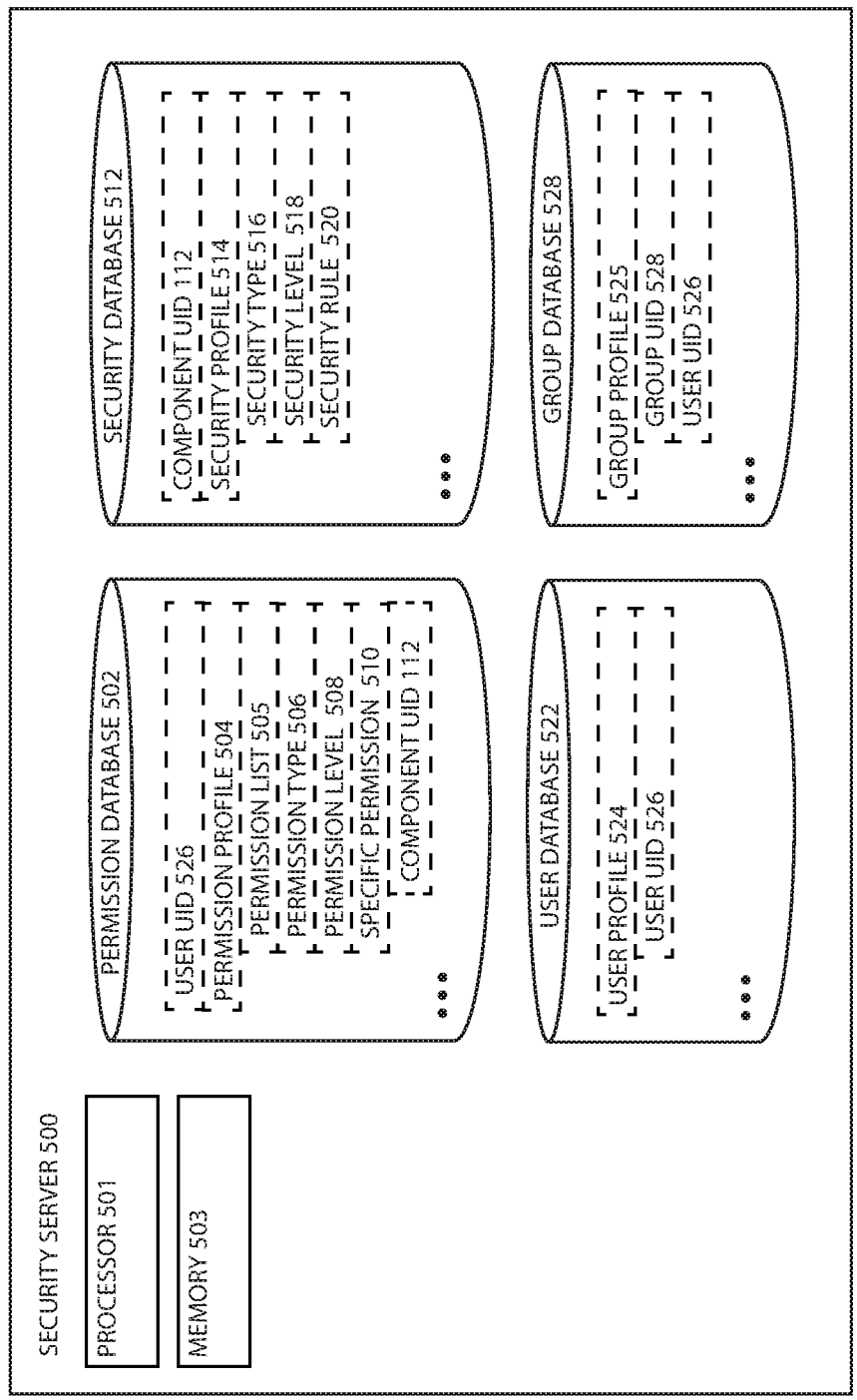
FIG. 5 illustrates the security server of FIG. 1A, comprising a permission database associating a unique identifier of a user with a unique identifier associated with a component, a user database having user profiles, and a security database associating a security profile with a unique identifier within a component group, according to one or more embodiments.

FIG. 5 illustrates the security server 500 of FIG. 1A, comprising a processor 501, a memory 503, a permission database 502 associating a unique identifier of a user 101 (e.g., a user UID 526) with a unique identifier within a component group 140 (e.g., a component UID 112, a variant UID 122, and/or a version UID 132), a user database 522 comprising user profiles 524, a security database 512 associating a security profile 514 within a component group 140 (e.g., a component UID 112, a variant UID 122, and/or a version UID 132), and a group database 528 in which two or more user profiles 504 may be grouped and administered under a group profile 525, according to one or more embodiments. The processor 501 is a computer processor that can execute stored instructions sets, and the memory 503 is a computer readable memory for storing instruction sets and associated data (the memory 503 may be, e.g., RAM, a solid-state memory). The permission database 502, the security database 512, the user database 522, and/or the group database 528 may be implemented with commercially available databases software, for example an Oracle® relational database, a MySQL open-source relational database, a graph database (e.g., Neo4j®), and additional databases, whether relational, graph, or other organizational models. The permission database 502 comprises the permission profile 504 specifying one or more nodes 160 that the user 101 and/or the client device 200 is authorized to view, include within a dependency tree, and/or retrieve associated workfiles 606 from the file repository 602.

The permission profile 504 is associated with a user profile 504 and/or a group profile 525. The permission profile 504 may specify a permission list 505, a permission type 506, a permission level 508, and/or a specific permission 510. The permission list 505 may be a list of the components 110, variants 120, and/or version 130 that the user 101 is authorized to access within the dependency database 402. Alternatively, the permission list 505 may specify the components 110, variants 120, and/or version 130 that the user 101 is not authorized to access within the dependency database 402. The list may be comprised of unique identifiers (e.g., the component UID 112, the variant UID 122, and the version UID 132).

The permission type 506 may specify a type of permission. For example, type of permission may specify "2018" versions, which may permit the user only receive nodes 160 within the restricted dependency tree 154 that were defined on or before 2018. Other types of permission may include whether the node 160 is actively being developed, whether the node 160 has a known bug or error associated with it (e.g., through a log file), and other types that may be associated with one or more of the nodes 160.

The permission level 508 may specify an access level of the user 101. For example, access levels may be defined on a scale of "one" to "five", with "one" designating a low-level access and "five" designating a high-level access. For example, a database administrator may have a level five access, whereas a new outside contractor may have a level one access.

The specific permission 510 may specify a specific access rule. For example, while in one or more embodiments a node 160 is authorized when it can be connected to the root node 161 through at least one chain of authorized nodes 160 and edges 162, the specific permission 510 may specify that the user 101 may not access a given node 160 regardless of other indicia of authorization (e.g., even if within an access level of the user 101). This may be useful, for example, where the organization would like to be certain that no dependency chain of a user 101 can reach a specific component 110, variant 120, and/or version 130. In one or more other embodiments, the specific permission 510 may specify an expiration date that may terminate access associated with a user profile 524 and/or a group profile 525.

In the embodiment of FIG. 5, the user UID 526 of a user 101 is associated with a permission profile 504. However, many other configurations are possible. For example, a permission profile 502 may be set up with a standard authorization right (e.g., a level 2 access right, all versions 120 necessary for a certain product under development, etc.), and then may have one or more users 101 and/or a group profiles 525 associated.

The security database 512 comprises one or more security profiles 514. The security profile comprises a security type 516, a security level 516, and/or a security rule 520. The security type 516 may specify data usable to compare to the permission type 506. The security type 516 may be a read access, a write access, an owner type whereby an instance of the user 101 that is an owner may specify which other instances of the user 101 may have read and/or write access, and an administrative (e.g., admin) type that may have read and write permissions along with the ability to grant either or both regardless of whether the admin is the owner. The permission type 506 may specify one or more nodes 160 for which the user 101 has read, write, ownership, or admin access. The security rule 520 may specify other rules for security, for example, that the user 101 must have been a part of the organization for a certain time period (e.g., as measured from creation of a user profile 524).

The security level 518 specifies a security level required for access, for example "level one" or "level two." In one or more embodiments, the security level 518 may designate a type of personnel, for example "contractor," "employee", and/or "administrator", and/or a position or title, for example "designer," "project manager," "senior engineers," and/or "architect."

The user database 522 comprises one or more user profiles 522. Each user profile 522 may represent a person (e.g., the user 101) and/or a device 200 (e.g., a desktop computer, a workstation, etc.). The user profile 524 comprises a user UID 526, and may include additional data about the user 101 such as a name, address, position and/or title within an organization, etc. The user profile 524 may also include data sufficient to authenticate the user 101 and/or the client device 200, for example a hash value of a password, biometric data, etc. Similarly, the group database 528 may include one or more group profiles 525. The group of the group profile 525 may represent, for example, a project group, a type (e.g., a contractor, an employee), a position (e.g., an engineer, a senior engineer, and architect), and/or additional user groupings. The group profile 525 comprises one or more user UIDs 526 that are associated with the group profile 525. A user UID 526 may be associated with one or more instances of the group profile 525. The group profile 525 may also have a unique identifier, the group UID 528.

Figure 6:
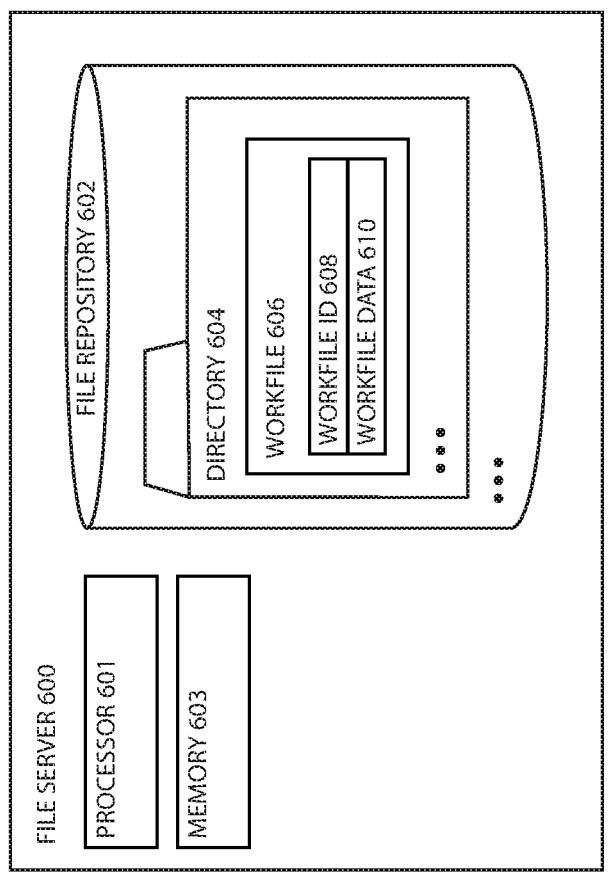
FIG. 6 illustrates a file server comprising a file repository with directories each corresponding to a version of a component in the dependency database of FIG. 4 and each directory comprising one or more workfiles, according to one or more embodiments.

FIG. 6 illustrates a file server 600 comprising a processor 601, a memory 603, and a file repository 602 with one or more directories 604, each directory 604 corresponding to a version 130 of a component 110 in the dependency database 402 of FIG. 4 and each directory 604 comprising one or more workfiles 606, according to one or more embodiments. The processor 601 is a computer processor that can execute stored instructions sets, and the memory 603 is a computer readable memory for storing instruction sets and associated data (the memory 603 may be, e.g., RAM, a solid-state memory). The file repository 602 stores workfiles 606 such that one or more workfiles 606 associated with a version 130 included within a tree data 150 may be specified and retrieved by the client device 200, for example in the request 107. In one or more embodiments, and as shown in the embodiment of FIG. 6, the file repository 602 may organize each set of workfiles 606 associated with a version 130 into a directory 604. Each workfile 606 comprises an identifier, the workfile ID 608, and data of the workfile 606, the workfile data 610. For example, the directory 604 may be a file directory within a hierarchical file system (HFS), and each of the one or more workfiles 606 may be an executable file, CAD file, plan, specification, diagram, design file, etc., where the workfile ID 608 is a file name and the workfile data 610 is the contents of the data.

In one or more embodiments, the workfiles 606 may be stored such that only changes to each workfile 606 committed by one or more user 101 are stored. For example, if only one line of software code of a workfile 606 is modified and committed by a user 101 to the file repository (e.g., to fix a security vulnerability in the software code), two instances of the version 110 may be defined in the dependency database 402, while the file repository 602 may track only the modified line of software code (e.g., using a version control software rather than duplicating the entire workfile 606). For example, the file repository 602 may be implemented by a commercial database system such as Perforce®.

The file server 600 may receive the request 107 of the user 101 and/or the client device 200, which may include one or more workfiles references 134. For example, the workfile reference 134 may specific the directory 604 by using a uniform resource locator (URL) and/or a file path of a file system. The file server 600 may then return each of the one or more workfiles 606 to the client device 200 for generation of the design workspace 208.

Figure 7:
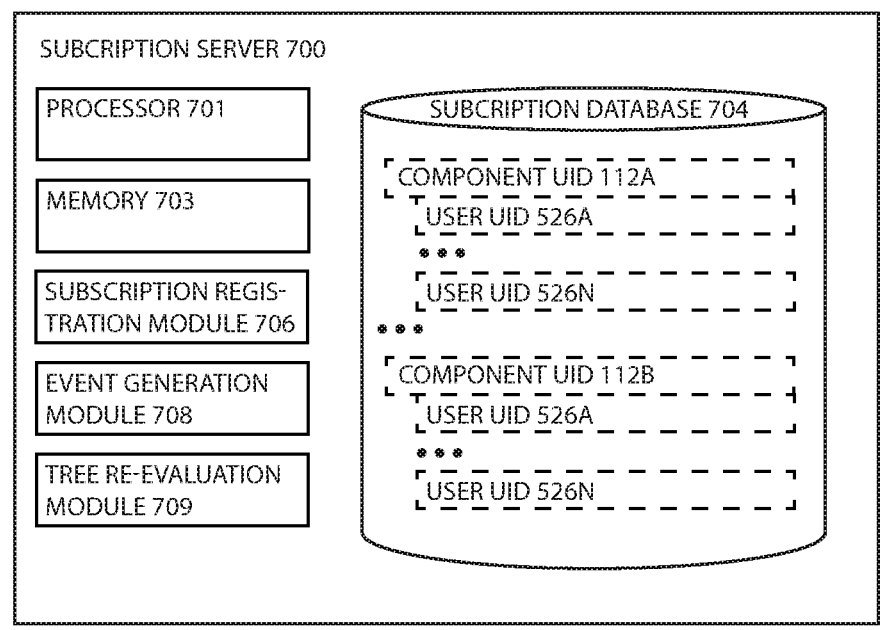
FIG. 7 illustrates a subscription server comprising an event generation module and a subscription database comprising a unique identifier of a user associated with a unique identifier within a component group, according to one or more embodiments.

FIG. 7 illustrates a subscription server 700 comprising a processor 701, a memory 703, a subscription registration module 706, an event generation module 708, a tree re-evaluation module 709, and a subscription database 704 comprising a unique identifier of a user 101 (e.g., the user UID 526) associated with a unique identifier within a component group 140 (e.g., the component UID 112, the variant UID 122, and/or the version UID 132), according to one or more embodiments. The processor 701 is a computer processor that can execute stored instructions sets, and the memory 703 is a computer readable memory for storing instruction sets and associated data (the memory 703 may be, e.g., RAM, a solid-state memory). The subscription database 704 comprises one or more unique identifiers of one or more nodes 160 of the dependency database 402 to which the user 101 may subscribe to an event. For example, the event may include definition within the dependency database 402 of a new version 130, a new variant 120, and/or a new component 110 and/or a definition of a new reference (e.g., the dependency reference 131). The event may be an error log, a bug notification, and/or other messages relevant to a node 160.

In one or more embodiments, a user 101 may subscribe to a component 110 (and/or an entire component group 140), e.g., by associating the user UID 526 with the component UID 112. When a new variant 120 and/or version 130 of the component 110 is defined and/or, the component UID 112 may be extracted from the dependency database 402 and submitted to the subscription server 700 to determine which users 101 should be notified and/or receive workfiles 606 associated with a new version 130. In one or more other embodiments, users 101 may subscribe to variants 120. For example, where a user 101 is subscribed to a variant 120A of a component 130, but not a variant 120B of the component 130, then the user 101 would not receive notification where a new version 130 of the variant 120B was defined.

The subscription registration module 706 comprises computer readable instructions that when executed on a computer processor receive a request for registration of the user 101 and/or the client device 200 comprising the unique identifier of the node 160 to which the user 101 and/or the client device 200 will subscribe, and associated the unique identifier of the user 101 and/or the client device 200 (e.g., the user UID 526) with unique identifier of the node 160. For example, in the embodiment of FIG. 7, the component UID 112 is associated with several subscribing users 101 (e.g., the user UID 526A through the user UID 526N).

The subscription registration module 706 comprises computer readable instructions that when executed on a computer processor receives an event notification associated with a unique identifier of a component 110, a variant 120, and/or a version 130 (e.g., the design server 400 may submit the event notification when a new node 160 is defined within the dependency database 402), looks up one or more users 101 associated with the unique identifier, and generates a message describing the event. The event generation module 708 may also initiate one or more processes to evaluate workfiles 606 within the design workspace 208, and possibly to push one or more workfiles 606 associated with a new workfiles 606 to the client device 200 to update the design workspace 208, as shown and described in conjunction with the embodiment of FIG. 24 and FIG. 26.

The tree re-evaluation module 709 comprises computer readable instructions that when executed on a computer processor compares a tree data 150 previously returned to the client device 200 (that may also be the normalized tree data 152, the restricted tree data 154, and/or the normalized-restricted tree data 156) to a tree data 150 that would result following the event associated with the component 110, the variant 120, and/or the version 130 of the tree data 150 previous returned to the client device 200. The tree data 150 previously returned to the client device 200 may be determined, for example, from the copy stored on the coordination server 300 and/or through database logs of the dependency database 402 and/or the file repository 602. The tree data 150 previously returned to the client device 200 may be requested from the client device 200 and/or may be determined from examining workfiles 606 on the client device 200. The tree re-evaluation module 709 may re-submit the root node 161 to the coordination server 300 for retrieval of the dependency tree, similar to the request 103 of the client device 200. The tree re-evaluation module 709 may compare the resulting tree data 150 (which may be normalized and/or restricted) to the tree data 150 previously returned to the client device 200 to determine whether the event and/or any changes in the security profile 514 and/or any new conflict between or among nodes 160 created by the event would return a different tree data 150 (and/or different nodes 160) to the client device 200 of the user 101. Where a different tree data 150 would be returned, the tree re-evaluation module may determine one or more workfiles 606 associated with the different tree data 150 and optionally push the workfiles 606 to the client device 200. The tree re-evaluation module 709 may also be stored on and/or executed by the coordination server 300. The embodiments of FIG. 24 and FIG. 26 demonstrate re-evaluation of the tree data 150 previously returned to the client device 200.

Figure 8:
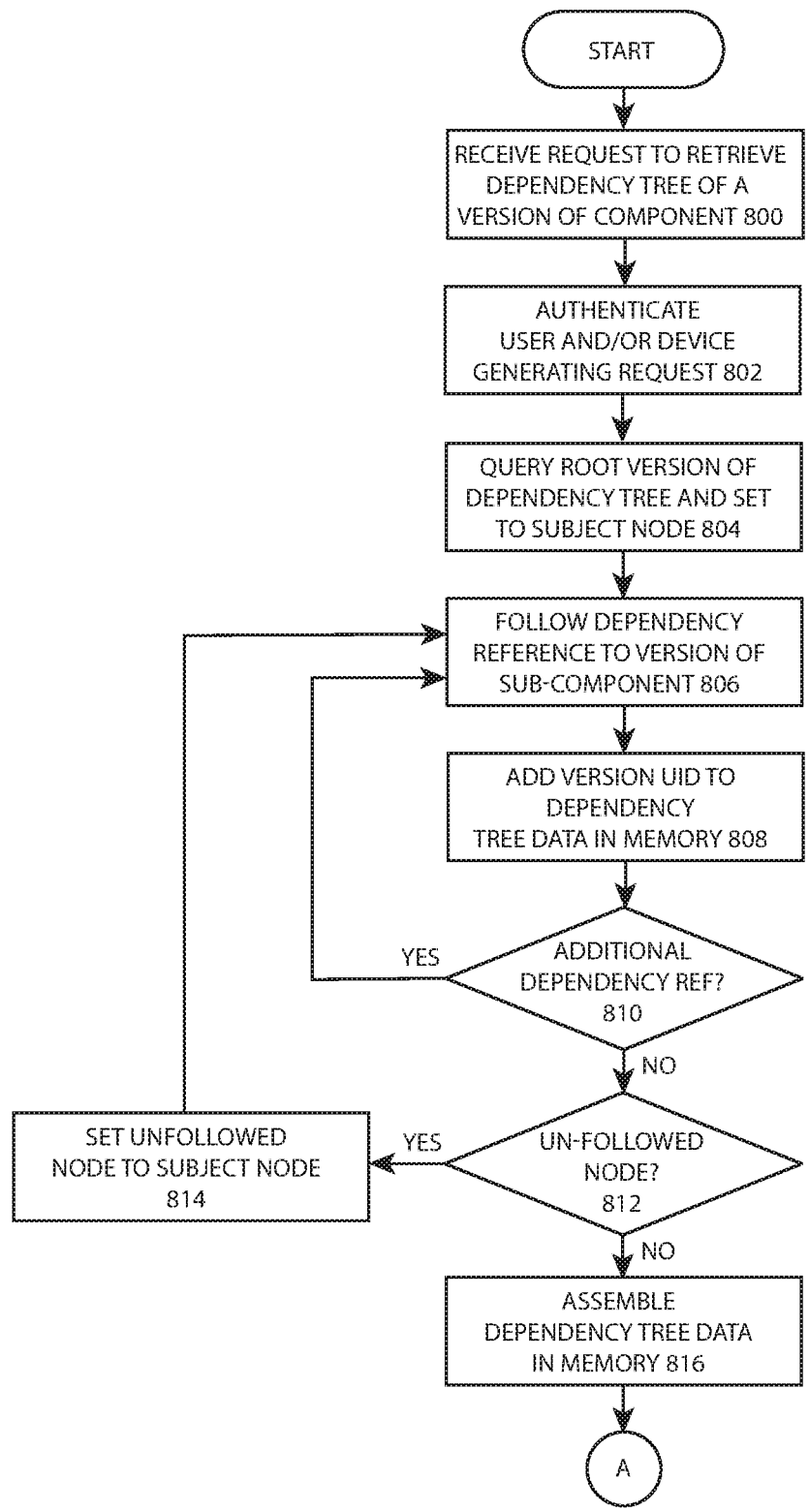
FIG. 8 is a dependency tree assembly process flow, according to one or more embodiments.

FIG. 8 is a dependency tree assembly process flow, according to one or more embodiments. Operation 800 receives a request (e.g., the request 103) to retrieve a dependency tree of a version 130 of a component 110, for example within a dependency database 402. The version 130 requested is set as the root version 130*. Operation 802 authenticates the user 101 and/or the client device 200 of the user 101 generating the request. Operation 804 queries the root version 130* (e.g., a root version 130A* as a root node 161 of a dependency tree, that may be within a component group 140 of a root component 110A*), for example within the dependency database 402. The root node 161 becomes a subject instance of the node 160 for which dependency following and/or branching occurs to continue assembling the tree data 150. Operation 806 follows a dependency reference 131 of the subject instance of the node 160 to another instance of a version 130 (e.g., a version 130B that of a component 110B that is a sub-component of the component 110A). Operation 808 adds the version UID 132 of the version 130B to the tree data 150 being assembled and stored in memory (e.g., the memory 303, the memory 403). Operation 810 determines whether the subject instance of the node 160 includes an additional instance of the dependency reference 131. If the subject instance of the node 160 includes an additional instance of the dependency reference 131, operation 810 returns to operation 806 to follow the additional instance of the dependency reference 131. If not, operation 810 proceeds to operation 812. Operation 812 determines whether an additional version 130 exists for which one or more dependency references 131 have not yet been followed. If an additional version 130 exists for which one or more dependency references 131 have not yet been followed, operation 812 proceeds to operation 814. Operation 814 sets the subject instance to the version 130 for which one or more dependences references 131 have not yet been followed. Operation 814 then proceeds to operation 806. Where operation 812 determines that all versions 130 have had all dependency references 131 followed, operation 812 proceeds to operation 816 which assembles a finalized instance of the dependency tree (e.g., the tree data 150) in the memory. For example, the tree data 150 may be comprised of unique identifiers of each version 130 (e.g., version UIDs 132) within a version dependency tree 151. The tree data 150 may also include data from the component group 140 of each version 130, for example the component UID 112. In one or more embodiments, the dependency tree assembly process flow of FIG. 8 may be executed by the coordination server 300, the design server 400, and/or the tree retrieval routine 404. The process flow of FIG. 8 may end, return the tree data 150 to use client device 200, and/or may proceed to normalize the tree data 150, for example by proceeding to the process flow of FIG. 9 and/or FIG. 10.

Figure 9:
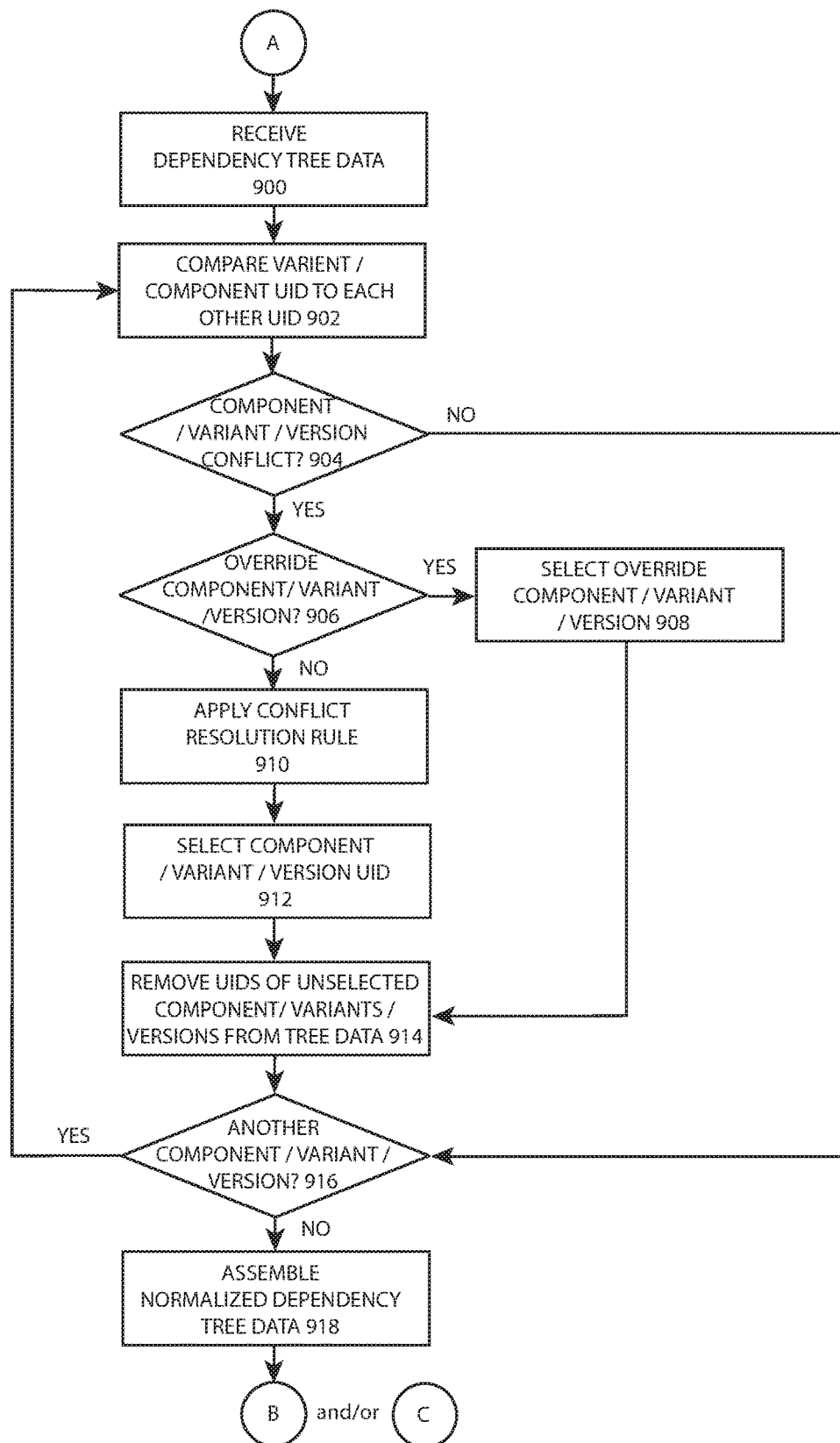
FIG. 9 is a dependency tree normalization process flow illustrating a conflict resolution process, according to one or more embodiments.

FIG. 9 is a dependency tree normalization process flow illustrating a conflict resolution process, according to one or more embodiments. Operation 900 receives a dependency tree data (e.g., the tree data 150 that may be generated by the process flow of FIG. 8). Operation 902 compares either a component UID 112, variant UID 122, and/or version UID 123 of the tree data 150 to each other unique identifier of the same kind. For example, a first component UID 112 will be compared to each other component UID 112 within the tree data 150. Where the tree data 150 comprises only versions 130, the dependency database 402 may be queried for the component 110 associated with the each version 130 within the tree data 150. Operation 904 determines whether there is conflict between two or more components 110, variants 120, and/or version 130. For example, a conflict between two components 110 may occur where at least one of the two components 110 may include an exclusion reference 144 to the other (or both of the two components 110 may reference draw an exclusion reference 144 to the other). A conflict between two variants 120 may occur where one draws an exclusion reference 144 to the other. A conflict between two or more versions 130 occurs where the two or more versions (e.g., a version 130A and a version 130B) reference the same component 110 and/or are within the same component group 140. If no conflict is detected, operation 904 proceeds to operation 916.

If a conflict is detected in comparing the unique identifiers, operation 904 proceeds to operation 906. Operation 906 determines whether an overrid instance of the component 110, variant 120, and/or version 130 has been defined (e.g., referenced with an override reference 142 that may be drawn from a node 160 (and/or from the root node 161) to the conflicted version 130 or another node 160 within the component group 140 of the conflict version 130). If an override instance has been defined, operation 906 proceeds to operation 908 where the override instance is selected. Operation 908 then proceeds to operation 914. Where an override instance has not been defined, operation 910 applies a conflict resolution rule. The conflict resolution rule may, for example, determine a most recent instance of the version 130 is to be selected. Operation 912 selects a version 130 resulting from the conflict resolution rule and stores the version UID 132 in a memory (e.g., the memory 303), for example, the most recent instance of the version 130. Operation 914 removes the unique identifiers of all unselected instances of the components 110, variants 120, and/or versions 130 from the tree data 150, including following each dependency reference 131 of the unselected instances of the version 130 and remove unique identifiers of each version 130 not referenced by another version 130 having an unbroken chain to the root version 130*, and may also remove all dependencies thereof. Operation 916 determines whether an additional component 110, variant 120, and/or version 130 remains to be checked for conflicts, in which case operation 916 returns to operation 902. If all unique identifiers have been checked for conflicts, operation 916 proceeds to operation 918. Operation 918 assembles a normalized dependency tree (e.g., the normalized tree data 152) by grouping remaining unique identifiers (e.g., version UIDs 132) for transmission to the client device 200.

In one or more embodiments, conflicts may be resolved in order according to dependency level. For example, all conflicts may be resolved on versions 130 of 1st level of sub-components (e.g., within a same component group 140), then on versions associated with 2nd level of sub-components, etc. In such case, operation 902 may evaluate unique identifiers by batch according to distance (e.g., in number of edges 162 from the root node 161), operation 916 may determine whether additional unique identifiers remain to be checked within the batch, and an operation 917 between operation 916 and operation 918 may determine if the a last dependency level has been reached. If not, a new batch may be defined and operation 917 may return to operation 902, whereas if the final dependency level has been reached, operation 917 may proceed to operation 918.

Operation 902 may process unique identifiers in batches of levels from the root version 130*, for example all version 130 that are a distance of one level from the root version 130*, then all versions 130 that are two levels from the root version 130*, etc. For example, after operation 916 returns to operation 902, a next unique identifier of a given level may be selected until the given level is exhausted. Upon a next return to operation 902 from operation 916, unique identifiers of a next level may be examined.

Figure 10:
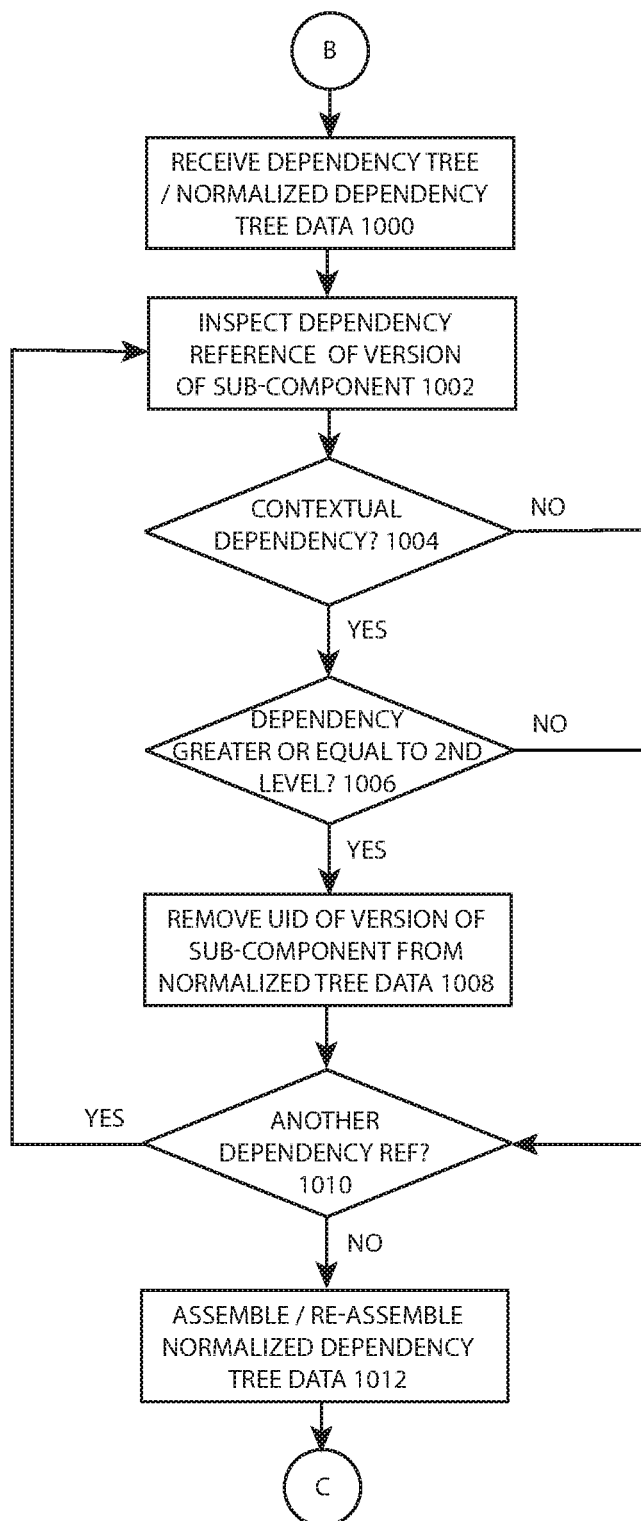
FIG. 10 is another dependency tree normalization process flow illustrating a contextual dependency conflict resolution process, according to one or more embodiments.

FIG. 10 is another dependency tree normalization process flow illustrating a contextual dependency conflict resolution process, according to one or more embodiments. Operation 1000 may receive a dependency tree and/or a normalized dependency tree of a node 160 (e.g., the tree data 150 and/or the normalized tree data 152). Operation 1002 inspects a dependency reference 131 of a version 130 of a sub-component 110 of the tree data 150. Operation 1004 determines if the dependency reference 131 is a contextual dependency (which may be referred to as the contextual dependency reference 133). The contextual dependency reference 133 may have a designation as a property of the version 130. If operation 1004 does not determine the dependency reference 131 is a contextual dependency, operation 1004 proceeds to operation 1010. Where the dependency reference 131 is determined to be the contextual dependency, operation 1004 proceeds to operation 1006. Operation 1006 determines whether the contextual dependency is greater than or equal to a threshold distance from the root node 161 measured in edges 162. For example, in the embodiment of FIG. 10 the threshold distance is greater than or equal to two (e.g., a version 130 of 2nd level sub-component 110 is not equal to or greater than two, and therefore the version 130 will be included within the tree data 150).

Where the dependency is greater than or equal to 2nd level, operation 1006 removes the unique identifier of the version 130 (e.g., the version UID 134), and each dependency (e.g., removes the version UID 134 of each version 130 not having an independent unbroken chain of dependencies to the root version 130*). Operation 1010 determines whether another unexamined instance of a dependency reference 131 exists. If an unexamined instance of the dependency reference 131 exists, operation 131 returns to operation 1002 where the unexamined dependency reference 131 is inspected. Otherwise, operation 1010 proceeds to operation 1012 where the tree data 150 and/or normalized tree data 152 is re-assembled into a new instance of the normalized tree data 152 that now lacks any unique identifiers removed in operation 1008. The process flow of FIG. 10 may then terminate or proceed to the process flow of FIG. 11.

Figure 11:
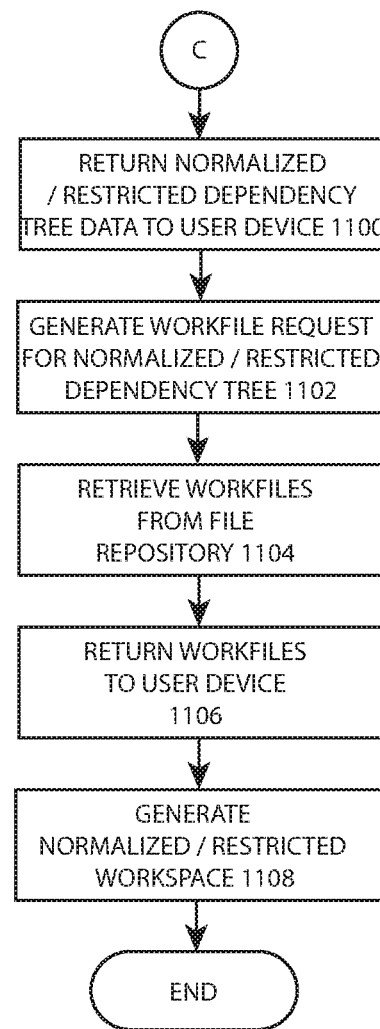
FIG. 11 is a normalized and/or restricted dependency tree workspace generation process flow, according to one or more embodiments.

FIG. 11 is a normalized and/or restricted dependency tree workspace generation process flow, according to one or more embodiments. Operation 1100 returns the normalized tree data 152 (and/or the restricted tree data 154 and/or normalized-restricted tree data 156) to the client device 200 over the network 100. Operation 1102 generates a workfile request (e.g., the request 107) for workfiles 606 associated with the normalized dependency tree 152 and/or the restricted dependency tree 154 and/or normalized-restricted tree data 156, and transmits the workfile request for retrieval of the workfiles 606. For example, the workfile request may include the workfile reference 134 of each version 130 of the normalized tree data 152. Each workfile reference 134 may specify one or more directories 604. Operation 1104 retrieves one or more workfiles 606 from a file repository (e.g., the file repository 602). Operation 1106 returns the one or more workfiles 606 to the client device 200. Operation 1108 generates a normalized and/or restricted workspace that may be an instance of the design workspace 208 generated by downloading workfiles 606 associated with a normalized tree data 152 and/or restricted tree data 154 and/or the normalized-restricted tree data 156.

Figure 12:
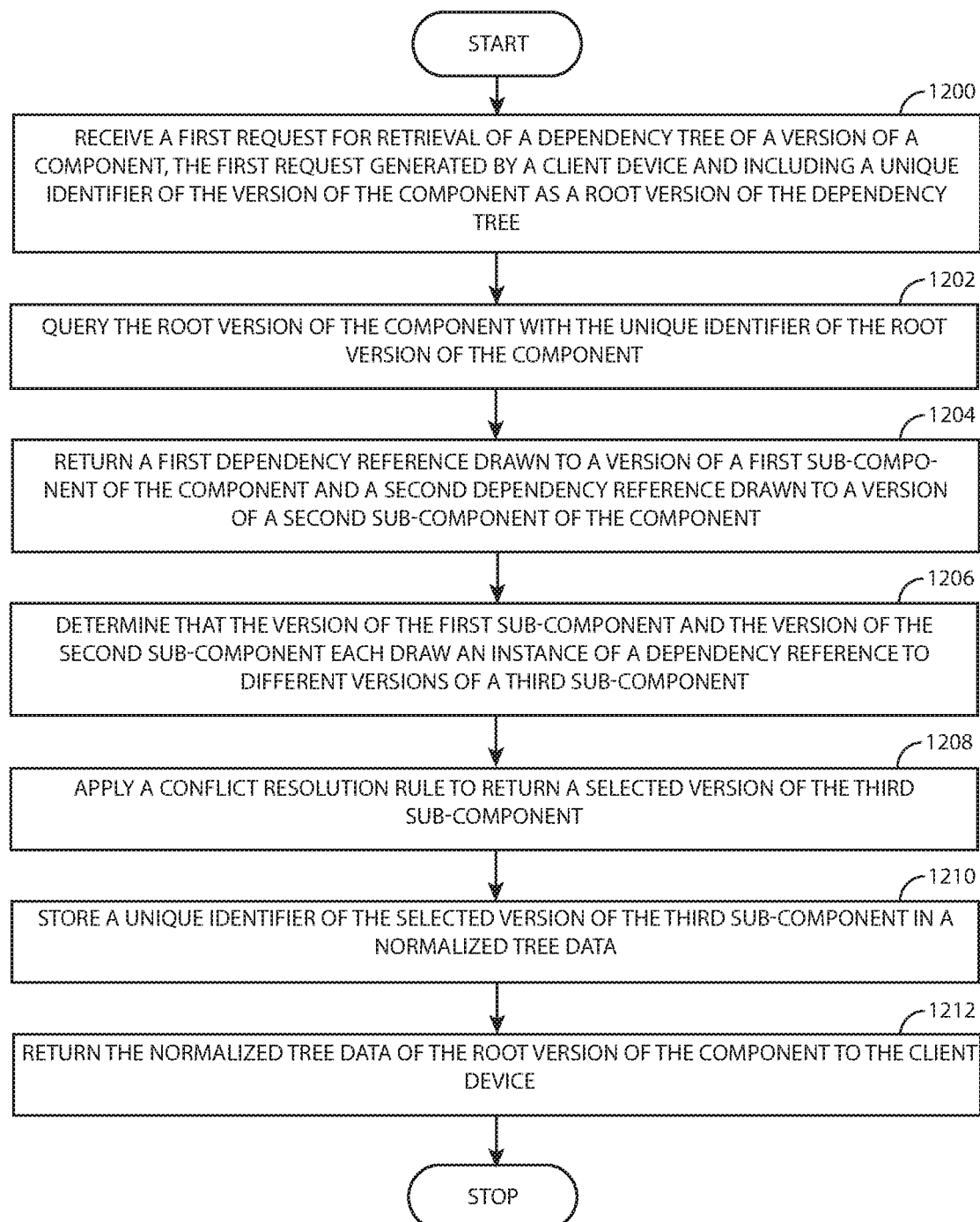
FIG. 12 is yet another dependency tree normalization process flow, according to one or more embodiments.

FIG. 12 is yet another dependency tree normalization process flow, according to one or more embodiments. Operation 1200 receives a first request 103 for retrieval of a dependency tree of a version 130 of a component 110, the first request 103 generated by a client device 200 and comprising a unique identifier of the version 130 (e.g., the version UID 132) of the component 110 as a root version 130* of the dependency tree. Operation 1202 queries the root version 130* of the component 110 with the unique identifier of the root version 130* of the component 110 (e.g., the version UID 132). Operation 1204 returns a first dependency reference 131 (e.g., a dependency reference 131A) drawn to a version 130 of a first sub-component 110 (e.g., a version 130A) of the component 110 and a second dependency reference 131 (e.g., a dependency reference 131B) drawn to a version 130 of a second sub-component 110 of the component 110 (e.g., a version 130B). Operation 1206 determines that the version 130A of the first sub-component 110 and the version 130B of the second sub-component 110 each draw an instance of the dependency reference 131 (e.g., a dependency reference 131A from the version 130A and a dependency reference 131B from the version 130B) to different versions 130 of a third sub-component 110 (e.g., the different versions 130 may be a version 110C and a version 110D of the same sub-component 110.1).

Operation 1208 applies a conflict resolution rule to return a selected version 130 of the third sub-component 110 (e.g., selects the version 110C). For example, the conflict resolution rule may specify that a latest version as between the version 130A and the version 130B is to be selected, e.g., the version 130B. Operation 1210 stores a unique identifier of the selected version 130 (e.g., the version UID 132) of the third sub-component 110 in a normalized tree data 152, and operation 1210 return the normalized tree data 152 of the root version 130* of the component 110 to the client device 200.

Figure 13:
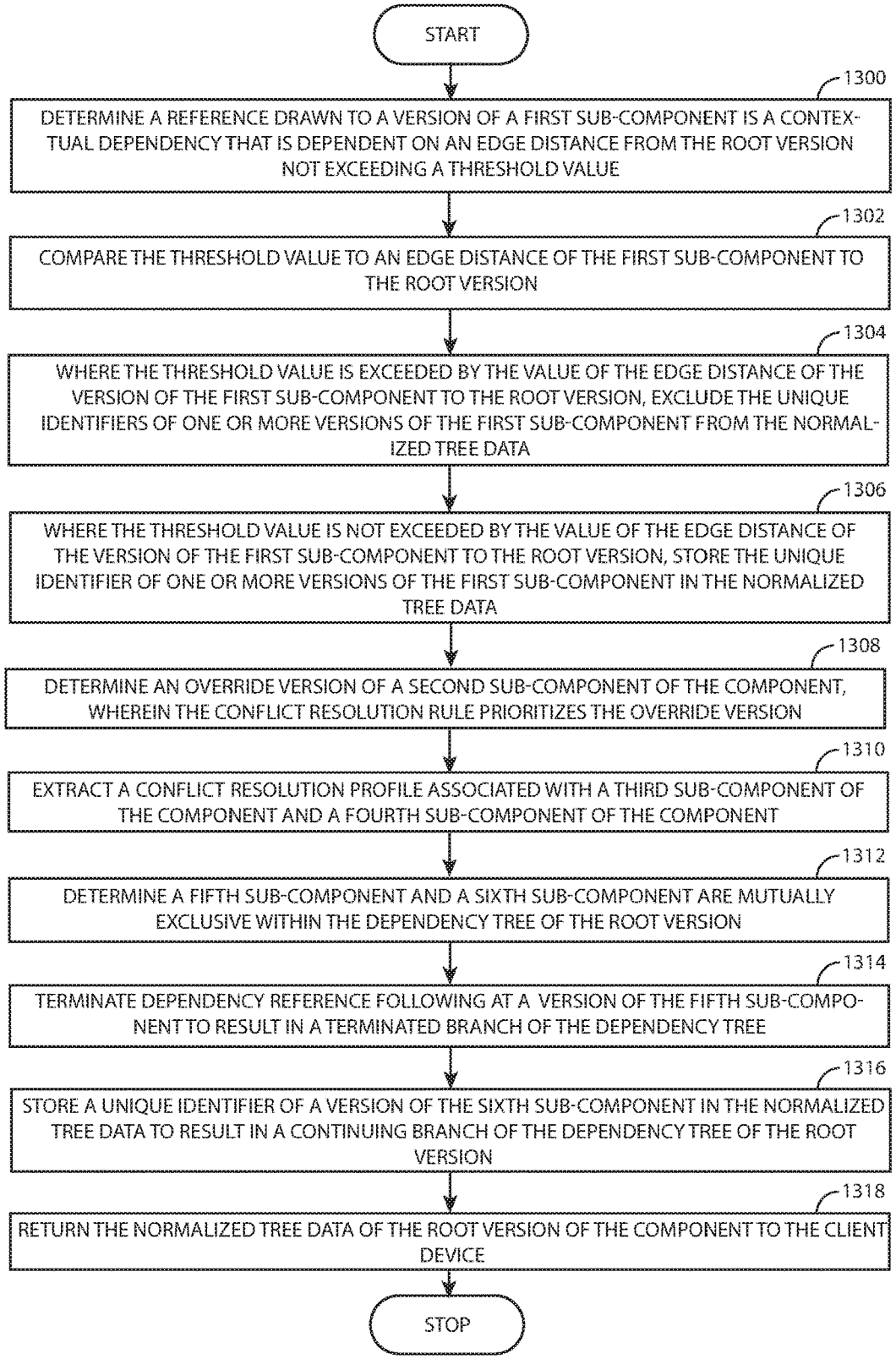
FIG. 13 is a conflict resolution process flow, according to one or more embodiments.

FIG. 13 is a conflict resolution process flow, according to one or more embodiments. Operation 1300 determines a reference drawn to a version 130 of a first sub-component 110 is a contextual dependency (e.g., a contextual dependency reference 135) that is dependent on an edge distance (e.g., a number of edges 162) from the root version 130* not exceeding a threshold value (e.g., one, two, forty-seven). Operation 1302 compares the threshold value to an edge distance of the first sub-component 110 to the root version 130*. The edge distance may be calculated by querying the dependency database 402, and/or by temporarily storing data of each node 160's distance from the root version 130* as the normalized tree data 152 is being assembled. Operation 1304, where the threshold value is exceeded by the value of the edge distance of the version 130 of the first sub-component 110 to the root version 130*, excludes the unique identifiers of one or more versions 130 (e.g., a version 130A, a version 130B, a version 130C) of the first sub-component 110 from the normalized tree data 152 of the component 110. In contrast, operation 1306, where the threshold value is not exceeded by the value of the edge distance of the version 130 of the first sub-component 110 to the root version 130*, stores the unique identifier of a version 130 of the first sub-component 110 in the normalized tree data 152 of the component 110. In one or more alternate embodiments, the unique identifier of the version 130A may be excluded from the normalized tree data 152 if the threshold value is not met or exceeded, and included within the normalized tree data 152 if the threshold value is exceeded.

Operation 1308 determines an override version 130 of a second sub-component 110 of the component 110, wherein the conflict resolution rule prioritizes the override version 130. The override version 130 may be defined with an override reference 144 drawn from the root component 110* and/or the root version 130*, and/or may be drawn from the component 110 within the component group 140 of the second sub-component 110. Operation 1310 extracts a conflict resolution profile associated with a third sub-component 110 of the component 110 and a fourth sub-component 110 of the component 110. The conflict resolution profile may be stored in the coordination server 300, in the dependency database 402, and/or another location. The conflict resolution profile may specify unique identifiers of components 110, variants 120, and/or version 130 that are prioritized relative to other components 110, variants 120, and/or version 130 within the dependency database 402. Operation 1312 determines a fifth sub-component 100 and a sixth sub-component 100 are mutually exclusive within the dependency tree of the root version 130*. For example, the third sub-component 110 may reference the fourth sub-component 110 with an exclusion reference 144. Operation 1314 terminates dependency reference 131 following at a version 130 of the fifth sub-component 110 to result in a terminated branch (e.g., a terminated branch 191) of the dependency tree. Operation 1316 return the normalized tree data 152 of the root version 130* of the component 110 to the client device 200.

Figure 14:
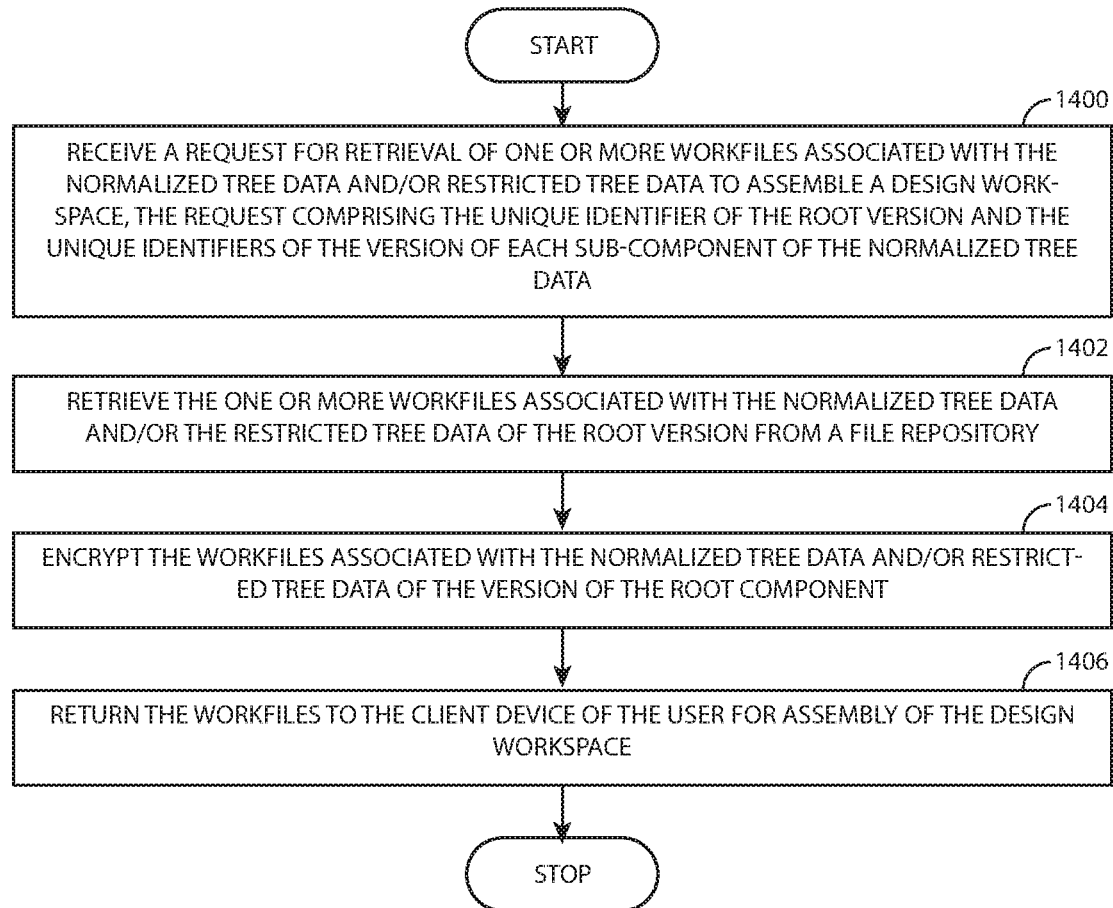
FIG. 14 is another normalized and/or restricted dependency tree workspace generation process flow, according to one or more embodiments.

FIG. 14 is another normalized and/or restricted dependency tree workspace generation process flow, according to one or more embodiments. Operation 1400 receives a request (e.g., the request 107) for retrieval of one or more workfiles 606 associated with the normalized tree data 152 and/or restricted tree data 154 (and/or the normalized-restricted tree data 156) to assemble a design workspace 208, the request (e.g., the request 107) comprising the unique identifier of the root version 130* (e.g., the version UID 134) and the unique identifiers of the version 130 of each sub-component 110 of the normalized tree data 152 and/or the restricted tree data 154.

Operation 1402 retrieves the one or more workfiles 606 associated with the normalized tree data 152 and/or the restricted tree data 154 of the root version 130* from a file repository 602. Operation 1404 encrypts the workfiles 606 associated with the normalized tree data 152 and/or the restricted tree data 154 of the version 130 of the root version 130*. For example, TLS encryption may be utilized, public-private key pair encryption, and other encryption methods for secure transport over the network 100. Operation 1406 returns the workfiles 606 to the client device 200 of the user 101 for assembly of the design workspace 208.

Figure 15:
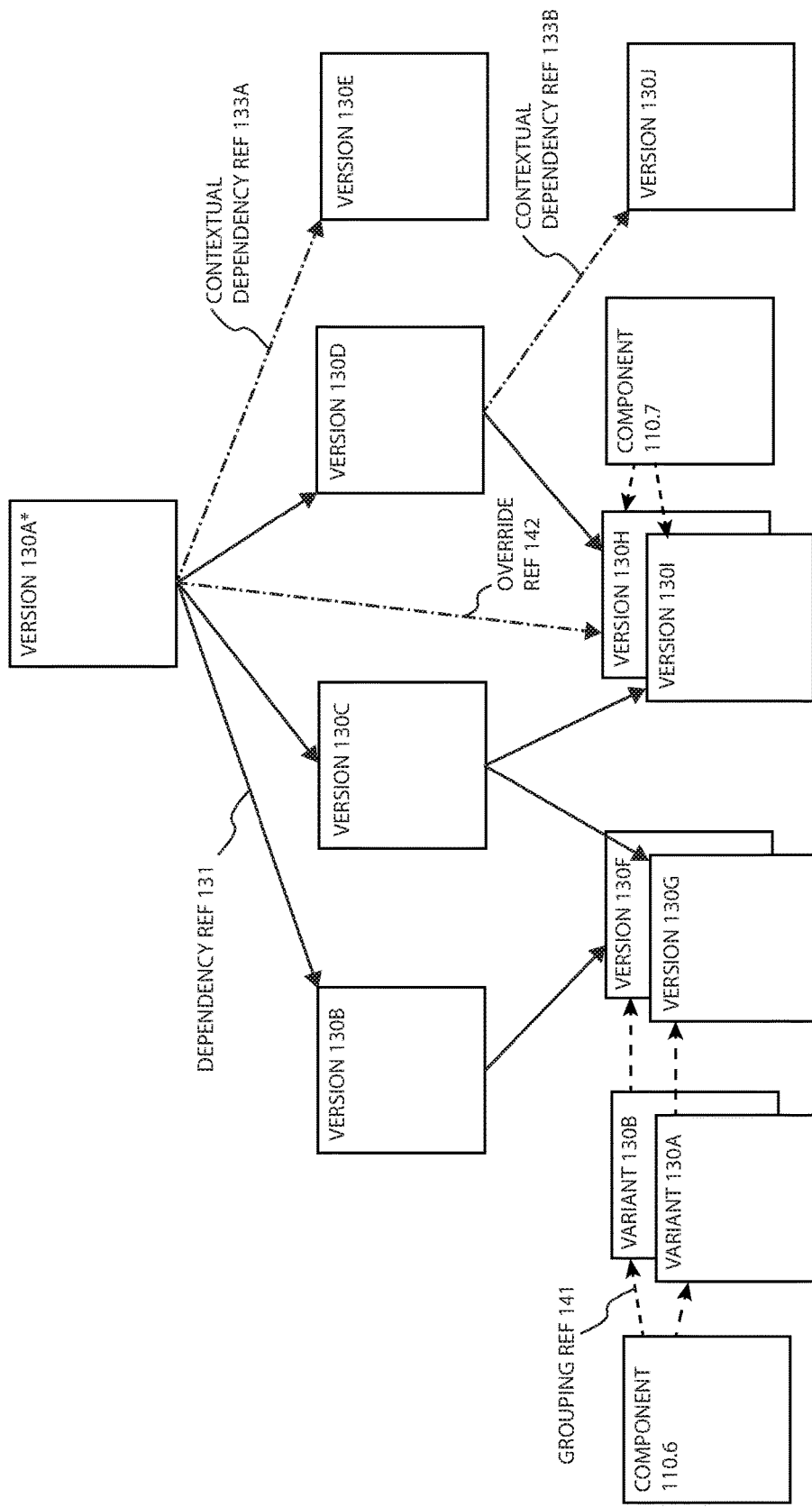
FIG. 15 illustrates a dependency tree of a component comprising contextual dependencies and dependency references to conflicting versions of sub-components, according to one or more embodiments.

FIG. 15 illustrates a dependency tree of a root version 130A* of a component 110.1 (not shown), the dependency tree comprising: (i) contextual dependencies references 133, (ii) dependency references 131 to conflicting versions 130 of sub-components 110 of the component 110, and (iii) an override reference 142 drawn to a version 130 having a version conflict, according to one or more embodiments. In the embodiment of FIG. 15, a version root 130A* is a root node 161 of a dependency tree (e.g., a version dependency tree 151). The root version 130A* has an associated root component 110.1*, not shown in the embodiment of FIG. 15. Three types of conflict are shown. First, the root version 130A* draws a contextual dependency reference 133A to the version 130E, and a version 130D draws a contextual reference 133B to a version 130J. The version 130E is a 1st level dependency of the root version 130A, and the version 130J is a 2nd level dependency of the root version 130A* (similarly, a component 110.5 associated with the version 130E is a first level sub-component 110 of the root component 110.1*, and the version 130J is a second level sub-component 110.8 of the root component 110*). Second, the version 130C draws a dependency reference 131 to the version 130I, and the version 130D draws a dependency reference 131 to the version 130H. Both the version 130H and the version 130I draw grouping references 141 to the component 110.7, such that both the version 130H and the version 130I are within the same component group 140. However, the version 130A also draws an override reference 142 to the version 130H. Third, the version 130B draws a dependency reference 131 to the version 130F, and the version 130C draws a dependency reference to the version 130G. The version 130F draws a grouping reference 141 to the variant 120A, which in turn draws a grouping reference 141 to the component 110.6. The version 130G draws a grouping reference 141 to the variant 120B, which also draws a grouping reference 141 to the component 110.6, such that both the version 130F and the version 130G are within the same component group 140.

Figure 16:
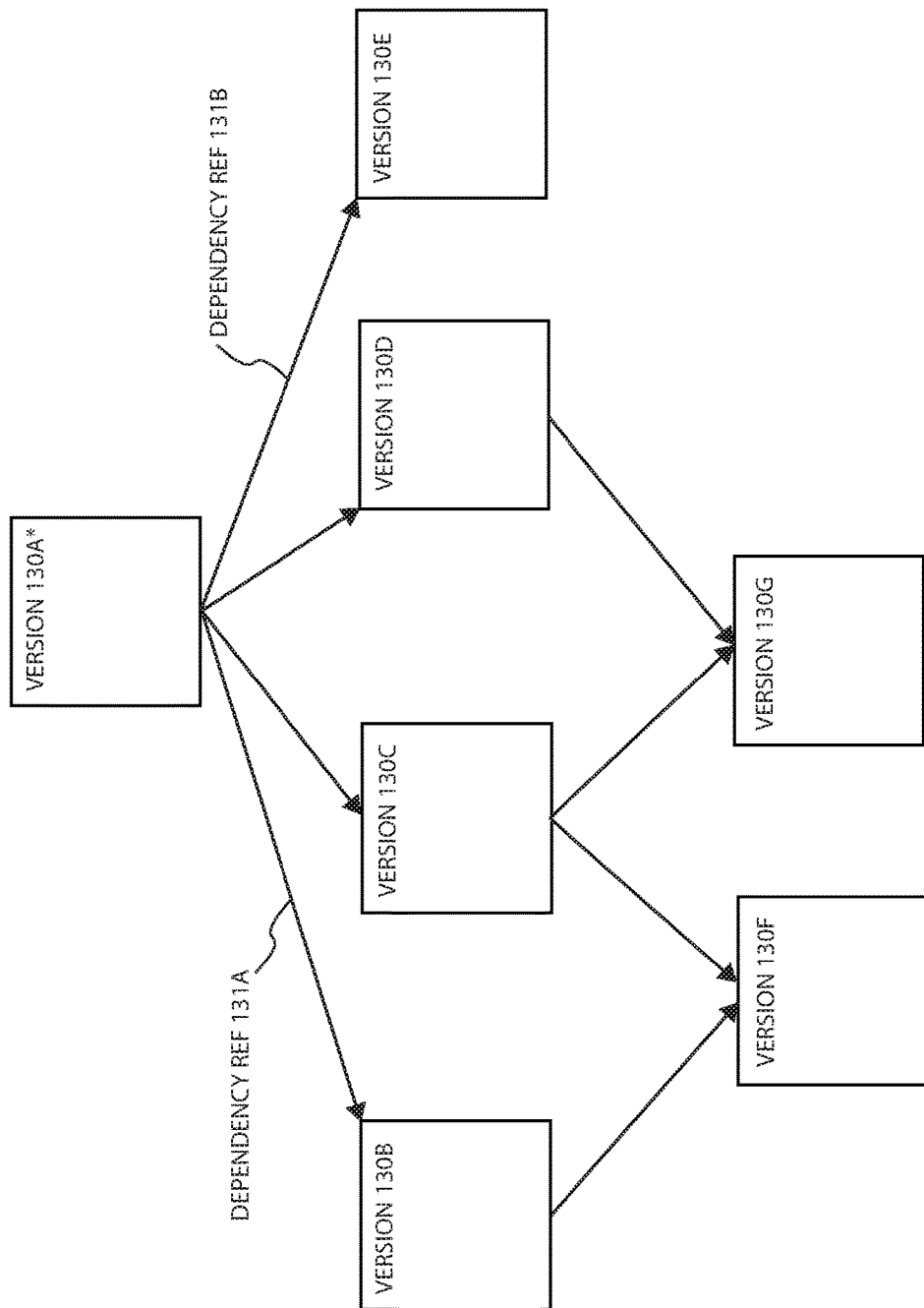
FIG. 16 illustrates a normalization of the dependency tree of FIG. 15, according to one or more embodiments.

FIG. 16 illustrates the normalization of the dependency tree of FIG. 15, according to one or more embodiments. In the embodiment of FIG. 16, the contextual dependency must be a threshold distance of less than two edges 162 to be included in a normalized tree data 152. The contextual dependency reference 133A drawn to the version 130E is one edge 162 in distance from the version 130A*, and is therefore converted to and/or treated as a dependency reference 131, while the dependency reference 131B of FIG. 15 is not treated as a dependency reference 131. The version 130H is selected due to the override reference 142 drawn from the version 130A, such that both the version 130C and the version 130D draw dependency references 131 to the version 130H in the normalized tree data 152 of FIG. 16. The version 130G is selected by application of a conflict resolution rule, where the version 130G is a later version than the version 130F (in one or more other embodiments, a version 130 of a later defined variant 120B may be selected over a version 130 of an earlier defined variant 120A. As shown in the embodiment of FIG. 16, the normalized tree data 152 need not specify the contextual dependency reference 133, and/or the override reference 142.

Figure 17:
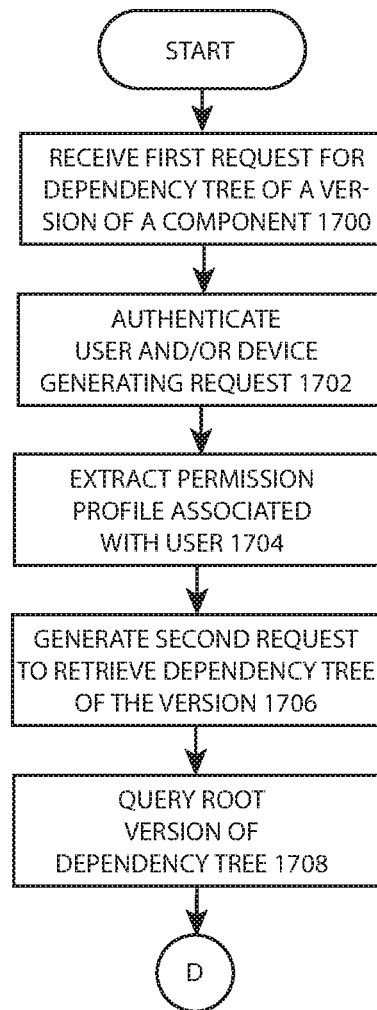
FIG. 17 is an authenticated dependency tree request process flow, according to one or more embodiments.

FIG. 17 is an authenticated dependency tree request process flow, according to one or more embodiments. Operation 1700 receives a request (e.g., the request 103) for a dependency tree of a version 130 of a component 110. The version 130 is the root version 130*, and the component 110 is the root component 110*. Operation 1702 authenticates a user 101 and/or a client device 200 generating the request 103. Operation 1704 extracts a permission profile 504 associated with the user 101 and/or the client device 200. Operation 1706 generates a second request (e.g., the request 105) for retrieval of a dependency tree of the version 130 (e.g., the root version 130*). The first request includes the unique identifier of the user 101 and/or the client device 200 (e.g., the user UID 526), and the second request may include the permission profile 504 associated with the unique identifier of the user 101. Operation 1708 queries the version 130 that will be the root node 161 of the dependency tree (e.g., the root version 130*). The process flow of FIG. 17 then proceeds to the process flow of FIG. 18 or FIG. 19.

Figure 18:
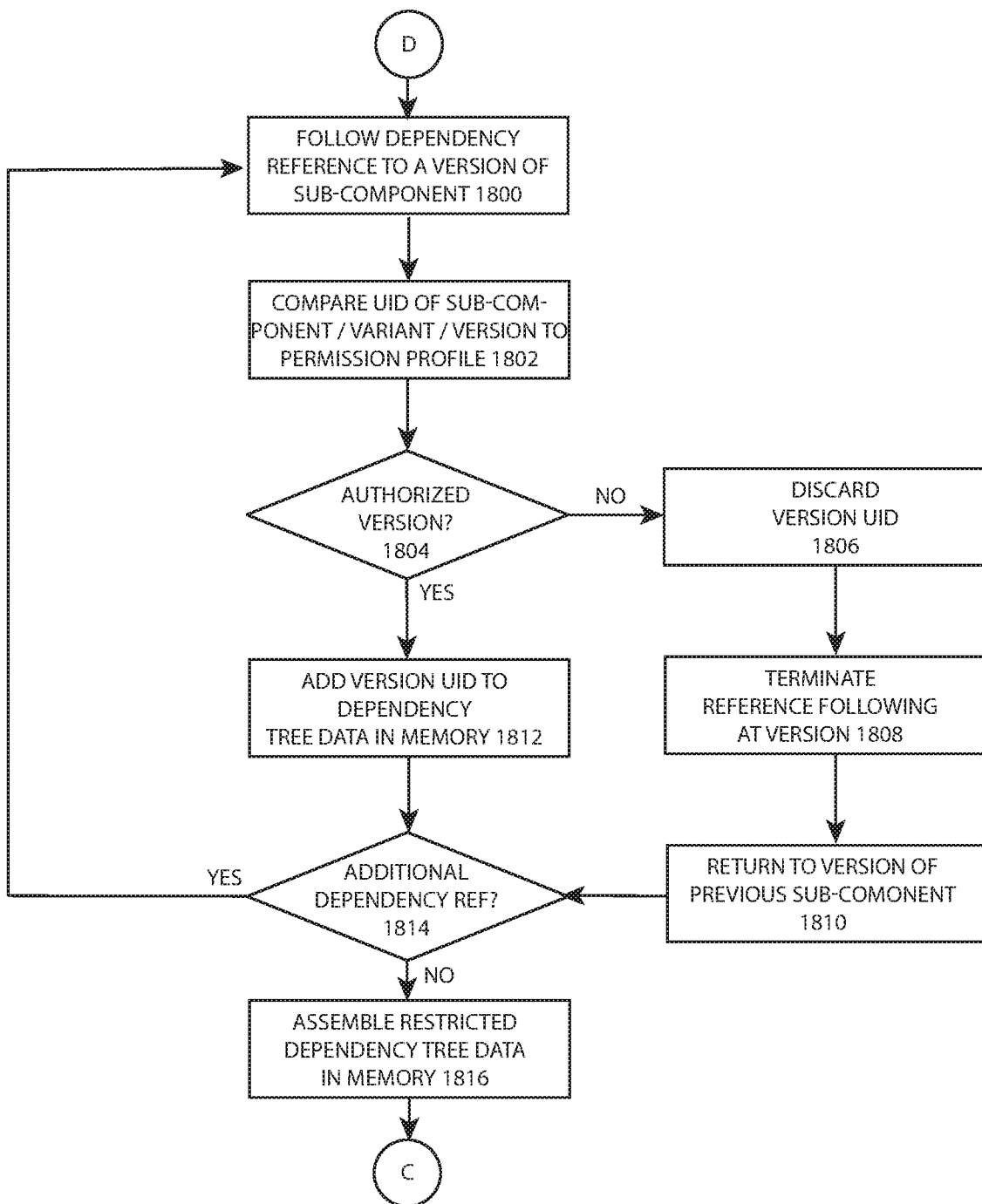
FIG. 18 is a dependency tree restriction process flow, according to one or more embodiments.

FIG. 18 is a dependency tree restriction process flow, according to one or more embodiments. Operation 1800 follows a dependency reference 131 to a version 130 of a sub-component 110. The dependency reference 131 followed may be selected at random, or may be resolved in an order specified by a property stored in the node 160 of the version 130. Operation 1802 compares the unique identifier of a version 130, a variant 120, and/or a component 110 to a permission profile 504. Where a version dependency tree 151 is being assembled, the unique identifiers of the variants 120 and components 110 within the component group 140 of each version 130 may also be included in the version dependency tree 151 (such inclusion may be temporary) for comparison to the permission profile 504. The permission profile 504, in one or more embodiments, includes a list of each unique identifier of each version 130, variant 120, and/or component 110 the user 101 and/or the device 200 is authorized to include within a requested component dependency tree (and/or therefore may determine which workfiles 606 the user 101 may request from the file repository 504). The permission profile 504 may be a whitelist in which nodes 160 identified on the list may be authorized, or a blacklist in which nodes 160 of the list are not authorized. Operation 1804 determines whether the version 130 is authorized. In one or more embodiments, where a component 110 is not authorized, each other variant 120 and version 130 within the component group 140 is not authorized. Similarly, where a variant 120 is not authorized, each version 130 of the variant 120 may not be authorized (although other versions 130 of other variants 120 within the same component group 140 may remain authorized). If authorized, operation 1804 proceeds to operation 1812 in which the version UID 134 is added to the dependency tree data 150 in a computer memory (e.g., the memory 303). Otherwise, operation 1804 proceeds to operation 1806 where the unique identifier is discarded. Operation 1806 proceeds to operation 1808, which terminates dependency reference 131 following at the version 130, variant 120, and/or component 110 with the unique identifier that was discarded. Operation 1810 then returns to a previous version 130 (that was authorized), and proceeds to operation 1814.

Operation 1814 determines whether there remains an additional dependency reference 131 to follow in the previous version 130. If not, the restricted tree data 154 is assembled in the computer memory in operation 1816. If an additional instance of a dependency reference 131 is detected in operation 1814, operation 1814 returns to operation 1800 where the additional instance of the dependency reference 131 is followed. Operation 1816 proceeds to the process flow of FIG. 11.

Figure 19:
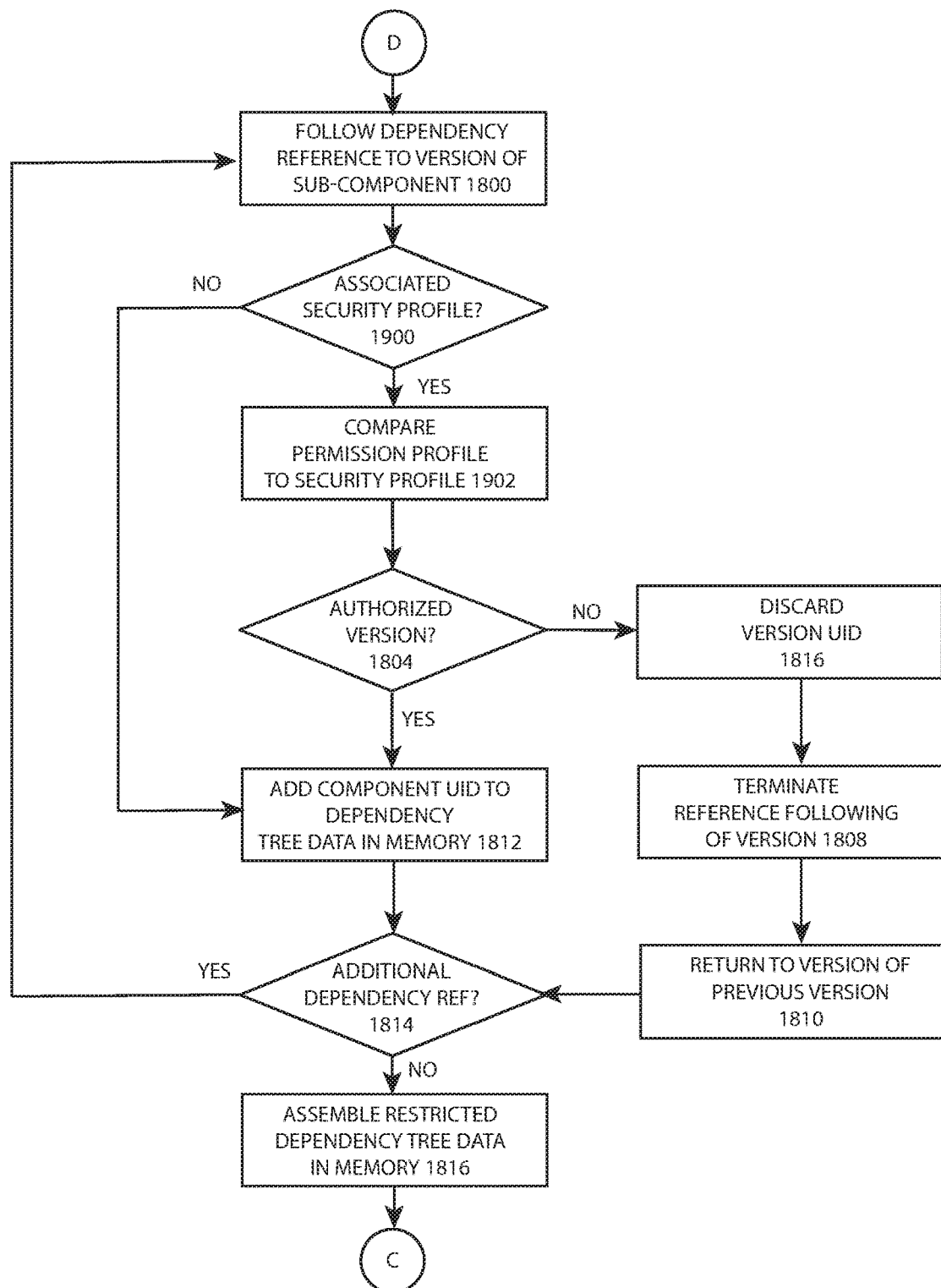
FIG. 19 is another dependency tree restriction process flow, according to one or more embodiments.

FIG. 19 is another a dependency tree restriction process flow, according to one or more embodiments. The embodiment of FIG. 19 may operate similarly to the embodiment of FIG. 18 where like numbering of the figures indicates. However, operation 1900 determines whether a version 130 has an associated security profile 514. For example, the version 130 may have stored within its node 160 a property storing and/or pointing to the security profile 514. In another example, one or more grouping references 141 may be followed from the version 130 to a variant 120 and/or component 110, either of which may store and/or point to the security profile 514. The security profile 514 may specify an access level (e.g., "security level 4"), or other authorization criteria. Operation 1902 comprises the permission profile 504 to the security profile 514. For example, the permission profile 504 may specify a security level two, and the node 160 may be determined to be unauthorized. Operation 1816 of FIG. 19 similarly proceeds to the process flow of FIG. 11.

Figure 20:
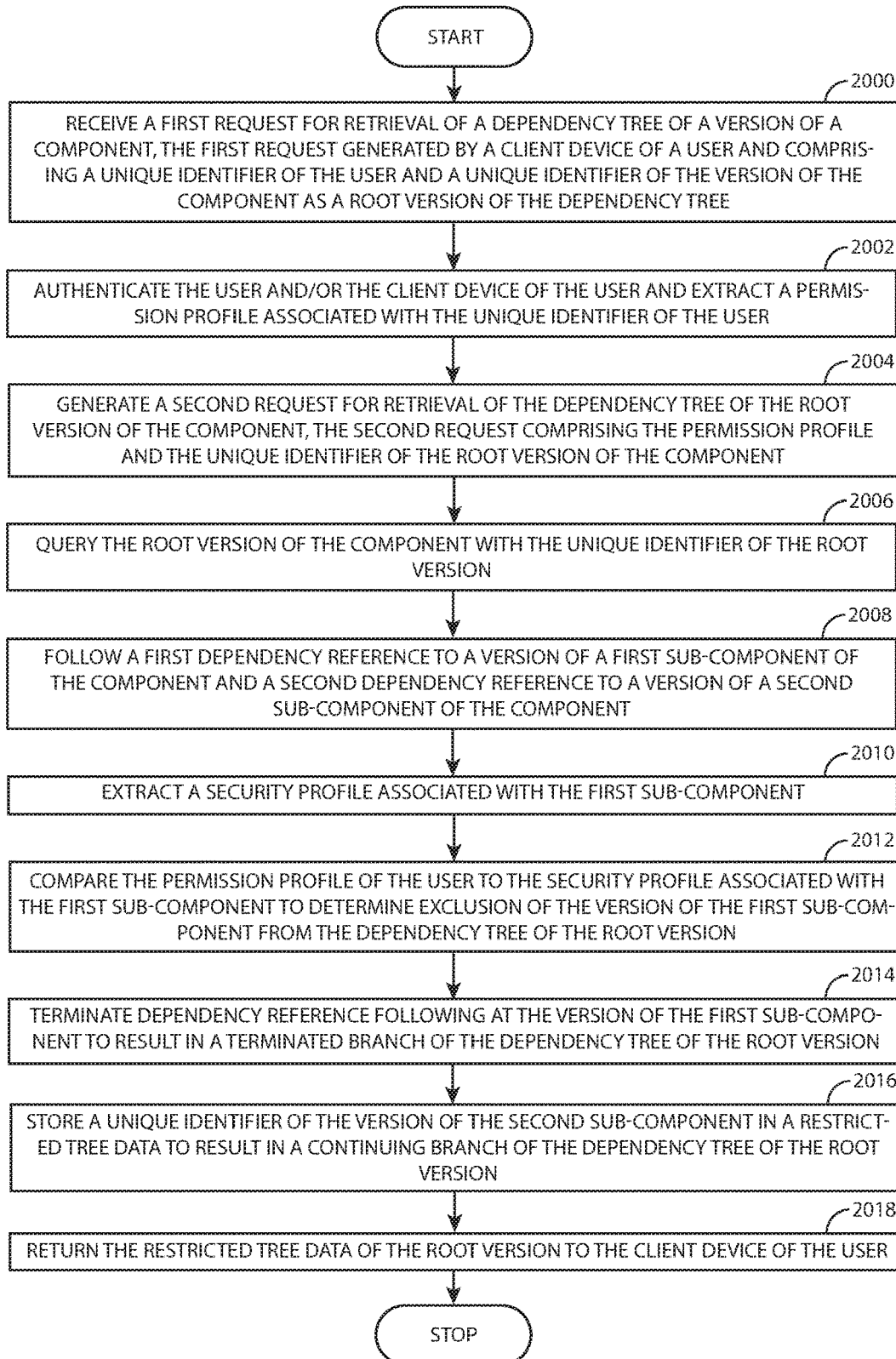
FIG. 20 is yet another a dependency tree restriction process flow, according to one or more embodiments, according to one or more embodiments.

FIG. 20 is yet another a dependency tree restriction process flow, according to one or more embodiments. Operation 2000 receives a first request (e.g., the request 103) for retrieval of a dependency tree of a version 130 (e.g., a root version 130*) of a component 110 (e.g., a root component 110*), the first request generated by a client device 200 of a user 101 and comprising a unique identifier of the user 101 (e.g., the user UID 526) and a unique identifier of the version 130 of the component 110 (e.g., the version UID 132) as a root version 130* of the dependency tree. Operation 2002 authenticates the user 101 and/or the client device 200 of the user 101 and extracts a permission profile 504 associated with the unique identifier of the user 101 (e.g., the user UID 526). Operation 2004 generates a second request (e.g., a request 105) for retrieval of the dependency tree of the root version 130* of the component 110 (e.g., the root component 110*), the second request comprising the permission profile 504 and the unique identifier of the root version 130* of the component 110. Operation 2006 queries the root version 130* of the component 110 with the unique identifier of the root version 130* (e.g., the version UID 132 of the root version 130*). Operation 2008 follows a first dependency reference 131 to a version 130 of a first sub-component 110 (e.g., a sub-component 110.2) of the component 110 (e.g., the root component 110*) and a second dependency reference 131 to a version 130 of a second sub-component 110 (e.g., a sub-component 110.3) of the component 110.

Operation 2010 extracts a security profile 514 associated with the first sub-component 110. For example, the security profile 514 may be stored in a node 160 of the version 130, a variant 120, and/or in the sub-component 110. Operation 2012 compares the permission profile 504 of the user 101 to the security profile 514 associated with the first sub-component 110 to determine exclusion of the version 130 of the first sub-component 110 from the dependency tree of the root version 130*. Operation 2014 then terminates dependency reference 131 following at the version 130 of the first sub-component 110 to result in a terminated branch (e.g., a terminating branch 191 of FIG. 22) of the dependency tree of the root version 130*. Operation 2016 stores a unique identifier of the version 130 of the second sub-component 110 in a restricted tree data 154 to result in a continuing branch (e.g., the continuing breach 181 of FIG. 22) of the dependency tree of the root version 130*. Operation 2018 returns the restricted tree data 154 of the root version 130* to the client device 200 of the user 101.

Figure 21:
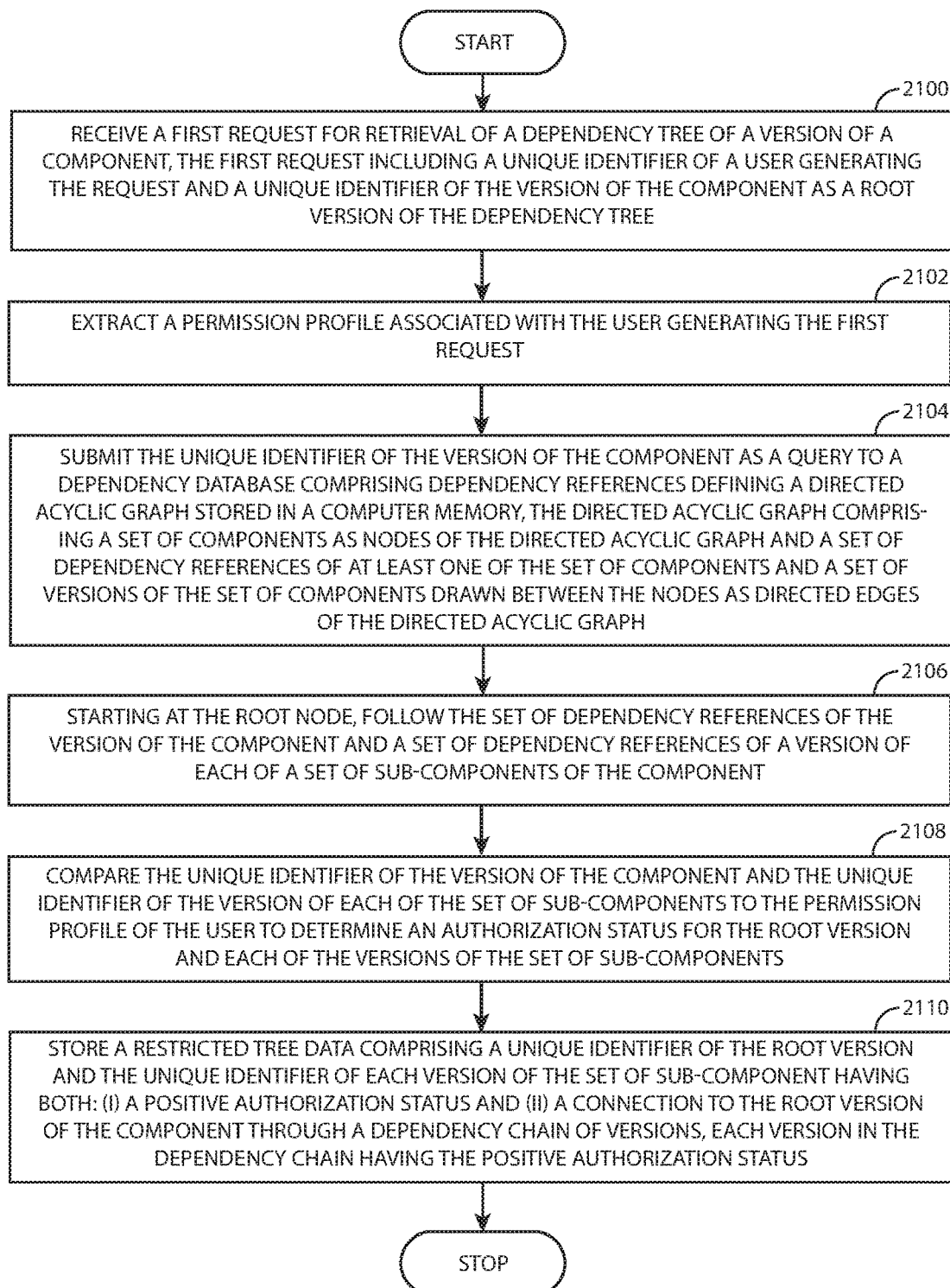
FIG. 21 is still another dependency tree restriction process flow, according to one or more embodiments, according to one or more embodiments.

FIG. 21 is still another dependency tree restriction process flow, according to one or more embodiments. Operation 2100 receive a first request (e.g., the request 103) for retrieval of a dependency tree of a version 130 of a component 110, the first request including a unique identifier of a user 101 generating the request (e.g., the user UID 526) and a unique identifier of the version 130 of the component 110 (e.g., the version UID 134) as a root version 130* of the dependency tree. Operation 2102 extracts a permission profile 504 associated with the user 101 generating the first request (e.g., the request 103). Operation 2104 submits the unique identifier of the version 130 of the component 110 (e.g., the version UID 134) as a query to a dependency database 402 comprising dependency references 131 defining a directed acyclic graph stored in a computer memory (e.g., the memory 303, the memory 403, a data storage disk), the directed acyclic graph comprising a set of components 110 as nodes 160 of the directed acyclic graph and a set of dependency references 131 of at least one of the set of components 110 and a set of versions 130 of the set of components 110 drawn between the nodes 160 as directed edges 162 of the directed acyclic graph.

Operation 2106, starting at the root node 161, follows the set of dependency references 131 of the version 130 of the component 110 and a set of dependency references 131 of a version 130 of each of a set of sub-components 110 of the component 110. Operation 2108 compares the unique identifier of the version 130 of the component 110 and the unique identifier of the version 130 of each of the set of sub-components 110 to the permission profile 504 of the user 101 to determine an authorization status for the root version 130* and each of the versions 130 of the set of sub-components 110. Operation 2110 stores a restricted tree data 154 comprising a unique identifier of the root version 130* and the unique identifier of each version 130 of the set of sub-component 110 having both: (i) a positive authorization status and (ii) a connection to the root version 130* of the component 110 through a dependency chain of versions 130, each version in the dependency chain having the positive authorization status.

Figure 22:
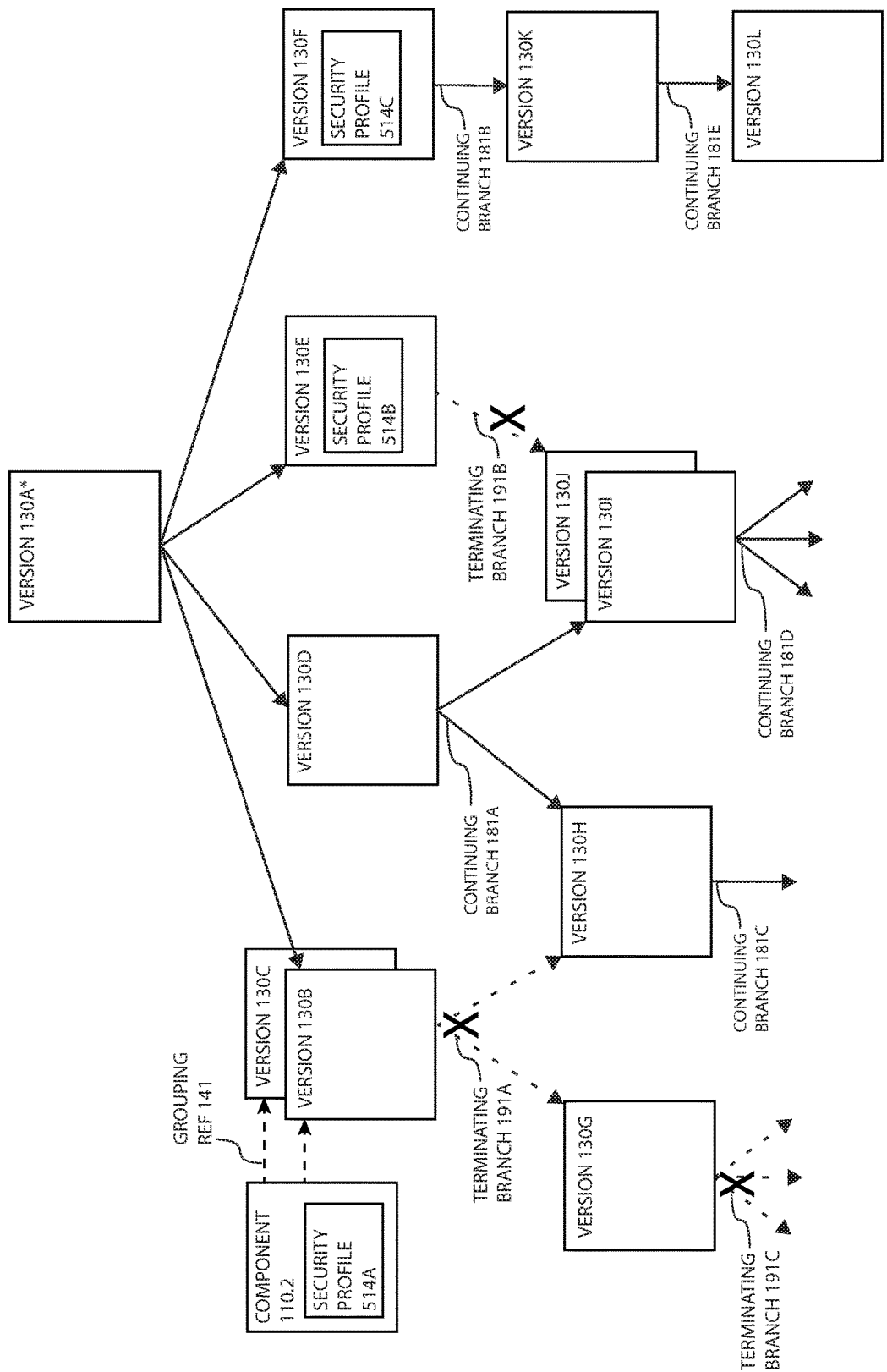
FIG. 22 illustrates the dependency tree of a version of a component, including but not limited to the formation of terminating branches of the dependency tree for unauthorized versions, variants and/or components, according to one or more embodiments.

FIG. 22 illustrates the dependency tree of a version 130 of a component 110, including but not limited to the formation of terminating branches 191 within the dependency tree occurring at unauthorized versions 130, variants 120 and/or components 110, and continuing branches 181 of the dependency tree occurring at authorized versions 130, variants 120 and/or components 110, according to one or more embodiments.

In the embodiment of FIG. 22, the root version 130A* references a version 130B within a same component group 140 as a version 130C. The version 130B may not store within its node 160 a security profile 514. However, upon examination of the version 130B, the associated component 110.2 may be queried to determine storage of the security profile 514A that may apply to both the version 130B and the version 130C. In the embodiment of FIG. 22, the permission profile 504 of the user 101, when compared to the security profile 514A, may not authorize the version 130B, resulting in the terminating branch 191A.

The version 130E may include the security profile 514B also does not authorize the user 101 to include the version 130E, resulting in the terminating branch 191B such that a dependency reference 131 to a version 130H (e.g., of a component 110.8, not shown) is not followed. However, the version 130D may, as part of the continuing branch 181A, reference the version 130I (e.g., of the component 110.8, not shown). Therefore, a version 130I of the component 110.8 may, in one or more embodiments, be included within the dependency tree of the root version 130A* to result in the continuing branch 181D. While a version conflict may ordinarily detected between the version 130I and the version 130J, in the embodiment of FIG. 22, subsequent normalization may ignore the version 130J because it is referenced by a terminating branch 191B. The version 130F may include the security profile 514C that, in the embodiment of FIG. 22, authorizes the user 101 to include the version 130F. As a result, the continuing branch 181 of a dependency reference 131 is initiated to the version 130I. The version 130J terminates naturally as a result of having no further dependencies.

Figure 23:
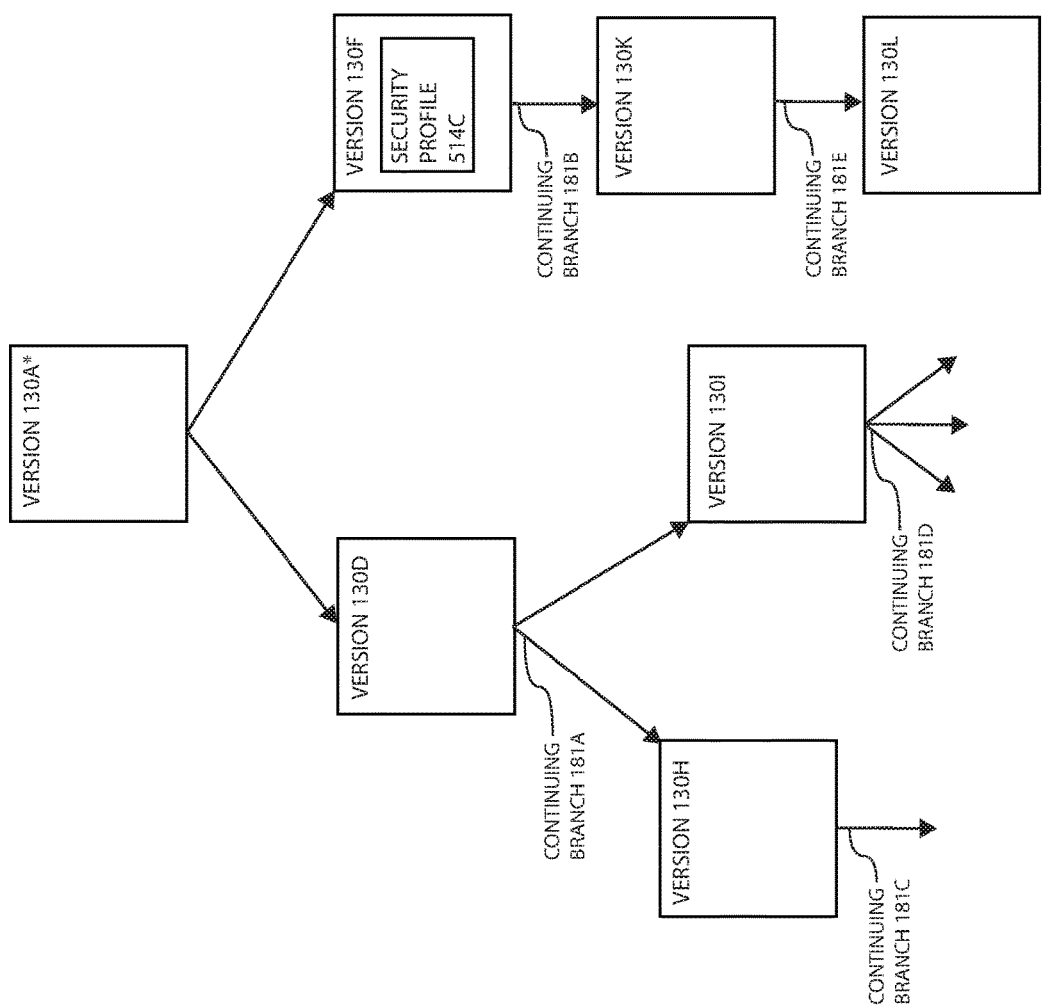
FIG. 23 illustrates the restricted dependency tree data resulting from the restriction of the dependency tree of FIG. 22, according to one or more embodiments.

FIG. 23 illustrates the restricted dependency tree data resulting from the restriction of the dependency tree of FIG. 22, according to one or more embodiments. In the embodiment of FIG. 23, only instances of the continuing branch 181 remain until a node 160 terminates naturally (e.g., the version 130J, as shown, having no further dependencies).

The tree data 150 and each of its instances (e.g., the normalized tree data 152, the restricted tree data 154, and the normalized-restricted tree data 156) may be generated, normalized, and/or restricted sequentially or concurrently. For example, in one or more embodiments, the coordination server 300 and the design server 400 may be implemented on the same physical server computer. During a query process of the dependency database 402, normalization and/or restriction may occur as each node 160 is queried and each edge 162 is followed. In one or more embodiments, each dependency level may be first restricted and then normalized before dependency references 131 are followed to a next dependency level. In such a case, an order of operations may ensure no conflict is detected and/or resolved with a version 130, variant 120, and/or component 110 that is unauthorized. Whether initial retrieval of the tree data 150, the normalization of the tree data 150, and the restriction of the tree data 150 occur concurrently or sequentially may depend on the contents of the dependency database 402. For example, where only a few nodes 160 of any given requested dependency tree are expected to be restricted, initial assembly of a full dependency tree data 150 which is then restricted may be preferred. In contrast, where many conflicts and unauthorized nodes may occur, it may be more efficient (but is not required) to concurrently restrict and/or normalize the tree data 150 when initially retrieved from the dependency database 402. In one or more preferred embodiments, the tree data 150 is sequentially processed by first restriction (e.g., via the tree restriction engine 320) and second normalization (e.g., via the tree normalization engine 310).

Figure 24:
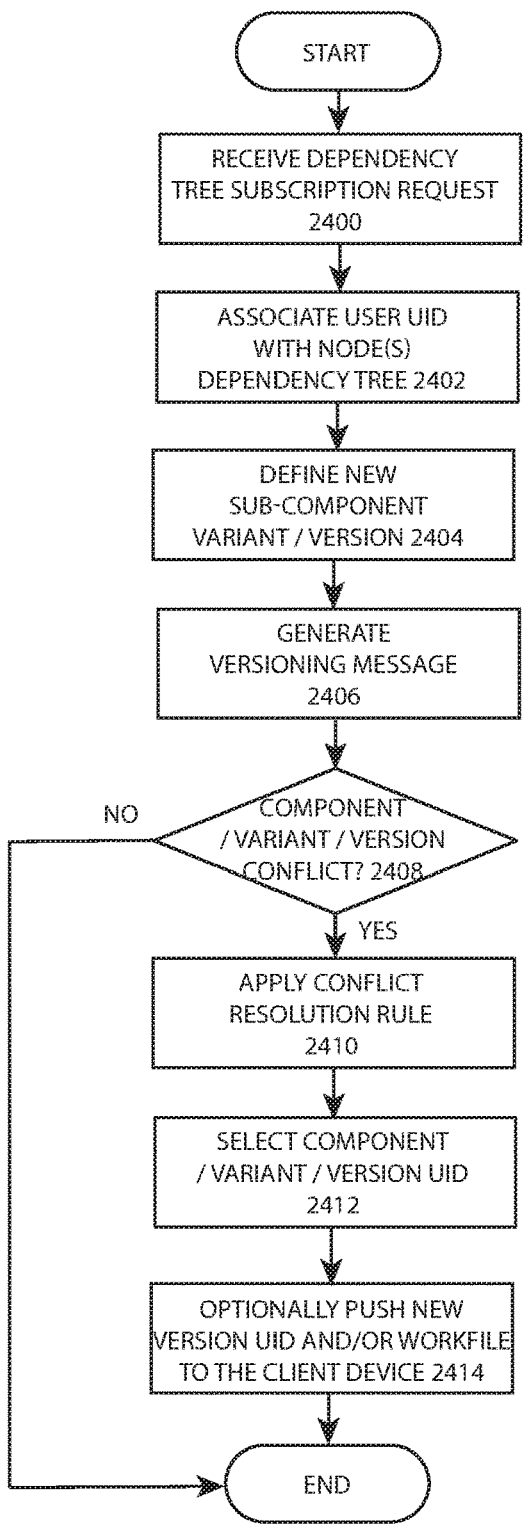
FIG. 24 is a subscription request and conflicted versioning process flow, according to one or more embodiments.

FIG. 24 is a subscription request and conflicted versioning process flow, according to one or more embodiments. Operation 2400 receives a dependency tree (e.g., a tree data 150, a root version 130\* implying its associated dependency tree in the dependency database 402) subscription request (e.g., which may be generated by the client device 200 of the user 101). The request comprises a unique identifier of a user 101 and/or the client device 200 (e.g., the user UID 526). Operation 2402 associates the unique identifier of the user 101 with nodes 160 of the dependency tree. For example, for a version dependency tree 151 the association may occur between the unique identifier of each version 130 (e.g., the version UID 134). Alternatively or in addition, a different node 160 the version group 140 may be utilized, for example the component 110.

In operation 2404, a new version 130, a new variant 120, and/or a new component 110 (specifically, a sub-component 110 within the dependency tree to which the user 101 subscribed) is defined. For example, the new version 130 may be a new release with modified workfiles 606. Operation 2406 generates a versioning message for the subscribing user 101, for example to notify the user 101 that a new version 130 is available, a security vulnerability has been detected in a variant 120, or for example, that a component 110 is deprecated, no longer supported and/or no longer actively developed.

Operation 2408 determines, if the new version 130, variant 120, and/or component 110 existed when the user 101 generated the tree data 150 to which the user subscribed (and/or submitted the root node 161 to which the user subscribed to its dependency tree), whether a conflict would be determined. For example, a new tree data 150 may be generated and compared to a tree data 150 stored on the coordination server 300 and/or the client device 200. Where no conflict is determined, operation 2408 may end. Where a conflict would be determined, operation 2408 proceeds to apply a conflict resolution rule in operation 2410. Operation 2412 selects a unique identifier of a component 110, a variant 120, and/or a version 130 to resolve the conflict. In operation 2414, one or more workfiles 606 associated with a new version 130 are pushed to the client device 200 (and/or the storage server 250), which may replace the workfiles 606 from the previous version 130 that was replaced by the new version 130, automatically updating the design workspace 208. In one or more embodiments, a comparison is first run to ensure the user 101 has not modified the workfiles 606 associated with the previous version 130 so that no work of the user 101 is lost.

Figure 25:
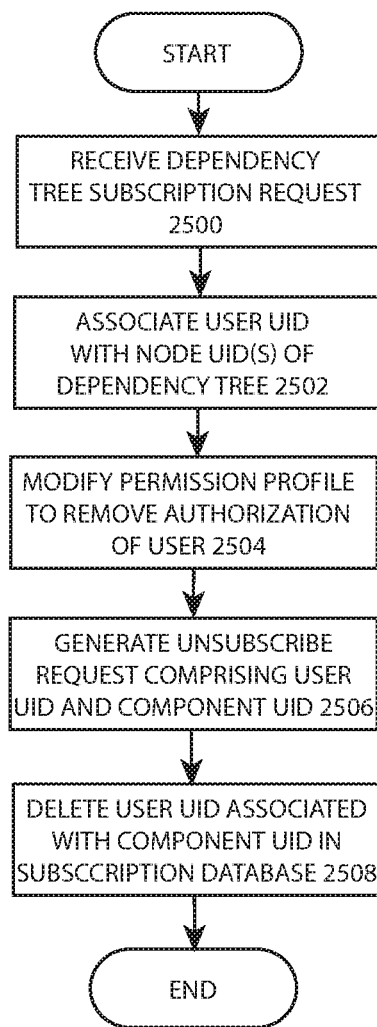
FIG. 25 is a subscriber event permission withdraw process flow, according to one or more embodiments.

FIG. 25 is a subscriber event permission withdraw process flow, according to one or more embodiments. Operation 2500 may receive a dependency tree subscription request, e.g., similar to operation 2400 of FIG. 24. Operation 2502 may operate similarly to operation 2402. Operation 2504 may modify a permission profile 504 of a user 101 (and/or a group of users 101) to remove authorization of the user 101 (and/or the group of users 101). Operation 2506 generates an unsubscribe request comprising a user UID 134 and a component UID 112. Operation 2508 deletes the user UID 134 (and/or the group UID 528) associated with the comonet UID 112 in a subscription database 704. As a result, a user UID 112 and/or a group of users 101 will not receive events associated with the node 160 for which they are no longer authorized to utilize and/or include within a tree data 150 they may request.

Similarly, in one or more embodiments, a process may determine a unique identifier of a sub-component 110 (e.g., the component UID 112) and/or a unique identifier of a variant (e.g., the variant UID 122) of the sub-component 110 has been removed from the permission profile 504 of a user 101. Another process may generate an un-subscribe request, and yet another process may delete within the subscription database 704 the unique identifier of the user 101 (e.g., the user UID 526) associated with the unique identifier of the sub-component 110 and/or the variant 120.

Figure 26:
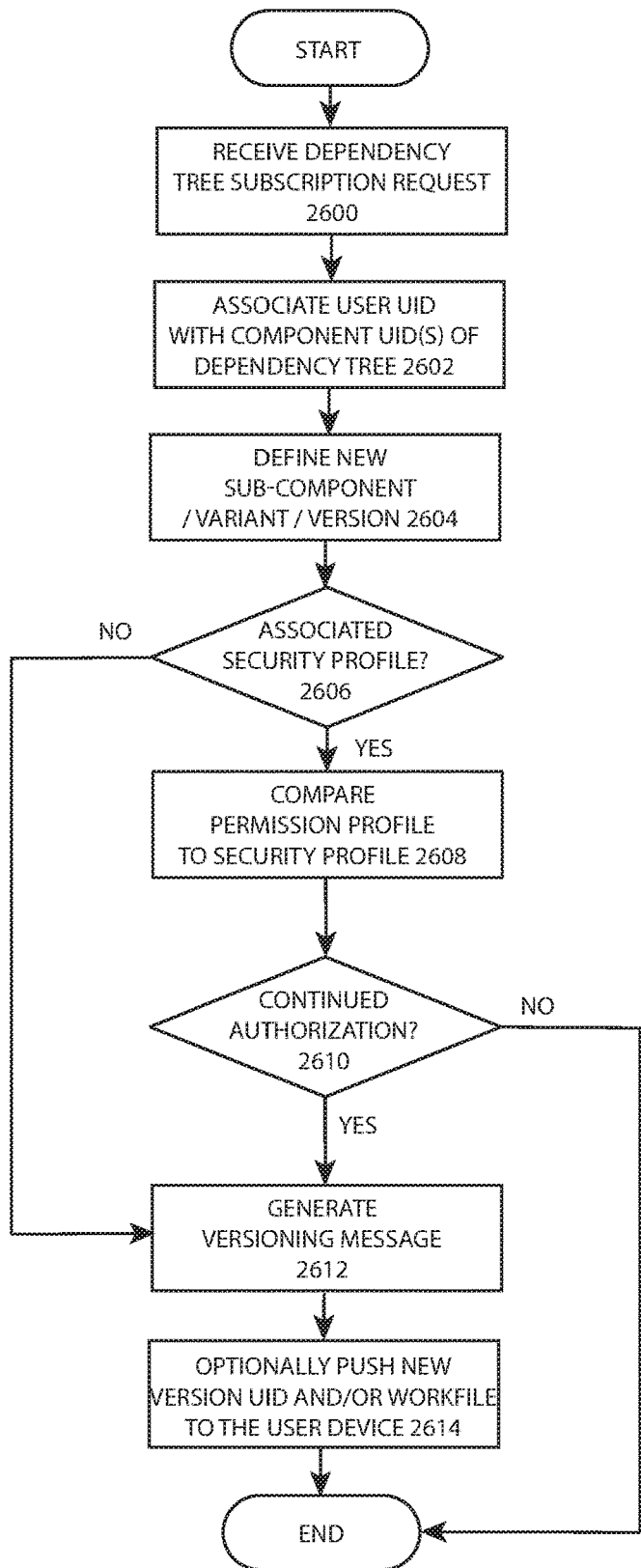
FIG. 26 is a subscriber event permission verification process flow, according to one or more embodiments.

FIG. 26 is a subscriber event permission verification process flow, according to one or more embodiments. Operation 2600, operation 2602, and operation 2604 may operate similarly to operation 2400, operation 2402, and operation 2404 of FIG. 24. Operation 2606 determines if a security profile 514 is associated with a new version 130. For example, the security profile 514 may have been defined when the new version 130 was defined and stored in the node 160 of the new version 130. Similarly, the security profile 514 may be stored in another node 160 of the component group 140 in which the new version 130 was defined, and may have pre-existed the new version 130. If no security profile 514 is associated, operation 2606 proceeds to operation 2612. Where a security profile 514 is associated, operation 2606 proceeds to operation 2608, which compares a permission profile 504 of the user 101 (and/or a group of users 101) to the security profile 514. Operation 2610 determines if the user 101 (and/or a group of users 101) remain authorized. If not, the process ends without the user 101 and/or the group of users 101 being notified. However, where authorization remains, operation 2612 may generate a versioning message and operation 2614 may operationally push associated workfiles 606 to the client device 200, similar to operation 2414 of FIG. 24.

Figure 27:
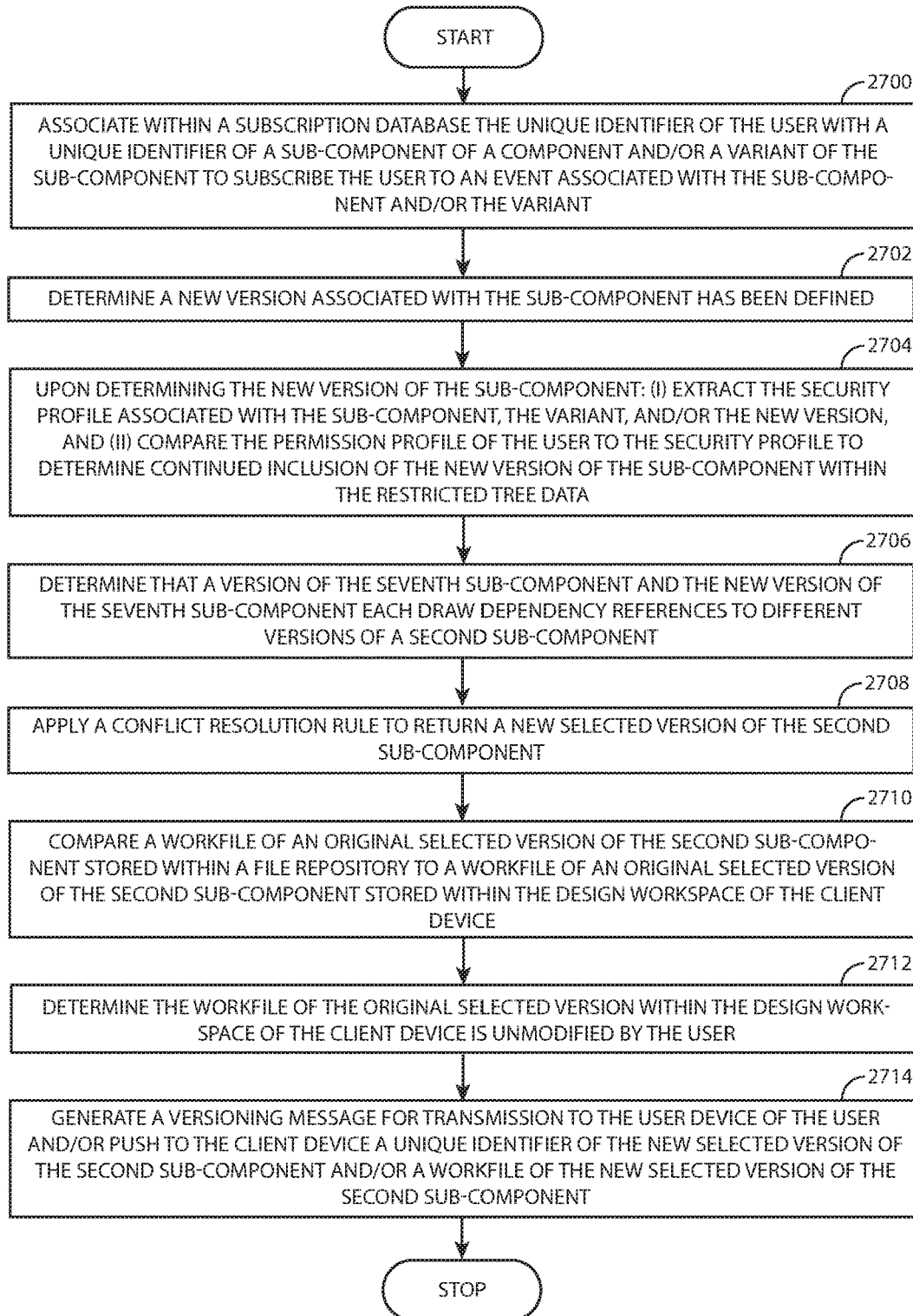
FIG. 27 is a subscriber event permission, conflict, and automated workfile delivery process flow, according to one or more embodiments.

FIG. 27 is a subscriber event permission, conflict, and automated workfile delivery process flow, according to one or more embodiments. Operation 2700 associates within a subscription database 704 the unique identifier of the user 101 (e.g., the user UID 526) with a unique identifier of a sub-component 110 of a component 110 and/or a variant 120 of the sub-component 110 to subscribe the user 101 to an event associated with the sub-component 110 and/or the variant 120. Operation 2702 determines a new version 130 associated with the sub-component 110 has been defined, for example within the dependency database 402 by one or more other users 101. Operation 2704, upon determining the new version 130 of the sub-component: (i) extracts the security profile 514 associated with the sub-component 110, the variant 120, and/or the new version 130, and (ii) compares the permission profile 504 of the user 101 to the security profile 514 to determine continued inclusion of the new version 130 of the sub-component 110 within the restricted tree data 151. Operation 2706 determines that a version 130 of the sub-component 110 (e.g., a sub component 110A) and the new version 130 of the sub-component 110 each draw dependency references 131 to different versions 130 (e.g., a version 130A and a version 130B) of a second sub-component 110 (e.g., a sub component 110B). Operation 2708 applies a conflict resolution rule to return a new selected version 130 of the second sub-component 110. Operation 2710 compares a workfile 606 of an original selected version 130 of the second sub-component stored within a file repository 602 to a workfile 606 of an original selected version 130 of the second sub-component 110 stored within the design workspace 208 of the client device 200. Operation 2712 determines the workfile 606 of the original selected version 120 within the design workspace 208 of the client device 200 is unmodified by the user 101. For example, a hash value of the original selected version 130 and the new version 130 may be compared. Operation 2714 generates a versioning message for transmission to the client device 200 of the user 101 and/or pushes to the client device 200 a unique identifier of the new selected version 130 of the second sub-component and/or a workfile 606 of the new selected version 130 of the second sub-component 110.

Although the present embodiments have been described with reference to specific example embodiments, it will be evident that various modifications and changes may be made to these embodiments without departing from the broader spirit and scope of the various embodiments. For example, the various devices, engines and modules described herein may be enabled and operated using hardware circuitry (e.g., CMOS based logic circuitry), firmware, software or any combination of hardware, firmware, and software (e.g., embodied in a non-transitory machine-readable medium). For example, the various electrical structure and methods may be embodied using transistors, logic gates, and electrical circuits (e.g., application specific integrated (ASIC) circuitry and/or Digital Signal Processor (DSP) circuitry).

In addition, it will be appreciated that the various operations, processes and methods disclosed herein may be embodied in a non-transitory machine-readable medium and/or a machine-accessible medium compatible with a data processing system (e.g., the client device 200, the storage server 250, the coordination server 300, the design server 400, the security server 500, the file server 600, and/or the subscription server 700). Accordingly, the specification and drawings are to be regarded in an illustrative rather than a restrictive sense.

The structures in the figures such as the engines, routines, and modules may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the preceding disclosure.

What is claimed is:

1. A computer-implemented method for selectively securing design data, the method comprising:
   receiving a first request for retrieval of a dependency tree of a version of a component, the first request generated by a client device of a user and comprising a unique identifier of the user and a unique identifier of the version of the component as a root version of the dependency tree;
   authenticating at least one of the user and the client device of the user;
   extracting a permission profile associated with the unique identifier of the user;
   generating a second request for retrieval of the dependency tree of the root version of the component, the second request comprising the permission profile and the unique identifier of the root version of the component;
   querying the root version of the component with the unique identifier of the root version;
   following a first dependency reference to a version of a first sub-component of the component and a second dependency reference to a version of a second sub-component of the component;
   extracting a security profile associated with the first sub-component;
   comparing the permission profile of the user to the security profile associated with the first sub-component to determine exclusion of the version of the first sub-component from the dependency tree of the root version;
   terminating a dependency reference following at the version of the first sub-component to result in a terminated branch of the dependency tree of the root version;
   storing the unique identifier of the version of the second sub-component in a restricted tree data to result in a continuing branch of the dependency tree of the root version; and
   returning the restricted tree data of the root version to the client device of the user.

2. The method of claim 1, further comprising:
   determining that a version of a third sub-component and a version of a fourth sub-component each comprise an instance of the dependency reference each pointing to a different version of a fifth sub-component,
     wherein the version of the third sub-component and the version of the fourth sub-component within the continuing branch of the dependency tree; and
   applying a conflict resolution rule to return a selected version of the fifth sub-component.

3. The method of claim 2, further comprising:
   excluding from the restricted tree data the unique identifier of one or more versions of the fifth sub-component except the unique identifier of the selected version of the fifth sub-component.

4. The method of claim 3, further comprising:

determining an override reference drawn to a version of a sixth sub-component of the component defines an override version, wherein a conflict implicating the version of the sixth sub-component is resolved to select the override version.

5. The method of claim 4, further comprising:

receiving a third request for retrieval of one or more workfiles associated with the restricted tree data to assemble a design workspace, wherein the third request comprising the unique identifier of the root version of the component and the unique identifier of a version of each sub-component within the restricted tree data;

retrieving the one or more workfiles associated with the restricted tree data from a file repository;

encrypting the one or more workfiles associated with the restricted tree data of the root version of the component; and returning encrypted instances of the one or more workfiles to the client device of the user for assembly of a restricted instance of the design workspace.

6. The method of claim 5, further comprising:

associating within a subscription database the unique identifier of the user with a unique identifier of at least one of a seventh sub-component of the component and a variant of the seventh sub-component to subscribe the user to an event associated with at least one of the seventh sub-component and the variant;

determining a new version associated with the seventh sub-component has been defined; and generating a versioning message for transmission to the client device of the user.

7. The method of claim 6, further comprising:

determining the unique identifier of at least one of the seventh sub-component and the variant has been removed from the permission profile of the user;

generating an un-subscribe request; and deleting within the subscription database the unique identifier of the user associated with the unique identifier of at least one of the seventh sub-component and the variant.

8. The method of claim 6, further comprising:

upon determining the new version of the seventh sub-component, extracting the security profile associated with at least one of the seventh sub-component, the variant, and the new version; and upon determining the new version of the third sub-component, comparing the permission profile of the user to the security profile to determine continued inclusion of the new version of the seventh sub-component within the restricted tree data.

9. The method of claim 6, further comprising:

determining that a version of the seventh sub-component and the new version of the seventh sub-component each draw dependency references to different versions of an eighth sub-component;

applying a conflict resolution rule to return a new selected version of the eighth sub-component;

comparing a workfile of an original selected version of the eighth sub-component stored within a file repository to a workfile of an original selected version of the eighth sub-component stored within the design workspace of the user;

determining the workfile of the original selected version within the design workspace of the user is unmodified by the user; and pushing to the client device at least one of a unique identifier of the new selected version of the eighth sub-component and a workfile of the new selected version of the eighth sub-component.

10. The method of claim 6, wherein the dependency references of the versions within the design database defining a directed acyclic graph wherein each version of each component is a node of the directed acyclic graph and each dependency reference is an edge of the directed acyclic graph.

11. A computer-implemented method for selectively securing design data, the method comprising:

receiving a first request for retrieval of a dependency tree of a version of a component, the first request comprising a unique identifier of a user generating the request and a unique identifier of the version of the component as a root version of the dependency tree, extracting a permission profile associated with the user generating the first request;

submitting the unique identifier of the version of the component as a query to a design database comprising a set of dependency references defining a directed acyclic graph stored in a computer memory, wherein, the directed acyclic graph comprising a set of components as nodes of the directed acyclic graph and a set of dependency references of at least one of the set of components and a set of the versions of the set of components drawn between the nodes as directed edges of the directed acyclic graph;

starting at the root node, following the set of dependency references of the version of the component and the set of dependency references of a version of each of a set of sub-components of the component;

comparing the unique identifier of the version of the component and the unique identifier of the version of each of the set of sub-components to the permission profile of the user to determine an authorization status for the root version and each of the versions of the set of sub-components; and storing a restricted tree data comprising a unique identifier of the root version and the unique identifier of each version of the set of sub-components having both: (i) a positive authorization status and (ii) a connection to the root version of the component through a dependency chain of versions, each version in the dependency chain having the positive authorization status.

12. The method of claim 11, further comprising:

determining a version conflict within the restricted dependency tree data of the component in which versions of two or more sub-components of the set of sub-components each draw dependency references to a different version of a sub-component of the set of sub-components; and applying a conflict resolution rule to return a selected version of the sub-component to which the versions of the two or more sub-components draw dependency references.

13. The method of claim 12, further comprising:

returning the restricted tree data to the client device of the user;

receiving a second request for retrieval of a set of workfiles associated with the restricted tree data to assemble a design workspace, the second request comprising the unique identifier of the root version of the component and the version of each sub-component of the restricted dependency tree data;

retrieving the set of workfiles associated with the restricted tree data of the root version of the component from a file repository; and returning the workfiles to the client device of the user for assembly of a restricted instance of the design workspace.

14. The method of claim 13, further comprising:

registering the unique identifier of the user in association with the unique identifier of the version of each component and sub-component of the restricted dependency tree data to subscribe the user to events associated with each component and sub-component of the restricted dependency tree data;

determining a new version associated with at least one of the component and the sub-component of the component has been defined; and generating a versioning message for transmission to the client device of the user.

15. The method of claim 14, further comprising:

upon determining the new version associated at least one of the component and a sub-component, querying the permission profile; and upon determining the new version associated is available, comparing the permission profile of the user to the unique identifier of the version of the at least one of the component and the sub-component to determine continued inclusion of the new version within the restricted dependency tree data.

16. A system comprising:

a coordination server comprising:
  a processor of the coordination server,
  a memory of the coordination server,
  a request agent comprising computer executable instructions that when executed on the processor of the coordination server receives a first request for retrieval of a dependency tree of a version of a component, the first request comprising a unique identifier of the user and a unique identifier of the version of the component as a root version of the dependency tree,
  an authentication module comprising computer executable instructions that when executed on the processor of the coordination server authenticates at least one of a user and a client device of the user generating the request,
  a tree query engine comprising computer executable instructions that when executed on the processor of the coordination server, starting at the root node, follows a set of dependency references of the version of the component and a set of dependency references of a version of each of a set of sub-components of the component to assemble a tree data;
  a tree restriction engine comprising:
    (i) a profile comparison module comprising computer executable instructions that when executed on the processor of the coordination server extracts a permission profile associated with the unique identifier of the user and compares the unique identifier of the version of the component and the unique identifier of the version of each of the set of sub-components of the tree data to the permission profile of the user;
    (ii) a node authorization module that determines an authorization status for the root version and each of the versions of the set of sub-components; and
    (iii) a node selection module of the coordination server comprising computer executable instructions that when executed on the processor of the coordination server stores a restricted tree data comprising a unique identifier of the root version and the unique identifier of each version of the set of sub-components having both: (a) a positive authorization status and (b) a connection to the root version of the component through a dependency chain of versions, each version in the dependency chain having the positive authorization status, and a network.

17. The system of claim 16, further comprising:

a security server comprising a permission database storing a unique identifier of the user associated with the permission profile, the permission profile comprising at least one of a permission list, a permission type, and a permission level.

18. The system of claim 17, further comprising:

a design server comprising a dependency database stored in a computer memory comprising dependency references defining a directed acyclic graph, the directed acyclic graph comprising a set of versions as nodes of the directed acyclic graph and a set of dependency references of at least one of the set of versions acyclically drawn between the nodes as directed edges of the directed acyclic graph.

19. The system of claim 18, further comprising:

a file server comprising:
  one or more workfiles referenceable by the restricted tree data, each workfile comprising an identifier of the workfile and a workfile data, and
  computer readable instructions that when executed on a computer processor receives a second request for retrieval of a set of the one or more workfiles defined in the restricted tree data to assemble a design workspace.

20. The system of claim 19, further comprising:

the security server further comprising a security database storing the unique identifier of at least one of the component and the unique identifier the version of the component associated with a security profile, the security profile comprising at least one of a security type, a security level, and a security rule, a client device comprising:
  a processor of the client device, a memory of the client device,
  a user interface usable to select the version of the component,
  a storage storing a design workspace comprising one or more workfiles associated with the restricted tree data, and
  a request module comprising computer readable instructions that when executed on the processor of the client device generates the first request for retrieval of the dependency tree of the version of the component, the First request comprising the unique identifier of the user and the unique identifier of the version of the component as the root version of the dependency tree, a subscription server comprising:
  a subscription database comprising the unique identifier of the user associated with at least one of the unique identifier of the component and the unique identifier of the version of the component,
  a subscription registration module comprising computer readable instructions that when executed on a computer processor: (i) stores the unique identifier of the user in association with at least one of the component and the version of the component to subscribe the user to an event and (ii) deletes the unique identifier of the user associated with the unique identifier of at least one of the component and the version of the component, to un-subscribe the user from the event, and an event generation module comprising computer readable instructions that when executed on a computer processor determines a new version associated with at least one of the component and the version of the component has been defined and generates a versioning message for transmission to the client device of the user, the coordination server further comprising:

a profile update module comprising computer readable instructions that when executed on the processor determines at least one of the unique identifier the component and the unique identifier of the version of the component has been removed from the permission profile of the user and generates an un-subscribe request, and a tree re-evaluation module comprising computer readable instructions that when executed on the processor of the coordination server, upon determining the new version of the at least one of the component and the version of the component, extract the security profile associated with at least one the component and the new version, and upon determining the new version comparing the permission profile of the user to the security profile to determine continued inclusion of the new version within the restricted tree data.

\* \* \* \* \*